United States Patent
Kato et al.

(10) Patent No.: US 7,738,776 B2
(45) Date of Patent: Jun. 15, 2010

(54) INFORMATION PROCESSING APPARATUS AND METHOD, PROGRAM, AND RECORDED MEDIUM

(75) Inventors: Motoki Kato, Kanagawa (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 1422 days.

(21) Appl. No.: 10/018,846

(22) PCT Filed: Apr. 20, 2001

(86) PCT No.: PCT/JP01/03415

§ 371 (c)(1),
(2), (4) Date: Apr. 12, 2002

(87) PCT Pub. No.: WO01/82606

PCT Pub. Date: Nov. 1, 2001

(65) Prior Publication Data

US 2002/0135607 A1     Sep. 26, 2002

(30) Foreign Application Priority Data

Apr. 21, 2000 (JP) ............................. 2000-183771
Sep. 7, 2000 (JP) ............................. 2000-271552

(51) Int. Cl.
    *H04N 7/00* (2006.01)
(52) U.S. Cl. ............................. 386/95; 386/70; 386/125
(58) Field of Classification Search .................. 386/68, 386/70, 95, 125
    See application file for complete search history.

(56) References Cited

U.S. PATENT DOCUMENTS

| 5,838,876 | A  |   | 11/1998 | Iwamura |
| 6,002,834 | A  |   | 12/1999 | Hirabayashi et al. |
| 6,445,877 | B1 | * | 9/2002  | Okada et al. ................... 386/95 |
| 7,076,153 | B2 |   | 7/2006  | Ando et al. |

FOREIGN PATENT DOCUMENTS

| EP | 0 876 063  | 11/1998 |
| EP | 0 910 087  | 4/1999  |
| EP | 0 929 072  | 7/1999  |
| EP | 0 971 535  | 1/2000  |
| EP | 0 986 062  | 3/2000  |
| EP | 0 991 072  | 4/2000  |
| JP | 10-145735  | 5/1998  |
| JP | 10-271454  | 10/1998 |
| JP | 10-304309  | 11/1998 |
| JP | 11-149717  | 6/1999  |
| JP | 11-259992  | 9/1999  |

\* cited by examiner

*Primary Examiner*—Marsha D Banks Harold
*Assistant Examiner*—Daniel Tekle
(74) *Attorney, Agent, or Firm*—Frommer Lawrence & Haug LLP; William S. Frommer; Thomas F. Presson

(57) ABSTRACT

CPI_type is stated in the PlayList( ). There are EP_type and EP_map type in CPI_type. If the position of an I-picture can be known by analysis, EP_map type is used, whereas, if the position of an I-picture cannot be known by analysis, EP_map type is used. By so doing, AV stream data recorded subject to analysis of the I-picture and AV stream data recorded without analyzing the I-picture position can be supervised in common.

28 Claims, 100 Drawing Sheets

| SYNTAX | NUMBER OF BYTES | ABBREVIATION |
|---|---|---|
| info.dvr { | | |
|     TableOfPlayLists_Start_address | 32 | uimsbf |
|     MakersPrivateData_Start_address | 32 | uimsbf |
|     reserved | 192 | bslbf |
|     DVRVolume() | | |
|     for (i=0;i<N1;i++){ | | |
|         padding_word | 16 | bslbf |
|     } | | |
|     TableOfPlayLists() | | |
|     for (i=0;i<N2;i++){ | | |
|         padding_word | 16 | bslbf |
|     } | | |
|     MakersPrivateData() | | |
| } | | |

FIG.15

| SYNTAX | NUMBER OF BYTES | ABBREVIATION |
|---|---|---|
| DVRVolume() { | | |
|     version_number | 8*4 | bslbf |
|     length | 32 | uimsbf |
|     ResumeVolume() | | |
|     UIAppInfoVolume() | | |
| } | | |

FIG.16

| SYNTAX | NUMBER OF BYTES | ABBREVIATION |
|---|---|---|
| ResumeVolume(){ | | |
| reserved | 15 | bslbf |
| valid_flag | 1 | bslbf |
| resume_PlayList_name | 8*10 | bslbf |
| } | | |

FIG.17

| SYNTAX | NUMBER OF BYTES | ABBREVIATION |
|---|---|---|
| UIAppInfoVolume() { | | |
|     character_set | 8 | bslbf |
|     name_length | 8 | uimsbf |
|     Volume_name | 8*256 | bslbf |
|     reserved | 15 | bslbf |
|     Volume_protect_flag | 1 | bslbf |
|     PIN | 8*4 | bslbf |
|     ref_thumbnail_index | 16 | uimsbf |
|     reserved_for_future_use | 256 | bslbf |
| } | | |

FIG.18

| VALUE | CHARACTER LETTER ENCODING |
|---|---|
| 0x00 | Reserved |
| 0x01 | ISO/IEC 646 (ASCII) |
| 0x02 | ISO/IEC 10646-1 (Unicode) |
| 0x03-0xff | Reserved |

FIG.19

| SYNTAX | NUMBER OF BYTES | ABBREVIATION |
|---|---|---|
| TableOfPlayLists(){ | | |
|     version_number | 8*4 | bslbf |
|     length | 32 | uimsbf |
|     number_of_PlayLists | 16 | uimsbf |
|     for (i=0; i<*number_of_PlayLists*; i++){ | | |
|         PlayList_file_name | 8*10 | bslbf |
|     } | | |
| } | | |

FIG.20

| SYNTAX | NUMBER OF BYTES | ABBREVIATION |
|---|---|---|
| TableOfPlayLists() { | | |
|     version_number | 8*4 | bslbf |
|     length | 32 | uimsbf |
|     number_of_PlayLists | 16 | uimsbf |
|     for (i=0; i<*number_of_PlayLists*; i++) { | | |
|         PlayList_file_name | 8*10 | bslbf |
|         UIAppInfoPlayList() | | |
|     } | | |
| } | | |

FIG.21

| SYNTAX | NUMBER OF BYTES | ABBREVIATION |
|---|---|---|
| MakersPrivateData(){ | | |
|     version_number | 8*4 | bslbf |
|     length | 32 | uimsbf |
|     if (length !=0){ | | |
|         mpd_blocks_start_address | 32 | uimsbf |
|         number_of_maker_entries | 16 | uimsbf |
|         mpd_block_size | 16 | uimsbf |
|         number_of_mpd_blocks | 16 | uimsbf |
|         reserved | 16 | bslbf |
|         for (i=0; i<*number_of_maker_entries*; i++){ | | |
|             maker_ID | 16 | uimsbf |
|             maker_model_code | 16 | uimsbf |
|             start_mpd_block_number | 16 | uimsbf |
|             reserved | 16 | bslbf |
|             mpd_length | 32 | uimsbf |
|         } | | |
|         stuffing_bytes | 8*2*L1 | bslbf |
|         for(j=0; j<*number_of_mpd_blocks*; j++){ | | |
|             mpd_block | mpd_block_size*1024*8 | |
|         } | | |
|     } | | |
| } | | |

FIG.22

| SYNTAX | NUMBER OF BYTES | ABBREVIATION |
|---|---|---|
| xxxxx.rpls / yyyyy.vpls { | | |
|     PlayListMark_Start_address | 32 | uimsbf |
|     MakersPrivateData_Start_address | 32 | uimsbf |
|     reserved | 192 | bslbf |
|     PlayList() | | |
|     for (i=0;i<N1;i++){ | | |
|         padding_word | 16 | bslbf |
|     } | | |
|     PlayListMark() | | |
|     for (i=0;i<N2;i++){ | | |
|         padding_word | 16 | bslbf |
|     } | | |
|     MakersPrivateData() | | |
| } | | |

FIG.23

| SYNTAX | NUMBER OF BYTES | ABBREVIATION |
|---|---|---|
| PlayList() { | | |
|     version_number | 8*4 | bslbf |
|     length | 32 | uimsbf |
|     PlayList_type | 8 | uimsbf |
|     CPI_type | 1 | bslbf |
|     reserved | 7 | bslbf |
|     UIAppInfoPlayList() | | |
|     number_of_PlayItems    // main path | 16 | uimsbf |
|     if (<Vertual PlayList>) { | | |
|         number_of_SubPlayItems  // sub path | 16 | uimsbf |
|     }else{ | | |
|         reserved | 16 | bslbf |
|     } | | |
|     for (PlayItem_id=0;<br>        PlayItem_id<nymber_of_PlayItems;<br>        PlayItem_id++){ | | |
|         PlayItem()    //main path | | |
|     } | | |
|     if (<Virtual PlayList>) { | | |
|         if (CPI_type==0 && PlayList_type==0){ | | |
|             for (i=0; i<number_of_SubPlayItems; i++) | | |
|             SubPlayItem()  //sub path | | |
|         }. | | |
|     } | | |
| } | | |

FIG.25

| PlayList_type | MEANING |
|---|---|
| 0 | PLAY LIST FOR AV RECORDING<br>ALL CLIPS REFERENCED IN THIS PLAY LIST MUST CONTAIN ONE OR MORE VIDEO STREAMS |
| 1 | PLAY LIST FOR AUDIO RECORDING<br>ALL CLIPS REFERENCED IN THIS PLAYLIST MUST CONTAIN ONE OR MORE AUDIO STREAMS AND MUST NOT CONTAIN VIDEO STREAMS |
| 2-255 | reserved |

FIG.26

| SYNTAX | NUMBER OF BYTES | ABBREVIATION |
|---|---|---|
| UIAppInfoPlayList2(){ | | |
|     character_set | 8 | bslbf |
|     name_length | 8 | uimsbf |
|     PlayList_name | 8*256 | bslbf |
|     reserved | 8 | bslbf |
|     record_time_and_date | 4*14 | bslbf |
|     reserved | 8 | bslbf |
|     duration | 4*6 | bslbf |
|     valid_period | 4*8 | bslbf |
|     maker_id | 16 | uimsbf |
|     maker_code | 16 | uimsbf |
|     reserved | 11 | bslbf |
|     playback_control_flag | 1 | bslbf |
|     write_protect_flag | 1 | bslbf |
|     is_played_flag | 1 | bslbf |
|     archive | 2 | bslbf |
|     ref_thumbnail_index | 16 | uimsbf |
|     reserved_for_future_use | 256 | bslbf |
| } | | |

FIG.27

| write_protect_flag | MEANING |
|---|---|
| 0b | THE PlayList CAN BE ERASED FREELY |
| 1b | THE PlayList CONTENTS SHOULD NOT BE ERASED NOR CHANGED EXCEPT write-protect-flag |

FIG.28A

| is_played_flag | MEANING |
|---|---|
| 0b | THE PlayList HAS NOT BEEN REPRODUCED SINCE ITS RECORDING |
| 1b | THE PlayList WAS ONCE REPRODUCED SINCE ITS RECORDING |

FIG.28B

| archive | MEANING |
|---|---|
| 00b | NO MEANING DEFINED |
| 01b | ORIGINAL |
| 10b | COPY |
| 11b | reserved |

FIG.28C

| SYNTAX | NUMBER OF BYTES | ABBREVIATION |
|---|---|---|
| PlayItem() { | | |
|     Clip_information_file_name | 8*10 | bslbf |
|     reserved | 24 | bslbf |
|     STC_sequence_id | 8 | uimsbf |
|     IN_time | 32 | uimsbf |
|     OUT_time | 32 | uimsbf |
|     reserved | 14 | bslbf |
|     connection_condition | 2 | bslbf |
|     if (<Virtual PlayList>){ | | |
|         if (*connection_condition*=='*10*'){ | | |
|             BridgeSequenceInfo() | | |
|         } | | |
|     } | | |
| } | | |

FIG.32

| CPI_type in the PlayList() | SEMANTICS OF IN_time |
|---|---|
| EP_map type | IN_time MUST INDICATE UPPER 32 BITS OF 33 BIT LENGTH CORRESPONDING TO FIRST PRESENTATION UNIT IN PlayItem |
| TU_map type | IN_time MUST BE TIME ON TU_map_time_axis, AND MUST BE ROUNDED TO time_unit PRECISION. IN-time IS CALCULATED BY FOLLOWING EQUATION: $$IN\_time = TU\_start\_time \, \%2^{32}$$ |

FIG.33

| CPI_type in the PlayList() | SEMANTICS OF OUT_time |
|---|---|
| EP_map type | OUT_time MUST INDICATE UPPER 32 BITS OF THE VALUE OF Presentation_end_TS CALCULATED BY FOLLOWING EQUTION:<br>$$Presentation\_end\_TS = PTS\_out + AU\_duration$$<br>WHERE PTS_out IS 33-BIT LONG PTS CORRESPONDING TO LAST PRESENTATION UNIT IN PlayItem. AU_duration IS 90 kHz-DISPLAY TIME OF LAST PRESENTATION UNIT. |
| TU_map type | OUT_time MUST BE TIME ON TU_map_time_axis AND BE ROUNDED TO time_unit PRECISION. OUT_time IS CALCULATED BY FOLLOWING EQUATION:<br>$$OUT\_time = TU\_start\_time \ \%2^{32}$$ |

FIG.34

| connection _condition | MEANING |
|---|---|
| 00 | · CONNECTION OF PREVIOUS PlayItem TO CURRENT PlayItem IS NOT SURE AS TO SEAMLESS REPLAY.<br>· IF CPI_type OF PlayList IS TU_map type, THIS VALUE MUST BE SET IN connection_condition. |
| 01 | · THIS STATE IS ALLOWED ONLY WHEN CPI_type OF PlayList IS EP_map type.<br>· PREVIOUS PlayItem AND CURRENT PlayItem INDICATE DIVISION BECAUSE OF NON-CONTINUOUS POINT OF SYSTEM TIMEBASE (STC BASE). |
| 10 | · THIS STATE IS ALLOWED ONLY WHEN CPI_type OF PlayList IS EP_map type.<br>· THIS STATE IS ALLOWED ONLY FOR Virtual PlayList.<br>· CONNECTION OF PREVIOUS PlayItem TO CURRENT PlayItem IS SURE AS TO SEAMLESS REPLAY.<br>· PREVIOUS PlayItem IS CONNECTED TO CURRENT PlayItem USING BridgeSequence. DVR MPEG-2 TRANSPORT STREAM MUST OBEY DVR-STD AS LATER DESCRIBED. |
| 11 | · THIS STATE IS ALLOWED ONLY WHEN CPI_type OF PlayList IS EP_map type.<br>· CONNECTION OF PREVIOUS PlayItem TO CURRENT Play Item IS SURE AS TO SEAMLESS REPLAY.<br>· PREVIOUS PlayItem IS CONNECTED TO CURRENT PlayItem WITHOUT USING BridgeSequence. DVR MPEG-2 TRANSPORT STREAM MUST OBEY DVR-STD AS LATER DESCRIBED. |

FIG.35

| SYNTAX | NUMBER OF BYTES | ABBREVIATION |
|---|---|---|
| BridgeSequenceInfo() { | | |
|     Bridge_Clip_information_file_name | 8*10 | bslbf |
|     RSPN_exit_from_previous_Clip | 32 | uimsbf |
|     RSPN_enter_to_current_Clip | 32 | uimsbf |
| } | | |

FIG.38

| SYNTAX | NUMBER OF BYTES | ABBREVIATION |
|---|---|---|
| SubPlayItem() { | | |
|     Clip_Information_file_name | 8*10 | bslbf |
|     SubPath_type | 8 | bslbf |
|     sync_PlayItem_id | 8 | uimsbf |
|     sync_start_PTS_of_PlayItem | 32 | uimsbf |
|     SubPath_IN_time | 32 | uimsbf |
|     SubPath_OUT_time | 32 | uimsbf |
| } | | |

FIG.40

| SubPath_type | MEANING |
|---|---|
| 0x00 | Auxiliary audio steam path |
| 0x01-0xff | reserved |

FIG.41

| SYNTAX | NUMBER OF BYTES | ABBREVIATION |
|---|---|---|
| PlayListMark() { | | |
|     version_number | 8*4 | bslbf |
|     length | 32 | uimsbf |
|     number_of_PlayList_marks | 16 | uimsbf |
|     for (i=0;i<*number_of_PlayList_marks*;i++){ | | |
|         reserved | 8 | bslbf |
|         mark_type | 8 | bslbf |
|         mark_time_stamp | 32 | uimsbf |
|         PlayItem_id | 8 | uimsbf |
|         reserved | 24 | uimsbf |
|         character_set | 8 | bslbf |
|         name_length | 8 | uimsbf |
|         mark_name | 8*256 | bslbf |
|         ref_thumbnail_index | 16 | uimsbf |
|     } | | |
| } | | |

FIG.42

| Mark_type | MEANING | COMMENT |
|---|---|---|
| 0x00 | resume-mark | REPLAY RESUME POINT. THE NUMBER OF REPLAY RESURE POINTS DEFINED IN PlayListMark() MUST BE 0 OR 1. |
| 0x01 | book-mark | REPLAY ENTRY POINT OF PlayList. THIS MARK CAN BE SET BY USER AND USED AS MARK SPECIFYING START POINT OF FAVORITE SCENE. |
| 0x02 | skip-mark | SKIP MARK POINT. PLAYER SKIPS PROGRAM FROM THIS POINT TO THE END OF PROGRAM. THE NUMBER OF SKIP MARK POINTS DEFINED IN PlayListMark() MUST BE 0 RO 1. |
| 0x03-0x8F | reserved | |
| 0x90-0xFF | reserved | Reserved for ClipMark() |

FIG.43

| CPI_type in the PlayList() | SEMANTICS OF mark_time_stamp |
|---|---|
| EP_map type | mark_time_stamp MUST INDICATE UPPER 32 BITS OF 33 BIT LENGTH PTS CORRESPONDING TO PRESENTATION UNIT REFERENCED BY MARK. |
| TU_map type | mark_time_stamp MUST BE TIME ON TU_map_time_axis AND MUST BE ROUNDED TO time_unit PRECISION. mark_time_stamp IS CALCULATED BY FOLLOWING EQUATION:<br><br>$mark\_time\_stamp = TU\_start\_time \, \%2^{32}$ |

FIG.44

| SYNTAX | NUMBER OF BYTES | ABBREVIATION |
|---|---|---|
| zzzzz.clpi { | | |
|     STC_Info_Start_address | 32 | uimsbf |
|     ProgramInfo_Start_address | 32 | uimsbf |
|     CPI_Start_address | 32 | uimsbf |
|     ClipMark_Start_address | 32 | uimsbf |
|     MakersPrivateData_Start_address | 32 | uimsbf |
|     reserved | 96 | bslbf |
|     ClipInfo() | | |
|     for (i=0;i<N1;i++){ | | |
|         padding_word | 16 | bslbf |
|     } | | |
|     STC_Info() | | |
|     for (i=0;i<N2;i++){ | | |
|         padding_word | 16 | bslbf |
|     } | | |
|     ProgramInfo() | | |
|     for (i=0;i<N3;i++){ | | |
|         padding_word | 16 | bslbf |
|     } | | |
|     CPI() | | |
|     for (i=0;i<N4;i++){ | | |
|         padding_word | 16 | bslbf |
|     } | | |
|     ClipMark() | | |
|     for (i=0;i<N5;i++){ | | |
|         padding_word | 16 | bslbf |
|     } | | |
|     MakersPrivateData() | | |
| } | | |

FIG.45

| SYNTAX | NUMBER OF BYTES | ABBREVIATION |
|---|---|---|
| ClipInfo () { | | |
|     version_number | 8*4 | bslbf |
|     length | 32 | uimsbf |
|     Clip_stream_type | 8 | bslbf |
|     offset_SPN | 32 | uimsbf |
|     TS_recording_rate | 24 | uimsbf |
|     reserved | 8 | bslbf |
|     record_time_and_date | 4*14 | bslbf |
|     reserved | 8 | bslbf |
|     duration | 4*6 | bslbf |
|     reserved | 7 | bslbf |
|     time_controlled_flag | 1 | bslbf |
|     TS_average_rate | 24 | uimsbf |
|     *if (Clip_stream_type==1) // Bridge-Clip AV stream* | | |
|         RSPN_arrival_time_discontinuity | 32 | uimsbf |
|     else | | |
|         reserved | 32 | bslbf |
|     reserved_for_system_use | 144 | bslbf |
|     reserved | 11 | bslbf |
|     is_format_identifier_valid | 1 | bslbf |
|     is_original_network_ID_valid | 1 | bslbf |
|     is_transport_stream_ID_valid | 1 | bslbf |
|     is_service_ID_valid | 1 | bslbf |
|     is_country_code_valid | 1 | bslbf |
|     format_identifier | 32 | bslbf |
|     original_network_ID | 16 | uimsbf |
|     transport_stream_ID | 16 | uimsbf |
|     service_ID | 16 | uimsbf |
|     country_code | 24 | bslbf |
|     stream_format_name | 16*8 | bslbf |
|     reserved_for_fortune_use | 256 | bslbf |
| } | | |

FIG.46

| Clip_stream_type | MEANING |
|---|---|
| 0 | Clip AV STREAM |
| 1 | Bridge-Clip AV STREAM |
| 2-255 | Reserved |

FIG.47

| SYNTAX | NUMBER OF BYTES | ABBREVIATION |
|---|---|---|
| STC_Info(){ | | |
|     version_number | 8*4 | bslbf |
|     length | 32 | uimsbf |
|     if (length !=0){ | | |
|         reserved | 8 | bslbf |
|         num_of_STC_sequences | 8 | uimsbf |
|         for (STC_sequence_id=0; STC_sequence_id<num_of_STC_sequences; STC_sequence_id++){ | | |
|             resereved | 32 | bslbf |
|             RSPN_STC_start | 32 | uimsbf |
|         } | | |
|     } | | |
| } | | |

FIG.52

| SYNTAX | NUMBER OF BYTES | ABBREVIATION |
|---|---|---|
| ProgramInfo(){ | | |
|     version_number | 8*4 | bslbf |
|     length | 32 | uimsbf |
|     if (length !=0){ | | |
|         reserved | 8 | bslbf |
|         number_of_program_sequences | 8 | uimsbf |
|         for (i=0;i<*number_of_program_sequences*;i++){ | | |
|             RSPN_program_sequence_start | 32 | uimsbf |
|             reserved | 48 | bslbf |
|             PCR_PID | 16 | bslbf |
|             number_of_videos | 8 | uimsbf |
|             number_of_audios | 8 | uimsbf |
|             for (k=0;k<*number_of_videos*;k++){ | | |
|                 video_stream_PID | 16 | bslbf |
|                 VideoCodingInfo() | | |
|             } | | |
|             for (k=0;k<*number_of_audios*;k++){ | | |
|                 audio_stream_PID | 16 | bslbf |
|                 AudioCodingInfo() | | |
|             } | | |
|         } | | |
|     } | | |
| } | | |

FIG.54

| SYNTAX | NUMBER OF BYTES | ABBREVIATION |
|---|---|---|
| VideoCodingInfo() { | | |
|     video_format | 8 | uimsbf |
|     frame_rate | 8 | uimsbf |
|     display_aspect_ratio | 8 | uimsbf |
|     reserved | 8 | bslbf |
| } | | |

FIG.55

| video_format | MEANING |
|---|---|
| 0 | 480i |
| 1 | 576i |
| 2 | 480p (including 640×480p format) |
| 3 | 1080i |
| 4 | 720p |
| 5 | 1080p |
| 6-254 | reserved |
| 255 | No information |

FIG.56

| frame_rate | MEANING |
|---|---|
| 0 | forbidden |
| 1 | 24 000/1001 (23.976...) |
| 2 | 24 |
| 3 | 25 |
| 4 | 30 000/1001 (29.97..) |
| 5 | 30 |
| 6 | 50 |
| 7 | 60 000/1001 (59.94..) |
| 8 | 60 |
| 9-254 | reserved |
| 255 | No information |

FIG.57

| display_aspect_ratio | MEANING |
| --- | --- |
| 0 | forbidden |
| 1 | reserved |
| 2 | 4:3 display aspect ratio |
| 3 | 16:9 display aspect ration |
| 4-254 | reserved |
| 255 | No information |

FIG.58

| SYNTAX | NUMBER OF BYTES | ABBREVIATION |
|---|---|---|
| AudioCodingInfo () { | | |
|     audio_format | 8 | uimsbf |
|     audio_component_type | 8 | uimsbf |
|     sampling_frequency | 8 | uimsbf |
|     reserved | 8 | bslbf |
| } | | |

FIG.59

| audio_coding | MEANING |
|---|---|
| 0 | MPEG-1 audio layer I or II |
| 1 | Dolby AC-3 audio |
| 2 | MPEG-2 AAC |
| 3 | MPEG-2 multi-channel audio, backward compatible to MPEG-1 |
| 4 | SESF LPCM audio |
| 5-254 | reserved |
| 255 | No information |

FIG.60

| audio_component_type | MEANING |
|---|---|
| 0 | single mono channel |
| 1 | dual mono channel |
| 2 | stereo (2-channel) |
| 3 | multi-lingual, multi-channel |
| 4 | surround sound |
| 5 | audio description for the visually impaired |
| 6 | audio for the hard of hearing |
| 7-254 | reserved |
| 255 | No information |

FIG.61

| sampling_frequency | MEANING |
|---|---|
| 0 | 48 kHz |
| 1 | 44.1 kHz |
| 2 | 32 kHz |
| 3-254 | reserved |
| 255 | No information |

FIG.62

| SYNTAX | NUMBER OF BYTES | ABBREVIATION |
|---|---|---|
| CPI() { | | |
|     version_number | 8*4 | bslbf |
|     length | 32 | uimsbf |
|     reserved | 15 | bslbf |
|     CPI_type | 1 | bslbf |
|     if (CPI_type==0) | | |
|         EP_map() | | |
|     else | | |
|         TU_map() | | |
| } | | |

FIG.65

| CPI_type | MEANING |
|---|---|
| 0 | EP map type |
| 1 | TU map type |
FIG.66
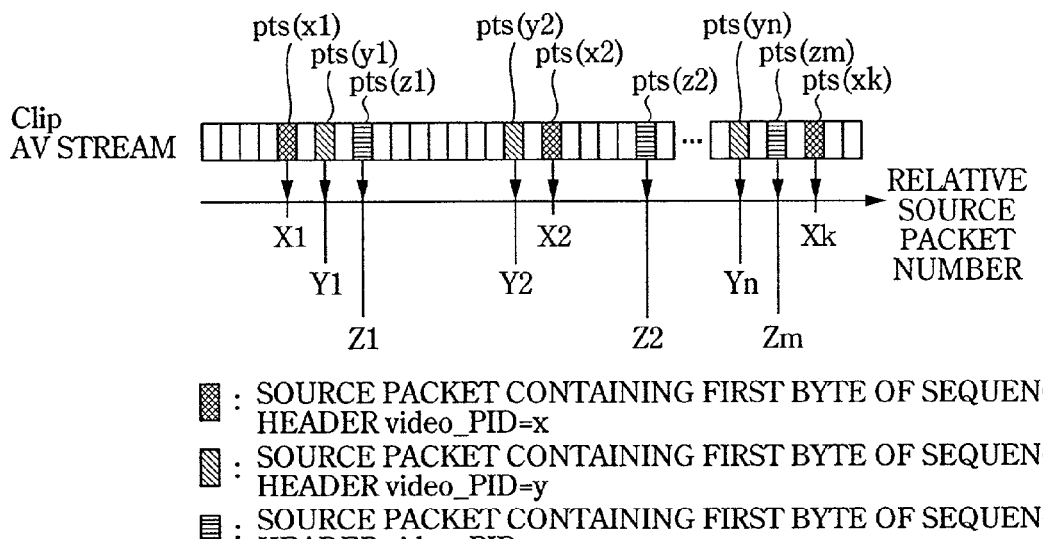
■ : SOURCE PACKET CONTAINING FIRST BYTE OF SEQUENCE HEADER video_PID=x
▨ : SOURCE PACKET CONTAINING FIRST BYTE OF SEQUENCE HEADER video_PID=y
▤ : SOURCE PACKET CONTAINING FIRST BYTE OF SEQUENCE HEADER video_PID=z
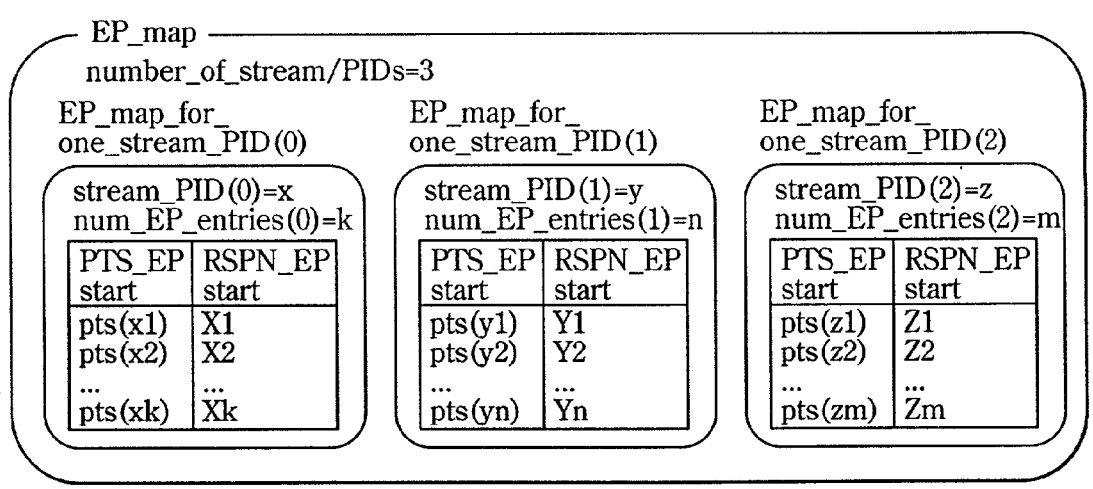
FIG.67

| SYNTAX | NUMBER OF BYTES | ABBREVIATION |
|---|---|---|
| EP_map(){ | | |
|     reserved | 12 | bslbf |
|     EP_type | 4 | uimsbf |
|     number_of_stream_PIDs | 16 | uimsbf |
|     for (k=0;k<*number_of_stream_PIDs*;k++){ | | |
|         stream_PID*(k)* | 16 | bslbf |
|         num_EP_entries*(k)* | 32 | uimsbf |
|         EP_map_for_one_stream_PID_Start_address*(k)* | 32 | uimsbf |
|     } | | |
|     for (i=0;i<X;i++){ | | |
|         padding_word | 16 | bslbf |
|     } | | |
|     for (k=0;k<*number_of_stream_PIDs*;k++){ | | |
|         EP_map_for_one_stream_PID(*num_EP_entries(k)*) | | |
|         for (i=0;i<Y;i++){ | | |
|             padding_word | 16 | bslbf |
|         } | | |
|     } | | |
| } | | |

FIG.70

| EP_type | MEANING |
|---|---|
| 0 | video |
| 1 | audio |
| 2-15 | reserved |

FIG.71

| SYNTAX | NUMBER OF BYTES | ABBREVIATION |
|---|---|---|
| EP_map_for_one_stream_PID(N) { | | |
|     for (i=0;i<N;i++){ | | |
|         PTS_EP_start | 32 | uimsbf |
|         RSPN_EP_start | 32 | uimsbf |
|     } | | |
| } | | |

FIG.72

| SYNTAX | NUMBER OF BYTES | ABBREVIATION |
|---|---|---|
| TU_map() { | | |
|     offset_time | 32 | bslbf |
|     time_unit_size | 32 | uimsbf |
|     number_of_time_unit_entries | 32 | uimsbf |
|     for (k=0;k<*number_of_time_unit_entries*;k++) | | |
|         RSPN_time_unit_start | 32 | uimsbf |
| } | | |

FIG.74

| SYNTAX | NUMBER OF BYTES | ABBREVIATION |
|---|---|---|
| ClipMark() { | | |
|     version_number | 8*4 | bslbf |
|     length | 32 | uimsbf |
|     number_of_Clip_marks | 16 | uimsbf |
|     for (i=0; i<*number_of_clip_marks*; i++){ | | |
|         reserved | 8 | bslbf |
|         mark_type | 8 | bslbf |
|         mark_time_stamp | 32 | uimsbf |
|         STC_sequence_id | 8 | uimsbf |
|         reserved | 24 | bslbf |
|         character_set | 8 | bslbf |
|         name_length | 8 | uimsbf |
|         mark_name | 8*256 | bslbf |
|         ref_thumbnail_index | 16 | uimsbf |
|     } | | |
| } | | |

FIG.75

| Mark_type | MEANING | COMMENT |
|---|---|---|
| 0x00-0x8F | reserved | Reserved for PlayListMark0 |
| 0x90 | Event-start mark | MARK POINT INDICATING PROGRAM START POINT |
| 0x91 | Local event-start mark | MARK POINT INDICATING LOCAL SCENE IN PROGRAM |
| 0x92 | Scene-start mark | MARK POINT SHOWING SCENE CHANGE POINT |
| 0x93-0xFF | reserved | |

FIG.76

| CPI_type in the PlayList() | SEMANTICS OF mark_time_stamp |
|---|---|
| EP_map type | mark_time_stamp MUST INDICATE UPPER 32 BITS OF 33 BIT LENGTH PTS CORRESPONDING TO PRESENTATION UNIT REFERENCED BY MARK. |
| TU_map type | mark_time_stamp MUST BE TIME ON TU_map_time_axis AND MUST BE ROUNDED TO time_unit PRECISION. mark_time_stamp IS CALCULATED BY FOLLOWING EQUATION:<br><br>$$mark\_time\_stamp = TU\_start\_time \% 2^{32}$$ |

FIG.77

| SYNTAX | NUMBER OF BYTES | ABBREVIATION |
|---|---|---|
| menu.thmb/mark.thmb { | | |
| reserved | 256 | bslbf |
| Thumbnail() | | |
| for (i=0; i<N1; i++) | | |
| padding_word | 16 | bslbf |
| } | | |

FIG.78

| SYNTAX | NUMBER OF BYTES | ABBREVIATION |
|---|---|---|
| Thumbnail() { | | |
|     version_number | 8*4 | char |
|     length | 32 | uimsbf |
|     if (length !=0) { | | |
|         tn_blocks_start_address | 32 | bslbf |
|         number_of_thumbnails | 16 | uimsbf |
|         tn_block_size | 16 | uimsbf |
|         number_of_tn_blocks | 16 | uimsbf |
|         reserved | 16 | bslbf |
|         for (i=0; i<*number_of_thumbnails*; i++) { | | |
|             thumbnail_index | 16 | uimsbf |
|             thumbnail_picture_format | 8 | bslbf |
|             reserved | 8 | bslbf |
|             picture_data_size | 32 | uimsbf |
|             start_tn_block_number | 16 | uimsbf |
|             x_picture_length | 16 | uimsbf |
|             y_picture_length | 16 | uimsbf |
|             reserved | 16 | uimsbf |
|         } | | |
|         stuffing_bytes | 8*2*L1 | bslbf |
|         for(k=0; k<*number_of_tn_blocks*; k++) { | | |
|             tn_block | tn_block_size*1024*8 | |
|         } | | |
|     } | | |
| } | | |

FIG.79

| Thumbnail_picture_format | MEANING |
|---|---|
| 0x00 | MPEG-2 Video I-picture |
| 0x01 | DCF (restricted JPEG) |
| 0x02 | PNG |
| 0x03-0xff | reserved |
FIG.80
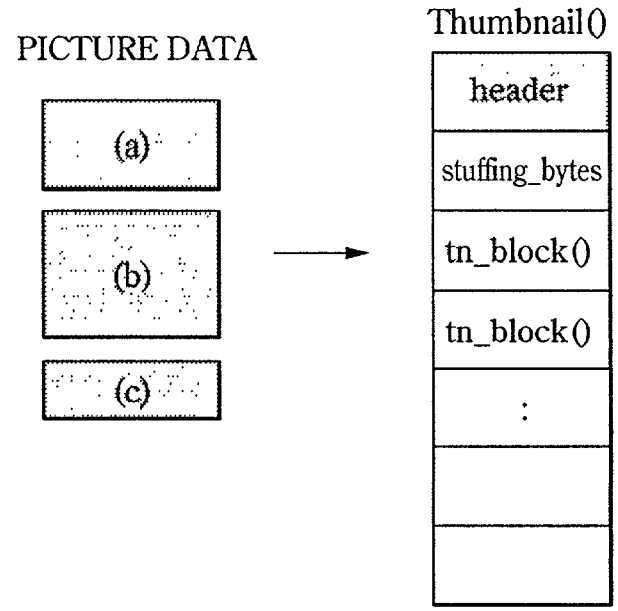
FIG.81A
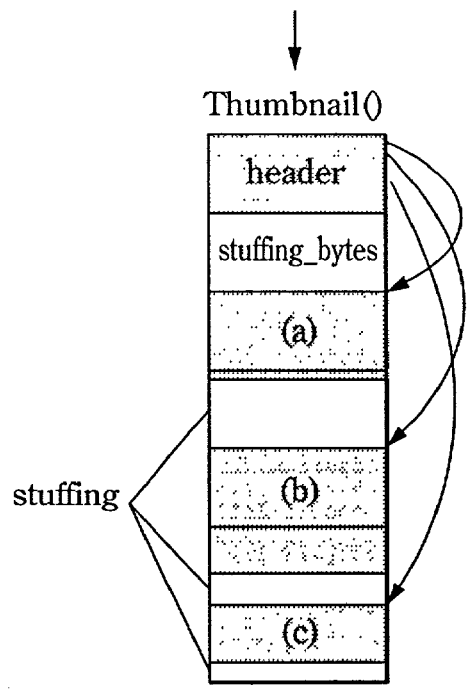
FIG.81 B

| SYNTAX | NUMBER OF BYTES | ABBREVIATION |
|---|---|---|
| source_packet() { | | |
|     TP_extra_header() | | |
|     transport_packet() | | |
| } | | |

FIG.85

| SYNTAX | NUMBER OF BYTES | ABBREVIATION |
|---|---|---|
| TP_extra_header() { | | |
|     copy_permission_indicator | 2 | uimsbf |
|     arrival_time_stamp | 30 | uimsbf |
| } | | |

FIG.86

| copy_permission_indicator | MEANING |
|---|---|
| 00 | copy free |
| 01 | no more copy |
| 10 | copy once |
| 11 | copy prohibited |

FIG.87

| SYNTAX | NUMBER OF BYTES | ABBREVIATION |
|---|---|---|
| xxxxx.rpls / yyyyy.vpls { | | |
|     version_number | 8*4 | bslbf |
|     PlayList_start_address | 32 | uimsbf |
|     PlayListMark_start_address | 32 | uimsbf |
|     MakersPrivateData_start_address | 32 | uimsbf |
|     reserved_for_future_use | 160 | bslbf |
|     UIAppInfoPlayList() | | |
|     for (i=0;i<N1;i++){ | | |
|         padding_word | 16 | bslbf |
|     } | | |
|     PlayList() | | |
|     for (i=0;i<N2;i++){ | | |
|         padding_word | 16 | bslbf |
|     } | | |
|     PlayListMark() | | |
|     for (i=0;i<N3;i++){ | | |
|         padding_word | 16 | bslbf |
|     } | | |
|     MakersPrivateData() | | |
|     for (i=0;i<N4;i++){ | | |
|         padding_word | 16 | bslbf |
|     } | | |
| } | | |

FIG.98

| SYNTAX | NUMBER OF BYTES | ABBREVIATION |
|---|---|---|
| UIAppInfoPlayList() { | | |
| length | 32 | uimsbf |
| PlayList_service_type | | |
| PlayList_character_set | 8 | uimsbf |
| reserved_for_word_align | 3 | bslbf |
| playback_control_flag | 1 | uimsbf |
| write_protect_flag | 1 | uimsbf |
| is_played_flag | 1 | uimsbf |
| archive | 2 | uimsbf |
| record_time_and_date | 4*14 | bslbf |
| duration | 4*6 | bslbf |
| maker_ID | 16 | uimsbf |
| maker_model_code | 16 | uimsbf |
| ref_thumbnail_index | 16 | uimsbf |
| reserved | 7 | bslbf |
| rp_info_valid_flag | 1 | uimsbf |
| rp_ref_to_PlayItem_id | 16 | uimsbf |
| rp_time_stamp | 32 | uimsbf |
| channel_number | 16 | uimsbf |
| reserved_for_word_align | 8 | bslbf |
| channel_name_length | 8 | uimsbf |
| channel_name | 8*20 | bslbf |
| PlayList_name_length | 8 | uimsbf |
| PlayList_name | 8*255 | bslbf |
| PlayList_detail_length | 16 | uimsbf |
| PlayList_detail | 8*1200 | bslbf |
| } | | |

FIG.99

| SYNTAX | NUMBER OF BYTES | ABBREVIATION |
|---|---|---|
| PlayList() { | | |
|     length | 32 | uimsbf |
|     reserved_for_word_align | 15 | bslbf |
|     CPI_type | 1 | bslbf |
|     number_of_PlayItems | 16 | uimsbf |
|     if (<*Vertual PlayList*> && CPI_type==0){ | | |
|         number_of_SubPlayItems | 16 | uimsbf |
|     }else{ | | |
|         reserved_for_word_align | 16 | bslbf |
|     } | | |
|     for (*PlayItem_id*=0;<br>        *PlayItem_id*<*nymber_of_PlayItems*;<br>        *PlayItem_id*++){ | | |
|         PlayItem() | | |
|     } | | |
|     if (<*Virtual PlayList*>&& CPI_type==0){ | | |
|         for (i=0; i<*number_of_SubPlayItems*; i++) | | |
|         SubPlayItem() | | |
|         } | | |
|     } | | |
| } | | |

FIG.100

| SYNTAX | NUMBER OF BYTES | ABBREVIATION |
|---|---|---|
| SubPlayItem () { | | |
|     length | 16 | uimsbf |
|     Clip_Information_file_name | 8*10 | bslbf |
|     SubPath_type | 8 | bslbf |
|     STC_sequence_id | 8 | uimsbf |
|     SubPath_IN_time | 32 | uimsbf |
|     SubPath_OUT_time | 32 | uimsbf |
|     sync_PlayItem_id | 16 | uimsbf |
|     sync_start_PTS_of_PlayItem | 32 | uimsbf |
| } | | |

FIG.101

INFORMATION PROCESSING APPARATUS AND METHOD, PROGRAM, AND RECORDED MEDIUM

TECHNICAL FIELD

This invention relates to an information processing method and apparatus, a program and a recording medium. More particularly, it relates to an information processing method and apparatus, a program and a recording medium for recording a file including the information indicated for explanation on the GUI, the information on the main reproducing path, the information on the subsidiary reproducing path, connection information between respective reproducing domains making up the main reproducing path, or the information on bookmarks or resume points useful for the user to set a desired scene.

BACKGROUND ART

Recently, a variety of types of optical discs have been proposed as a recording medium that can be removed from a recording apparatus. These recordable optical discs have been proposed as a large capacity medium of several GBs and are thought to be promising as a medium for recording AV (audio visual) signals. Among the sources (supply sources) of digital AV signals, recorded on the recordable optical disc, there are, for example, CS digital satellite broadcast and BS digital broadcast. For future use, ground wave television broadcast of the digital system has also been proposed.

It should be noted that digital video signals, furnished from these sources, are routinely compressed in accordance with MPEG (Moving picture Experts Group) 2 system. For the recording apparatus, a recording rate proper to the apparatus is set. If digital video signals, derived from the digital broadcast, are recorded by a conventional video storage medium for domestic use, in accordance with an analog recording system, digital video signals are first decoded and subsequently band-limited for recording. Alternatively, with the digital recording system, exemplified first of all by MPEG1 video, MPEG2 video or DV system, the digital video signals are once decoded and subsequently re-encoded in accordance with the recording rate and a encoding system proper to the apparatus for recording.

However, with such recording method, in which the bitstream furnished is once decoded and subsequently bandwidth-limited or re-encoded prior to recording, the picture quality is necessarily deteriorated. If, in recording compressed digital signals, the transmission rate for input digital signals is not higher than the recording rate of the recording and/or reproducing apparatus, such a method in which the bitstream furnished is directly recorded without decoding or re-encoding suffers from picture quality deterioration to the least extent. However, if the transmission rate of the compressed digital signals exceeds the recording rate of the disc as the recording medium, it is truly necessary to first decode the digital signals in the recording and/or reproducing apparatus and to re-encode the digital signals for recording so that the transmission rate will be not higher than the upper limit of the recording rate of the disc.

If the signals being transmitted in accordance with a variable rate system in which the bitrate of the input digital signals is increased or decreased with time, the capacity of the recording medium can be exploited less wastefully in such a disc recording system in which data can be stored once in a buffer and recorded in a burst-like fashion than with a recording system in which the rotary head is of a fixed rpm and hence the recording rate is a fixed recording rate.

In the near future when digital broadcast becomes the mainstream, it may be premeditated that there is a positive demand for such a recording and/or reproducing apparatus in which aired signals are recorded in the state of digital signals, without decoding or re-encoding, as in the case of a data streamer, and in which a disc is used as a recording medium.

Meanwhile, in recording an AV stream data on a recording medium by the above-described recording apparatus, an AV stream data may be analyzed to enable fast replay to detect the position of an I-picture to effect recording such as to enable accessing an I-picture. Alternatively, the AV stream may be directly recorded without analysis.

In such case, the conventional practice has been to provide respective dedicated application programs by means of which the AV stream is recorded on the recording medium as AV streams of different formats. The result is that development of an application program tends to be costly and time-consuming. In the AV streams recorded in respective application programs, the format is different, from one AV stream to another, with the result that the respective AV streams cannot be reproduced on the same apparatus because of lack of compatibility.

In addition, the conventional recording apparatus has a drawback that audio data, for example, are difficult to post-record.

DISCLOSURE OF THE INVENTION

It is therefore an object of the present invention to provide an arrangement in which an AV stream capable of performing high speed recording and an AV stream incapable of performing high speed recording can be supervised in common.

It is another object of the present invention to provide an arrangement in which post-recording is possible.

An information processing apparatus for recording AV stream data on a recording medium includes first generating means for generating a first table describing the relation of correspondence between presentation time stamp and an address in the AV stream data of a corresponding access unit, or a second table describing the relation of correspondence between arrival time stamp derived from the arrival time point of a transport packet and an address in the AV stream data of a corresponding transport packet, and a recorder for recording one of the first table and the second table, as selected depending on a recording method, on the recording medium along with the AV stream data.

The first table may be EP_map and the second table may be TU_map.

The controller may select the second table in case of non-cognizant recording.

The controller may select the first table in case of self encoding recording.

The controller may select the first table in case of cognizant recording.

The controller may generate identification information indicating which of the first and second tables have been recorded and the recorder may memorize the identification information.

The controller manages control so that, if the first table is recorded along with the AV stream data, the reproduction domain specifying information expresses the time information of the reproduction domain of the AV stream data on the presentation time basis, and so that, if the second table is recorded along with the AV stream data, the reproduction domain specifying information expresses the time information of the reproduction domain of the AV stream data on the arrival time basis.

If the first table is recorded along with the AV stream data, the reproduction specifying information expresses the time information of the reproduction domain of the AV stream data on the presentation time basis. If the second table is recorded along with the AV stream data, the reproduction specifying information expresses the time information of the reproduction domain of the AV stream data on the arrival time basis.

The present invention also provides an information processing method for recording AV stream data on a recording medium including a generating step of generating a first table describing the relation of correspondence between presentation time stamp and an address in the AV stream data of a corresponding access unit, or a second table describing the relation of correspondence between arrival time stamp derived from the arrival time point of a transport packet and an address in the AV stream data of a corresponding transport packet, and a recording step of recording one of the first table and the second table, as selected depending on a recording method, on the recording medium along with the AV stream data.

The present invention also provides a recording medium having recorded thereon a computer-readable program for an information processing apparatus recording AV stream data on a recording medium, in which the program includes a generating step of generating a first table describing the relation of corresponding between presentation time stamp and an address in the AV stream data corresponding access unit, or a second table describing the relation of correspondence between arrival time stamp derived from the arrival time point of a transport packet and an address in the AV stream data of a corresponding transport packet, and a recording step of recording one of the first table and the second table, as selected depending on a recording method, on the recording medium along with the AV stream data.

The present invention also provides a program for having a computer, controlling an information processing apparatus recording AV stream data on a recording medium, execute a generating step of generating a first table describing the relation of correspondence between presentation time stamp and an address in the AV stream data of a corresponding access unit, or a second table describing the relation of correspondence between arrival time stamp derived from the arrival time point of a transport packet and an address in the AV stream data of a corresponding transport packet, and a recording step of recording one of the first table and the second table, as selected depending on a recording method, on the recording medium along with the AV stream data.

The present invention also provides an information processing apparatus for reproducing AV stream data from a recording medium including reproducing unit for reproducing one of a first table describing the relation of correspondence between presentation time stamp and an address in the AV stream data of a corresponding access unit and a second table describing the relation of correspondence between arrival time stamp derived from the arrival time point of a transport packet and an address in the AV stream data of a corresponding transport packet, from the recording medium, which has the first table or the second table recorded thereon depending on a recording method, and control unit for controlling the outputting of the AV stream data based on the reproduced table.

The present invention also provides an information processing method for reproducing AV stream data from a recording medium including a reproducing step of reproducing one of a first table describing the relation of correspondence between presentation time stamp and an address in the AV stream data of a corresponding access unit and a second table describing the relation of correspondence between arrival time stamp derived from the arrival time point of a transport packet and an address in the AV stream data of a corresponding transport packet, from the recording medium, which has the first table or the second table recorded thereon depending on a recording method, and a controlling step of controlling the outputting of the AV stream data based on the reproduced table.

The present invention also provides a recording medium having recorded thereon a computer-readable program for an information processing apparatus recording AV stream data on a recording medium, in which the program includes a reproducing step of reproducing one of a first table describing the relation of correspondence between presentation time stamp and an address in the AV stream data of a corresponding access unit and a second table describing the relation of correspondence between arrival time stamp derived from the arrival time point of a transport packet and an address in the AV stream data of a corresponding transport packet, from the recording medium, which has the first table or the second table recorded thereon depending on a recording method, and a controlling step of controlling the outputting of the AV stream data based on the reproduced table.

The present invention also provides a program for having a computer, controlling an information processing apparatus recording AV stream data on a recording medium, execute a reproducing step of reproducing one of a first table describing the relation of correspondence between presentation time stamp and an address in the AV stream data of a corresponding access unit and a second table describing the relation of correspondence between arrival time stamp derived from the arrival time point of a transport packet and an address in the AV stream data of a corresponding transport packet, from the recording medium, having the first table or the second table recorded thereon depending on a recording method, and a controlling step of controlling the outputting of the AV stream data based on the reproduced table.

The present invention also provides a recording medium having recorded thereon one of a first table describing the relation of correspondence between presentation time stamp and an address in the AV stream data of a corresponding access unit and a second table describing the relation of correspondence between arrival time stamp derived from the arrival time point of a transport packet and an address in the AV stream data of a corresponding transport packet, depending on a recording method.

The present invention also provides an information processing apparatus for recording AV stream data on a recording medium including generating means for generating the reproduction specifying information made up of the first information indicating a main reproducing path and the second information indicating a subsidiary reproducing path, and recording means for recording the AV stream data and the reproduction specifying information on the recording medium.

The main reproducing path may be a path for the post-recording of audio data.

The first information may be main path and the second information may be the Sub-path.

The second information may include the type information indicating the type of the subsidiary reproducing information, a filename of the AV stream referenced by the subsidiary reproducing path, in- and out-points of the AV stream of the subsidiary reproducing path and the time on the main path at which the in-point of the reproducing path starts in synchronization on the time axis of the main path.

The present invention also provides an information processing method for an information processing apparatus recording AV stream data on a recording medium, including a generating step of generating the reproduction specifying information made up of the first information indicating a main reproducing path and the second information specifying a subsidiary reproducing path reproduced in synchronism with the main reproducing path, and a recording step of recording the AV stream data and the reproduction specifying information on the recording medium.

The present invention also provides a recording medium having recorded thereon a computer-readable program for an information processing apparatus recording AV stream data on a recording medium, in which the program includes a generating step of generating the reproduction specifying information made up of the first information indicating a main reproducing path and the second information specifying a subsidiary reproducing path reproduced in synchronism with the main reproducing path, and a recording step of recording the AV stream data and the reproduction specifying information on the recording medium.

The present invention also provides a program for having a computer, controlling an information processing apparatus recording AV stream data on a recording medium, execute a generating step of generating the reproduction specifying information made up of the first information indicating a main reproducing path and the second information specifying a subsidiary reproducing path reproduced in synchronism with the main reproducing path, and a recording step of recording the AV stream data and the reproduction specifying information on the recording medium.

The present invention also provides an information processing apparatus for reproducing AV stream data from a recording medium including reproducing means for reproducing, from the recording medium, reproduction specifying information made up of the first information indicating a main reproducing path and the second information specifying a subsidiary reproducing path reproduced in synchronism with the main reproducing path, and control means for controlling the outputting of the AV stream data based on the reproduced reproduction specifying information.

The present invention also includes an information processing method for reproducing AV stream data from a recording medium including a reproducing step of reproducing, from the recording medium, reproduction specifying information made up of the first information indicating a main reproducing path and the second information specifying a subsidiary reproducing path reproduced in synchronism with the main reproducing path, and a controlling step of controlling the outputting of the AV stream data based on the reproduced reproduction specifying information.

The present invention also provides a recording medium having recorded thereon a computer-readable program for an information processing apparatus recording AV stream data on a recording medium, in which the program includes a reproducing step of reproducing, from the recording medium, reproduction specifying information made up of the first information indicating a main reproducing path and the second information specifying a subsidiary reproducing path reproduced in synchronism with the main reproducing path, and a controlling step of controlling the outputting of the AV stream data based on the reproduced reproduction specifying information.

The present invention also provides a program for having a computer, controlling an information processing apparatus recording AV stream data on a recording medium, execute a reproducing step of reproducing, from the recording medium, the reproduction specifying information made up of the first information indicating a main reproducing path and the second information specifying a subsidiary reproducing path reproduced in synchronism with the main reproducing path, and a controlling step of controlling the outputting of the AV stream data based on the reproduced reproduction specifying information.

The recording medium according to the present invention has recorded thereon the reproduction specifying information made up of the first information indicating a main reproducing path and the second information specifying a subsidiary reproducing path reproduced in synchronism with the main reproducing path.

In the information recording and/or reproducing method and apparatus, program for a recording medium, program, and in the recording medium, according to the present invention, one of the first table describing the first table describing the relation of correspondence between presentation time stamp and an address in the AV stream data of a corresponding access unit and a second table describing the relation of correspondence between arrival time stamp derived from the arrival time point of a transport packet and an address in the AV stream data of a corresponding transport packet is recorded depending on a recording method.

In the information processing method and apparatus, program for a recording medium and the program, according to the present invention, one of a first table describing the relation of correspondence between presentation time stamp and an address in the AV stream data of a corresponding access unit and a second table describing the relation of correspondence between arrival time stamp derived from the arrival time point of a transport packet and an address in the AV stream data of a corresponding transport packet, is reproduced from the recording medium, which has the first table or the second table recorded thereon, depending on a recording method, and the outputting is controlled accordingly.

In the information processing method and apparatus, program for a recording medium, program and the second recording medium, according to the present invention, the reproduction specifying information comprised of the first information indicating the main reproducing path and the second information indicating the subsidiary reproduction path reproduced in synchronism with the main reproducing path is recorded.

In the information processing method and apparatus, program for a recording medium, and the program, according to the present invention, the reproduction specifying information comprised of the first information indicating the main reproducing path and the second information indicating the subsidiary reproduction path reproduced in synchronism with the main reproducing path is reproduced to control the outputting accordingly.

Other objects, features and advantages of the present invention will become more apparent from reading the embodiments of the present invention as shown in the drawings.

BRIEF DESCRIPTION OF THE DRAWINGS

FIG. 15 illustrates a syntax of infr.dvr.

FIG. 16 shows a syntax of DVRVolume.

FIG. 17 shows a syntax of ResumeVolume.

FIG. 18 shows a syntax of UIAppInfoVolume.

FIG. 19 shows a table of character set values.

FIG. 20 shows a syntax of TableOfPlayList.

FIG. 21 shows another syntax of TableOfPlayList.

FIG. 22 shows a syntax of the MakersPrivateData.

FIG. 23 shows a syntax of xxxx.rpls and yyyy.vpls.

FIG. 25 shows a syntax of PlayList.

FIG. 26 shows a table of PlayList_type.

FIG. 27 shows a syntax of UIAppInfoPlayList.

FIGS. 28A to 28C illustrate flags in the UIAppInfoPlayList syntax shown in FIG. 27.

FIG. 32 shows a syntax of the PlayItem.

FIG. 33 illustrates IN-time.

FIG. 34 illustrates OUT-time.

FIG. 35 shows a table of Connection_Condition.

FIG. 38 shows a syntax of BridgeSequenceInfo.

FIG. 40 shows a syntax of SubPlayItem.

FIG. 41 shows a table of Mark_type.

FIG. 42 shows a syntax of PlayListMark.

FIG. 43 shows a table of Mark_type.

FIG. 44 illustrates Mark_time_stamp.

FIG. 45 shows a syntax of zzzzz.clip.

FIG. 46 shows a syntax of ClipInfo.

FIG. 47 shows a table of Clip_stream_type.

FIG. 52 shows a syntax of STC_Info.

FIG. 54 shows a syntax of ProgramInfo.

FIG. 55 shows a syntax of VideoCondingInfo.

FIG. 56 shows a table of Video_format.

FIG. 57 shows a table of frame_rate.

FIG. 58 shows a table of display_aspect_ratio.

FIG. 59 shows a syntax of AudoCondingInfo.

FIG. 60 shows a table of audio_coding.

FIG. 61 shows a table of audio_component_type.

FIG. 62 shows a table of sampling_frequency.

FIG. 65 shows a syntax of CPI.

FIG. 66 shows a table of CPI_type.

FIG. 67 illustrates video EP_map.

FIG. 70 shows a syntax of EP_map.

FIG. 71 shows a table of EP_typevalues.

FIG. 72 shows a syntax of EP_map_for_one_stream_PID.

FIG. 74 shows a syntax of TU_map.

FIG. 75 shows a syntax of ClipMark.

FIG. 76 shows a table of Mark_type.

FIG. 77 shows a table of Mark_type_stamp.

FIG. 78 shows a syntax of menu.thmb and mark.thmb.

FIG. 79 shows the syntax of thumbnail.

FIG. 80 shows a table of thumbnail_picture_format.

FIGS. 81A and 81B illustrate tn_block.

FIG. 85 shows the syntax of a source packet.

FIG. 86 shows the syntax of TP_extra_header.

FIG. 87 shows a table of a copy permission indicator.

FIG. 98 shows the syntax of a PlayList file.

FIG. 99 shows the syntax of UIAppInfoPlayList in the PlayList file of FIG. 98.

FIG. 100 shows the syntax of the PlayList( ) in the PlayList file of FIG. 98.

FIG. 101 shows the syntax of SubPlayItem.

BEST MODE FOR CARRYING OUT THE INVENTION

Figure 1:
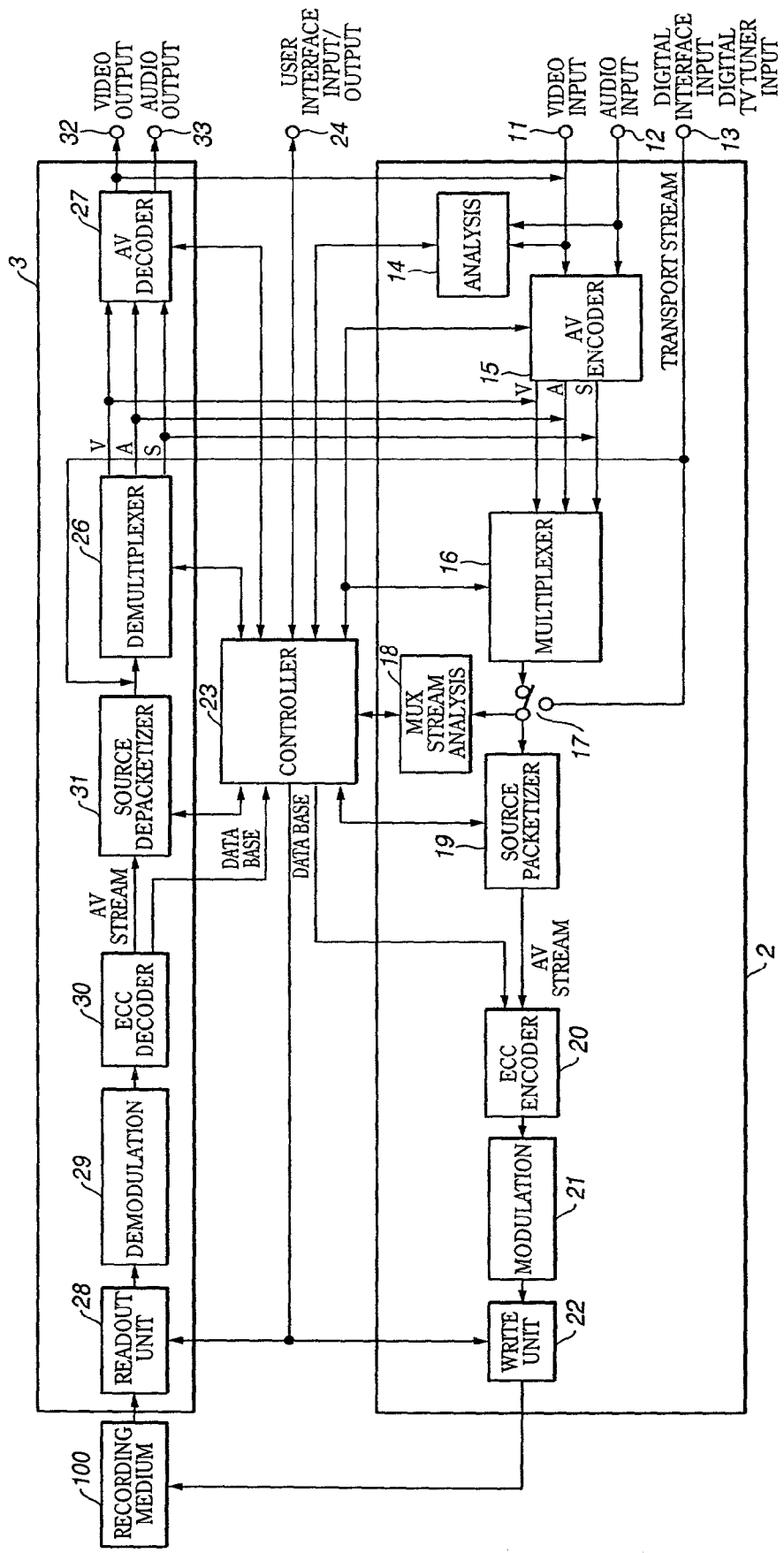
FIG. 1 shows a configuration of an embodiment of a recording and/or reproducing apparatus according to the present invention.

Referring to the drawings, present embodiment of the present invention will be explained in detail. FIG. 1 shows a typical inner structure of a recording and/or reproducing apparatus 1 embodying the present invention. First, the structure of a recording unit 2, configured for recording signals input from outside, is explained. The recording and/or reproducing apparatus 1 is configured for being fed with and recording analog or digital data.

Analog video signals and analog audio signals are fed to terminals 11, 12, respectively. The video signals, input to the terminal 11, are output to an analysis unit 14 and to an AV encoder 15. The audio signals, input to the terminal 12, are output to the analysis unit 14 and to the AV encoder 15. The analysis unit 14 extracts feature points, such as scene changes, from the input video and audio signals.

The AV encoder 15 encodes input video and audio signal to output the system information (S), such as an encoded video stream (V), an encoded audio stream (A) and AV synchronization, to a multiplexer 16.

The encoded video stream is a video stream encoded e.g., with the MPEG (Moving Picture Expert Group) 2 system, whilst the encoded audio stream is an audio stream encoded in accordance with the MPEG1 system, with the encoded audio stream being e.g., an audio stream encoded in e.g., the MPEG1 system or an audio stream encoded in accordance with the Dolby AC3 (trademak) system. The multiplexer 16 multiplexes the input video and audio streams, based on the input system information, to output a multiplexed stream through a switch 17 to a multiplexed stream analysis unit 18 and to a source packetizer 19.

The multiplexed stream is e.g., an MPEG-2 transport stream or an MPEG2 program stream. The source packetizer 19 encodes the input multiplexed stream into an AV stream composed of source packets in accordance with an application format of a recording medium 100 on which to record the stream. The AV stream is processed in ECC (error correction and coding) unit 20 and a modulation unit 21 with appendage of ECC codes and with modulation, before being output to a write unit 22, which then writes (records) an AV stream file based on a control signals output by the controller 23.

The transport stream, such as digital television broadcast, input from a digital interface or a digital television tuner, is input to a terminal 13. There are two recording systems for recording the transport stream input to the terminal 13, one being a transparent recording system and the other being a system in which recording is preceded by re-encoding aimed to lower e.g., the recording bit rate. The recording system command information is input from a terminal 24 as a user interface to a controller 23.

In the transparent recording of the input transport stream, a transport stream, input to a terminal 13, is output through a switch 17 to a multiplexed stream analysis unit 18 and to the source packetizer 19. The ensuing processing of recording an AV stream on a recording medium is the same as that of encoding and recording analog input audio and video signals, as described above, and hence is not explained here for simplicity.

If the input transport stream is re-encoded and subsequently recorded, the transport stream, input to the terminal 13, is fed to a demultiplexer 26, which demultiplexes the input transport stream to extract a video stream (V), an audio stream (A) and the system information (S).

Of the stream (information), as extracted by the demultiplexer 26, the video stream is output to an audio decoder 27, whilst the audio stream and the system information are output to the multiplexer 16. The audio decoder 27 decodes the input transport stream to output the encoded video stream (V) to the multiplexer 16.

The audio stream and the system information, output from the demultiplexer 26 and input to the multiplexer 16, and the video stream, output by the AV encoder 15, are multiplexed, based on the input system information, and output to the multiplexed stream analysis unit 18 and to the source packetizer 19 through switch 17, as a multiplexed stream. The ensuing processing of recording an AV stream on a recording medium is the same as that of encoding and recording analog input audio and video signals, as described above, and hence is not explained here for simplicity.

The recording and/or reproducing apparatus 1 of the present embodiment records a file of the AV stream on the recording medium 100, while also recording the application database information which accounts for the file. The input information to the controller 23 is the feature information for the moving picture from the analysis unit 14, the feature information of the AV stream from the multiplexed stream analysis unit 18 and the user command information input at a terminal 24.

The feature information of the moving picture, supplied from the analysis unit 14, is generated by the analysis unit 14 when the AV encoder 15 encodes video signals. The analysis unit 14 analyzes the contents of the input video and audio signals to generate the information pertinent to the pictures characteristic of the input moving picture signals (clip mark). This information is the information indicating a picture of characteristic clip mark points, such as program start points, scene change points, CM commercial start and end points, title or telop in input video signals, and also includes a thumbnail of the picture and the information pertinent to stereo/monaural switching points and muted portions of audio signals.

The above picture indicating information is fed through controller 23 to the multiplexer 16. When multiplexing a encoded picture specified as clip mark by the controller 23, the multiplexer 16 returns the information for specifying the encoded picture on the AV stream to the controller 23. Specifically, this information is the PTS (presentation time stamp) of a picture or the address information on the AV stream of an encoded version of the picture. The controller 23 stores the sort of feature pictures and the information for specifying the encoded picture on the AV stream in association with each other.

The feature information of the AV stream from the multiplexed stream analysis unit 18 is the information pertinent to the encoding information of the AV stream to be recorded, and is recorded by an analysis unit 18. For example, the feature information includes the time stamp and address information of the I-picture in the AV stream, discontinuous point information of system time clocks, encoding parameters of the AV stream and change point information of the encoding parameters in the AV stream. When transparently recording the transport stream, input from the terminal 13, the multiplexed stream analysis unit 18 detects the picture of the aforementioned clip mark, from the input transport stream, and generates the information for specifying a picture designated by the clip mark and its type.

The user designation information from the terminal 24 is the information specifying the playback domain, designated by the user, character letters for explaining the contents of the playback domain, or the information such as bookmarks or resuming points set by the user for his or her favorite scene.

Based on the aforementioned input information, the controller 23 creates a database of the AV stream (Clip), a database of a group (PlayList) of playback domains (PlayItem) of the AV stream, management information of the recorded contents of the recording medium 100 (info.dvr) and the information on thumbnail pictures. Similarly to the AV stream, the application database information, constructed from the above information, is processed in the ECC unit 20 and the modulation unit 21 and input to the write unit 22, which then records a database file on the recording medium 100.

The above-described application database information will be explained subsequently in detail.

When the AV stream file recorded on the recording medium 100 (files of picture data and speech data) and the application database information, thus recorded on the recording medium 100, are reproduced by a reproducing unit 3, the controller 23 first commands a readout unit 28 to read out the application database information from the recording medium 100. The readout unit 28 reads out the application database information from the recording medium 100, which then reads out the application database information from the recording medium 100 to send the application database information through demodulation and error correction processing by a demodulating unit 29 and an ECC decoder 30 to the controller 23.

Based on the application database information, the controller 23 outputs a list of PlayList recorded on the recording medium 100 to a user interface of the terminal 24. The user selects the PlayList, desired to be reproduced, from the list of PlayLists. The information pertinent to PlayList, specified to be reproduced, is input to the controller 23. The controller 23 commands the readout unit 28 to read out the AV stream file necessary in reproducing the PlayList. In accordance with the command, the readout unit 28 reads out the corresponding AV stream from the recording medium 100 to output the read-out AV stream to the demodulating unit 29. The AV stream, thus input to the demodulating unit 29, is demodulated by preset processing and output through the processing by the ECC decoder 30 to a source depacketizer 31.

The source depacketizer 31 converts the AV stream of the application format, read out from the recording medium 100 and processed in a preset fashion, into a stream processable by the demultiplexer 26. The demultiplexer 26 outputs the system information (S), such as the video stream (V), audio stream (A) or the AV synchronization, forming the playback domain (PlayItem) of the AV stream specified by the controller 23, to the audio decoder 27, which AV decoder 27 decodes the video stream and the audio stream to output the playback video signal and the playback audio signal to associated terminals 32, 33, respectively.

If fed from the terminal 24, as a user interface, with the information instructing random access playback or special playback, the controller 23 determines the readout position of the AV stream from the recording medium 100, based on the contents of the database (Clip) of the AV stream, to command the readout unit 28 to read out the AV stream. If the PlayList as selected by the user is to be reproduced as from a preset time point, the controller 23 commands the readout unit 28 to read out data from an I-picture having a time stamp closest to the specified time point.

When the user has selected a certain clip mark from indexing points or scene change points for the program stored in the ClipMark in the Clip Information, as when the user selects a certain picture from a list of thumbnail pictures, as demonstrated on a user interface, of the indexing points or scene change points stored in the ClipMark, the controller 23 determines the AV stream readout position from the recording medium 100 to command the readout unit 28 to read out the AV stream. That is, the controller 23 commands the readout unit 28 to read out data from an I-picture having an address closest to the address on the AV stream which has stored the picture selected by the user. The readout unit 28 reads out data from the specified address. The read-out data is processed by the demodulating unit 29, ECC decoder 30 and by the source packetizer 19 so as to be supplied to the demultiplexer 26 and decoded by the audio decoder 27 to reproduce AV data indicated by an address of the mark point picture.

If the user has commanded fast forward playback, the controller 23 commands the readout unit 28 to sequentially read out I-picture data in the AV stream in succession based on the database (Clip) of the AV stream.

The readout unit 28 reads out data of the AV stream from a specified random access point. The so read-out data is reproduced through processing by various components on the downstream side.

The case in which the user edits the AV stream recorded on the recording medium 100 is now explained. If desired to specify a playback domain for the AV stream recorded on the recording medium 100, for example, if desired to create a playback route of reproducing a portion sung by a singer A from a song program A, and subsequently reproducing a portion sung by the same singer A from another song program B, the information pertinent to a beginning point (IN-point) and an end point (OUT-point) of the playback domain is input to the controller 23 from the terminal as a user interface. The controller 23 creates a database of the group (PlayList) of playback domains (PlayItem) of the AV streams.

When the user desires to erase a portion of the AV stream recorded on the recording medium 100, the information pertinent to the IN-point and the OUT-point of the erasure domain is input to the controller 23, which then modifies the database of the PlayList so as to refer to only the needed AV streams. The controller 23 also commands the write unit 22 to erase an unneeded stream portion of the AV stream.

The case in which the user desires to specify playback domains of an AV stream recorded on the recording medium to create a new playback route, and to interconnect the respective playback domains in a seamless fashion, is now explained. In such case, the controller 23 creates a database of a group (PlayList) of the playback domains (PlayItem) of the AV stream and undertakes to partially re-encode and re-multiplex the video stream in the vicinity of junction points of the playback domains.

The picture information at the IN-point and that at the OUT-point of a playback domain are input from a terminal 24 to a controller 23. The controller 23 commands the readout unit 28 to read out data needed to reproduce the pictures at the IN-point and at the OUT-point. The readout unit 28 reads out data from the recording medium 100. The data so read out is output through the demodulating unit 29, ECC decoder 30 and the source packetizer 19 to the demultiplexer 26.

The controller 23 analyzes data input to the demultiplexer 26 to determine the re-encoding method for the video stream (change of picture_coding_type and assignment of the quantity of encoding bits for re-encoding) and the re-multiplexing system to send the system to the AV encoder 15 and to the multiplexer 16.

The demultiplexer 26 then separates the input stream into the video stream (V), audio stream (A) and the system information (S). The video stream may be classed into data input to the audio decoder 27 and data input to the multiplexer 16. The former is data needed for re-encoding, and is decoded by the audio decoder 27, with the decoded picture being then re-encoded by the AV encoder 15 and thereby caused to become a video stream. The latter data is data copied from an original stream without re-encoding. The audio stream and the system information are directly input to the multiplexer 16.

The multiplexer 16 multiplexes an input stream, based on the information input from the controller 23, to output a multiplexed stream, which is processed by the ECC unit 20 and the modulation unit 21 so as to be sent to the write unit 22.

The write unit 22 records an AV stream on the recording medium 100 based on the control signals supplied from the controller 23.

Figure 2:
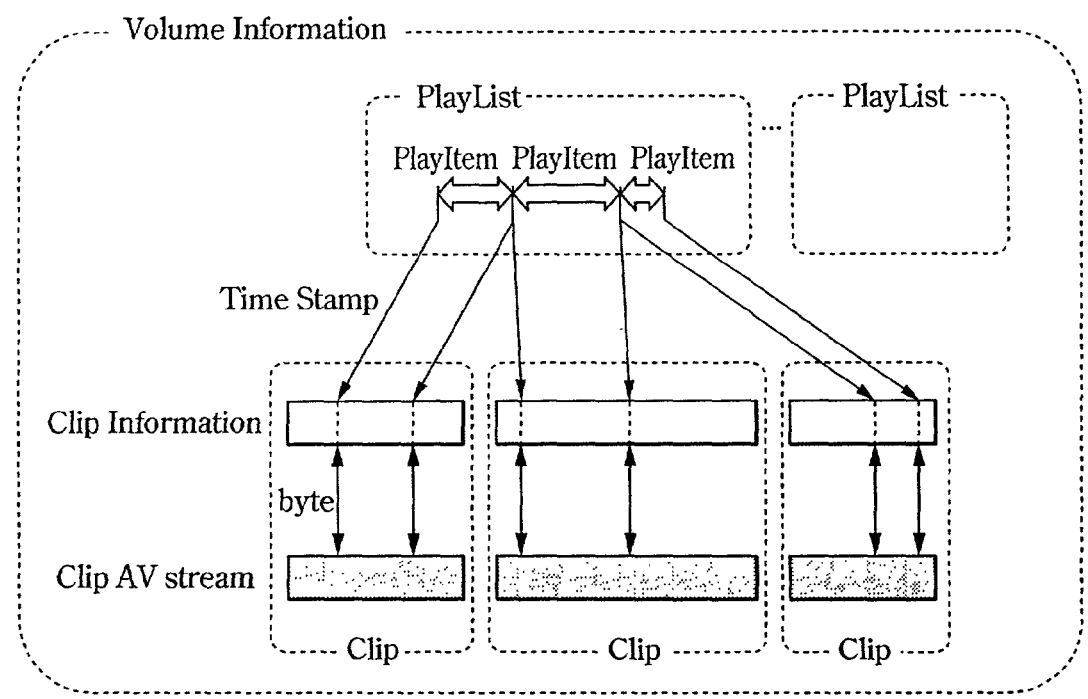
FIG. 2 illustrates the data format of data recorded on a recording medium by a recording and/or reproducing apparatus 1.

The application database information and the operation based on this information, such as playback and editing, are hereinafter explained. FIG. 2 shows the structure of an application format having two layers, that is PlayList and Clip, for AV stream management. The Volume Information manages all Clips and PlayLists in the disc. Here, one AV stream and the ancillary information thereof, paired together, is deemed to be an object, and is termed Clip. The AV stream file is termed a Clip AV stream file, with the ancillary information being termed the Clip Information file.

One Clip AV stream file stores data corresponding to an MPEG-2 transport stream arranged in a structure prescribed by the application format. By and large, a file is treated as a byte string. The contents of the Clip AV stream file are expanded on the time axis, with entry points in the Clip (I-picture) being mainly specified on the time basis. When a time stamp of an access point to a preset Clip is given, the Clip Information file is useful in finding the address information at which to start data readout in the Clip AV stream file.

Figure 3:
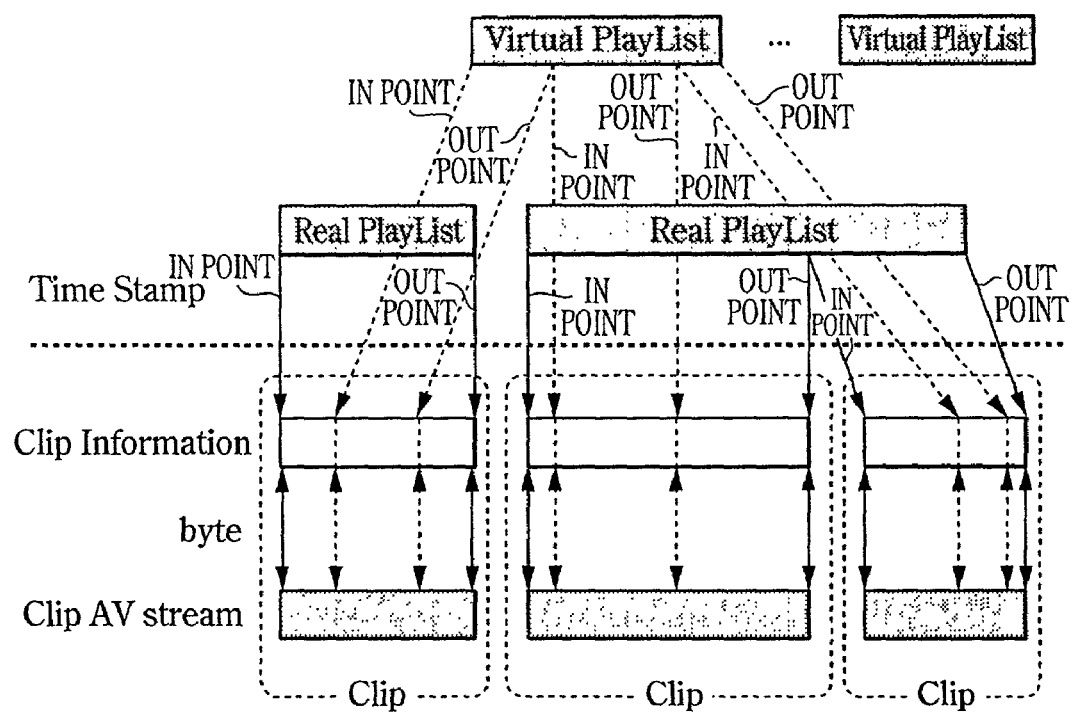
FIG. 3 illustrates Real PlayList and Virtual PlayList.

Referring to FIG. 3, PlayList is now explained, which is provided for a user to select a playback domain desired to be viewed from the Clip and to edit the playback domain readily. One PlayList is a set of playback domains in the Clip. One playback domain in a preset Clip is termed PlayItem and is represented by a pair of an IN-point and an OUT-point on the time axis. So, the PlayList is formed by a set of plural PlayItems.

The PlayList is classified into two types, one of which is Real PlayList and the other of which is Virtual PlayList. The Real PlayList co-owns stream portions of the Clip it is referencing. That is, the Real PlayList takes up in the disc the data capacity corresponding to a stream portion of the Clip it is referencing and, when Real PlayList is erased, the data of the stream portion of the Clip it is referencing is also erased.

The Virtual PlayList is not co-owning Clip data. Therefore, if the Virtual PlayList is changed or erased, the contents of the Clip are in no way changed.

Figure 4A:
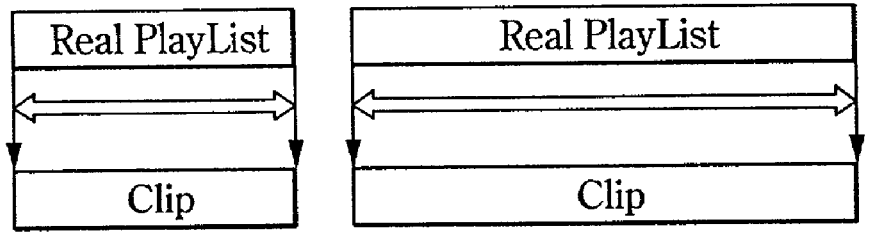
FIGS. 4A, 4B and 4C illustrate the creation of the Real PlayList.

The editing of the Real Playlist is explained. FIG. 4A shows creation of Real PlayList and, if the AV stream is recorded as a new Clip, the Real PlayList which references the entire Clip is a newly created operation.

Figure 4B:
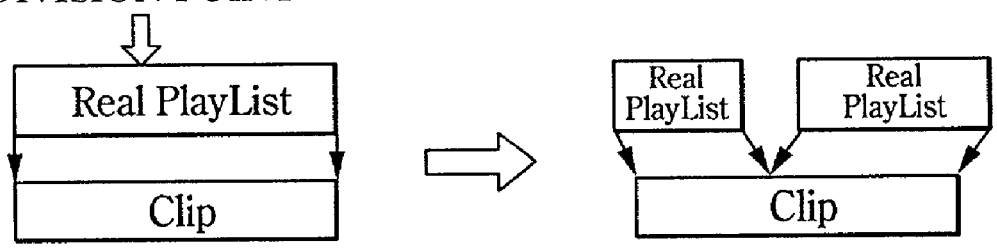

FIG. 4B shows the division of the real PlayList, that is the operation of dividing the Real PlayList at a desired point to split the Real PlayList in two Real PlayLists. This division operation is performed when two programs are managed in one clip managed by a sole PlayList and when the user intends to re-register or re-record the programs as separate individual programs. This operation does not lead to alteration of the Clip contents, that is to division of the Clip itself.

Figure 4C:
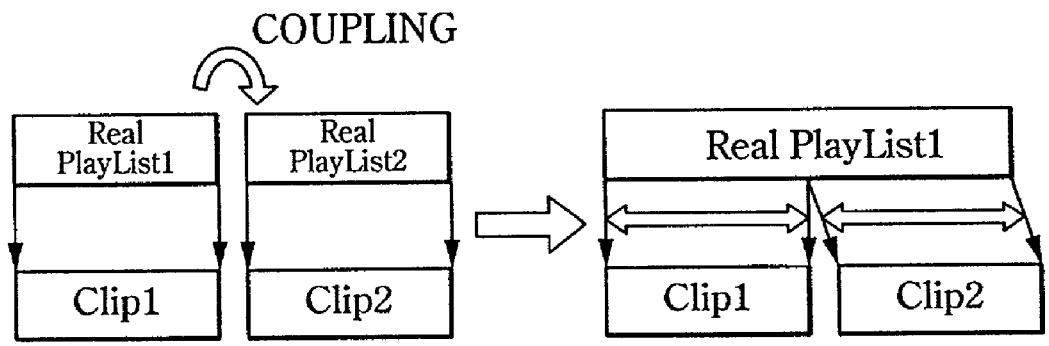

FIG. 4C shows the combining operation of the Real PlayList which is the operation of combining two Real PlayLists into one new Real PlayList. This combining operation is performed such as when the user desires to re-register two programs as a sole program. This operation does not lead to alteration of the Clip contents, that is to combining the clip itself into one.

Figure 5A:
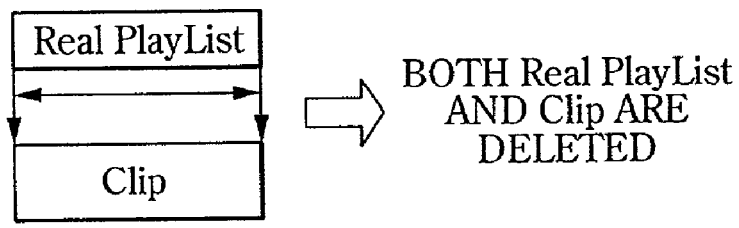
FIGS. 5A, 5B and 5C illustrate deletion of the Real PlayList.

FIG. 5A shows deletion of the entire Real PlayList. If the operation of erasing the entire preset Real PlayList, the associated stream portion of the Clip referenced by the deleted Real PlayList is also deleted.

Figure 5B:
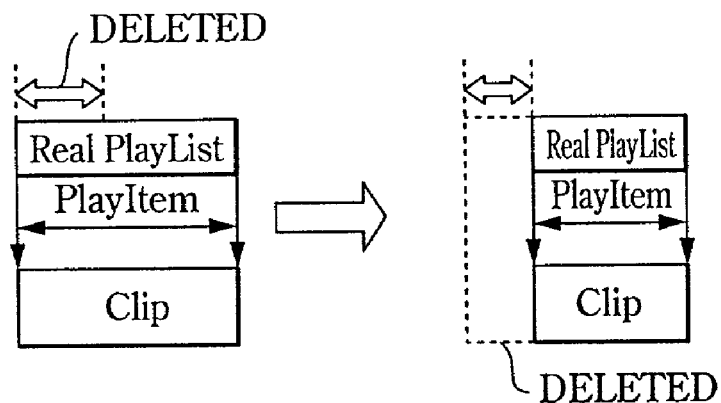

FIG. 5B shows partial deletion of the Real PlayList. If a desired portion of the Real PlayList is deleted, the associated PlayItem is altered to reference only the needed Clip stream portion. The corresponding stream portion of the Clip is deleted.

Figure 5C:
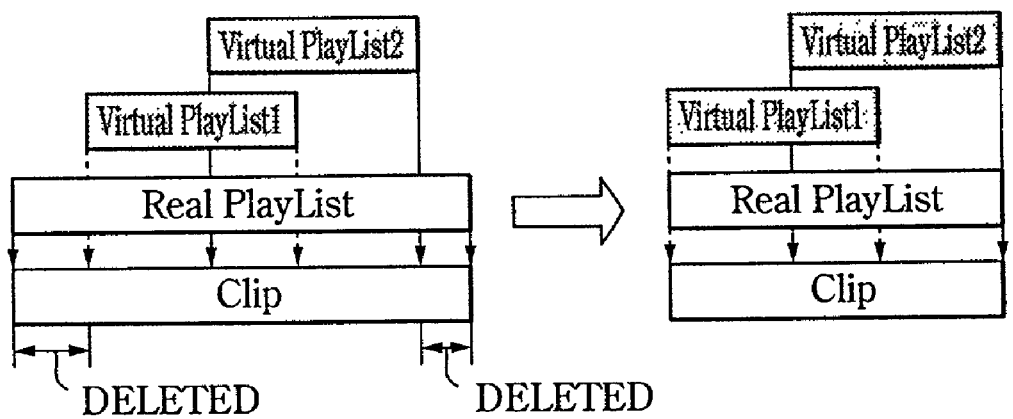

FIG. 5C shows the minimizing of the Real PlayList. It is an operation of causing the PlayItem associated with the Real PlayList to reference only the stream portion of the Clip needed for Virtual PlayList. The corresponding stream portion of the Clip not needed for the Virtual PlayList is deleted.

If the Real PlayList is changed by the above-described operation such that the stream portion of the Clip referenced by the Real PlayList is deleted, there is a possibility that the Virtual PlayList employing the deleted Clip is present such that problems may be produced in the Virtual PlayList due to the deleted Clip.

In order to prevent this from occurring, such a message which runs: "If there exists the Virtual PlayList referencing the stream portion of the Clip the Real PlayList is referencing, and the Real PlayList is deleted, the Virtual PlayList itself is deleted—is it all right?" is displayed for the user in response to the user's operation of deletion by way of confirmation or alarming, after which the processing for deletion is executed or cancelled subject to user's commands. Alternatively, the minimizing operation for the Real PlayList is performed in place of deleting the Virtual PlayList.

Figure 6A:
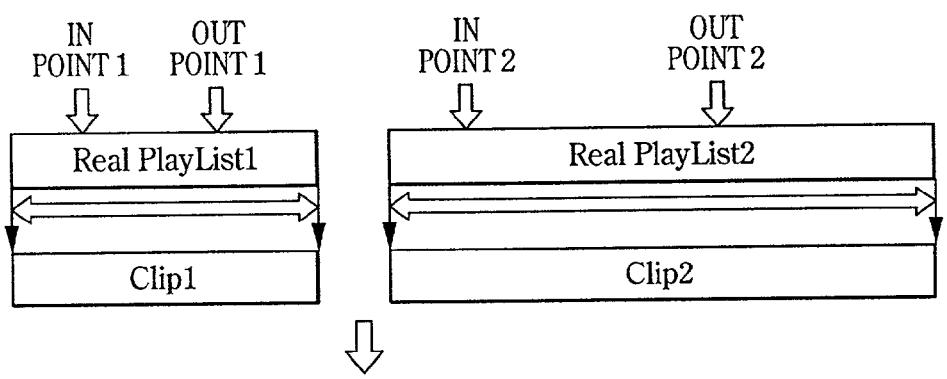
FIGS. 6A and 6B illustrate assemble editing.
Figure 6B:
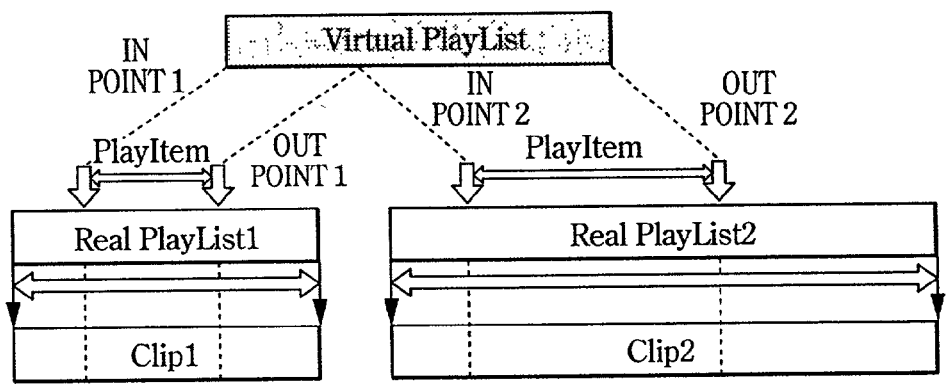

The operation for the Virtual PlayList is now explained. If an operation is performed for the Virtual PlayList, the contents of the Clip are not changed. FIGS. 6A and 6B show the assembling and editing (ON-OUT editing). It is an operation of creating PlayItem of the playback domain the user has desired to view to create Virtual PlayList. The seamless connection between PlayItems is supported by the application format, as later explained.

If there exist two Real PlayLists 1, 2 and clips 1, 2 associated with the respective Real PlayLists, the user specifies a preset domain in the Real PlayList 1 (domain from IN1 to OUT1: PlayItem 1) as the playback domain, and also specifies, as the domain to be reproduced next, a preset domain in the Real PlayList 2 (domain from IN2 to OUT2: PlayItem 2) as the playback domain, as shown in FIG. 6A, a sole Virtual PlayList made up of PlayItem 1 and the PlayItem2 is prepared, as shown in FIG. 6B.

The re-editing of the Virtual PlayList is now explained. The re-editing may be enumerated by alteration of IN- or OUT points in the Virtual PlayList, insertion or appendage of new PlayItems to the Virtual PlayList and deletion of PlayItems in the Virtual PlayList. The Virtual PlayList itself may also be deleted.

Figure 7:
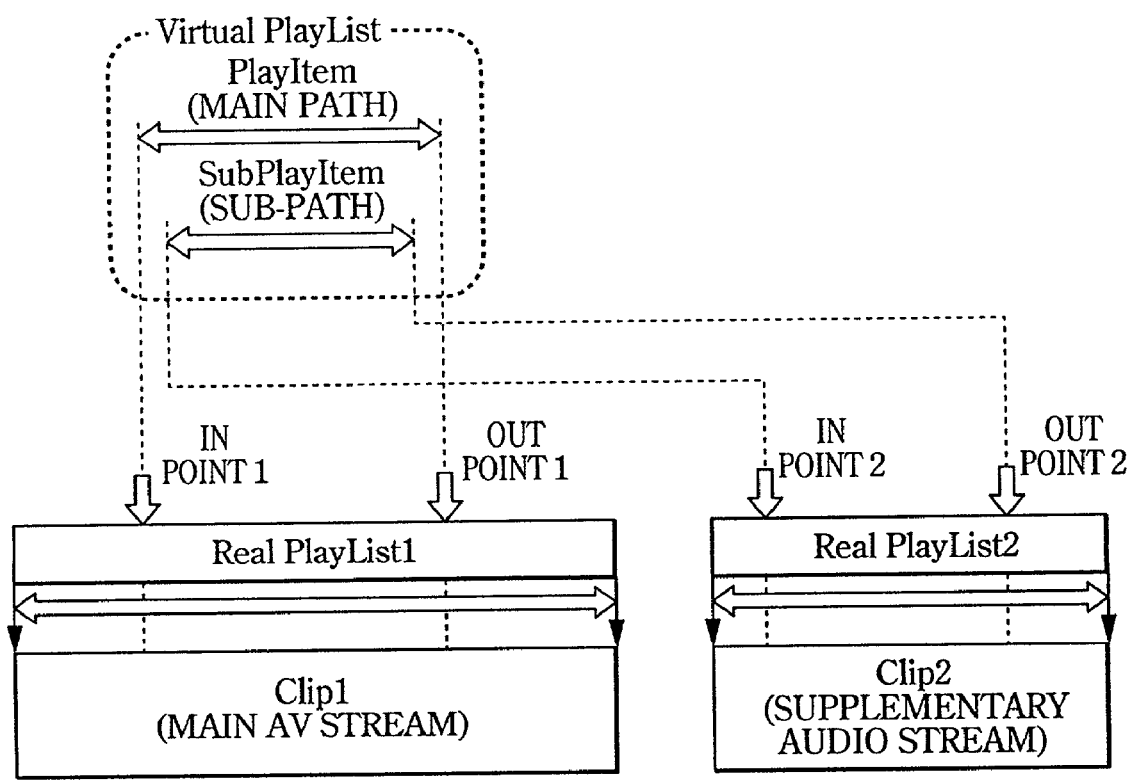
FIG. 7 illustrates provision of a sub path in the Virtual PlayList.

FIG. 7 shows the audio dubbing (post recording) to the Virtual PlayList. It is an operation of registering the audio post recording to the Virtual PlayList as a sub path. This audio post recording is supported by the application software. An additional audio stream is added as a sub path to the AV stream of the main path of the Virtual PlayList.

Figure 8:
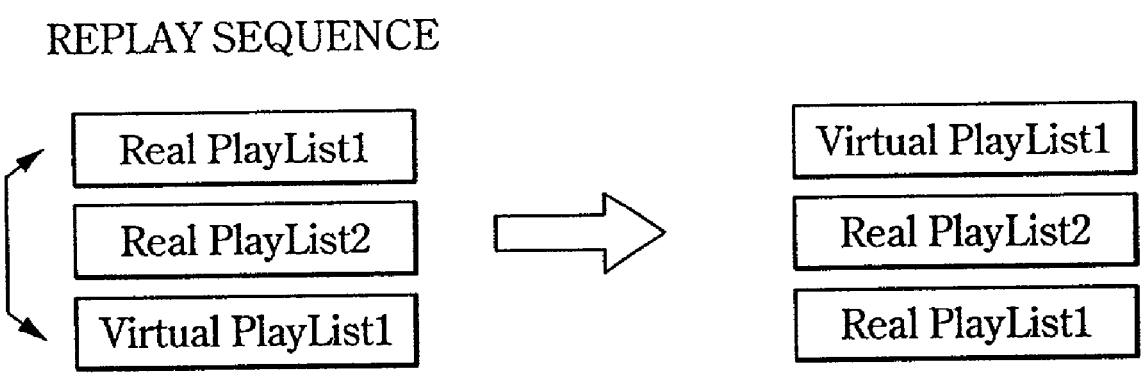
FIG. 8 illustrates the changing of the playback sequence of the PlayList.

Common to the Real PlayList and the Virtual PlayList is an operation of changing (moving) the playback sequence of the PlayList shown in FIG. 8. This operation is an alteration of the playback sequence of the PlayList in the disc (volume) and is supported by TableOfPlayList as defined in the application format, as will be explained subsequently with reference to e.g., FIG. 20. This operation does not lead to alteration of the Clip contents.

Figure 9:
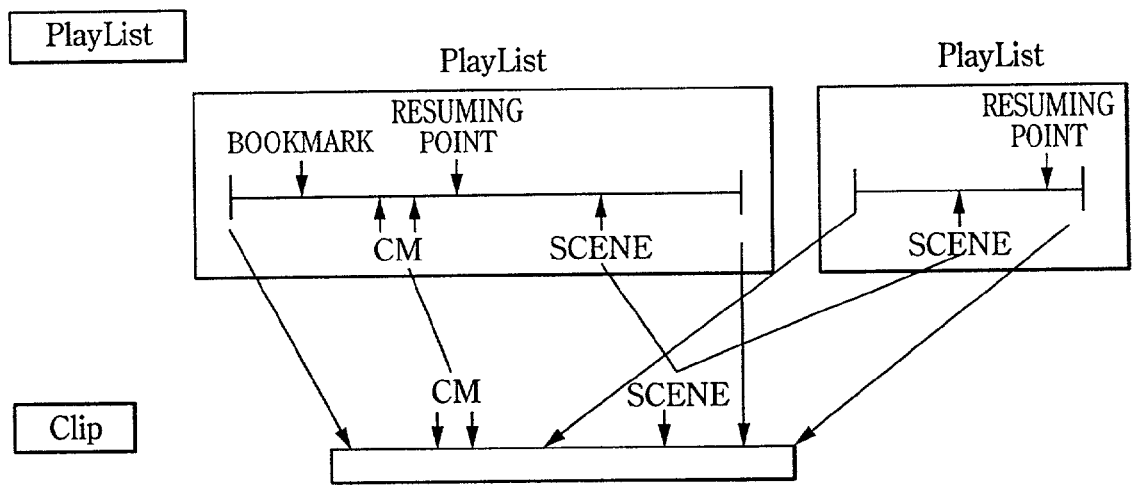
FIG. 9 illustrates a mark on the PlayList and a mark on the Clip.

The mark (Mark) is now explained. The mark is provided for specifying a highlight or characteristic time in the Clip and in the PlayList, as shown in FIG. 9. The mark added to the Clip is termed the ClipMark. The ClipMark is e.g., a program indexing point or a scene change point for specifying a characteristic scene ascribable to contents in the AV stream. The ClipMark is generated by e.g., the analysis unit 14 of FIG. 1. When the PlayList is reproduced, the mark of the Clip referenced by the PlayList may be referenced and used.

The mark appended to the PlayList is termed the PlayListMark (play list mark). The PlayListMark is e.g., a bookmark point or a resuming point as set by the user. The setting of the mark to the Clip and to the PlayList is by adding a time stamp indicating the mark time point to the mark list. On the other hand, mark deletion is removing the time stamp of the mark from the mark list. Consequently, the AV stream is in no way changed by mark setting or by mark deletion.

As another format of the ClipMark, a picture referenced by the ClipMark may be specified on the address basis in the AV stream. Mark setting on the Clip is by adding the address basis information indicating the picture of the mark point to the mark list. On the other hand, mark deletion is removing the address basis information indicating the mark point picture from the mark list. Consequently, the AV stream is in no way changed by mark setting or by mark deletion.

A thumbnail is now explained. The thumbnail is a still picture added to the Volume, PlayList and Clip. There are two sorts of the thumbnail, one of them being a thumbnail as a representative picture indicating the contents. This is mainly used in a main picture in order for the user to select what the or she desired to view on acting on a cursor, not shown. Another sort of the thumbnail is a picture indicating a scene pointed by the mark.

The Volume and the respective PlayLists need to own representative pictures. The representative pictures of the Volume are presupposed to be used for initially demonstrating a still picture representing the disc contents when the disc is set in position in the recording and/or reproducing apparatus 1. It is noted that the disc means the recording medium 100 which is presupposed to be a of disc shape. The representative picture of the PlayList is presupposed to be used as a still picture for representing PlayList contents.

Figure 10:
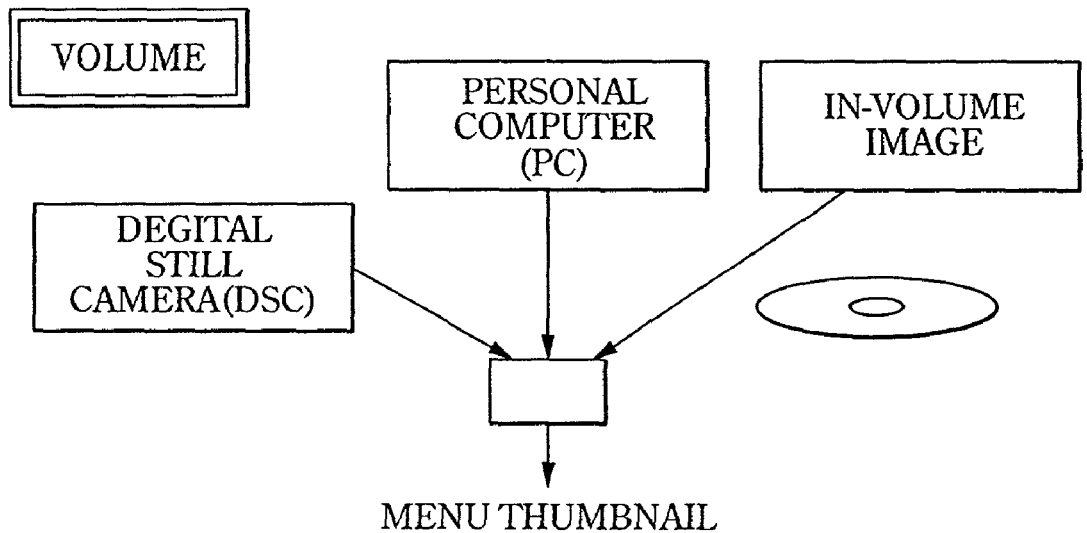
FIG. 10 illustrates a menu thumbnail.

As the representative picture of the PlayList, it may be contemplated to use the initial picture of the PlayList as the thumbnail (representative picture). However, the leading picture at the playback time of 0 is not necessarily an optimum picture representing the contents. So, the user is allowed to set an optional picture as a thumbnail of the PlayList. Two sorts of the thumbnails, that is the thumbnail as a representative picture indicating the Volume and the thumbnail as a representative picture indicating PlayList, are termed menu thumbnails. Since the menu thumbnails are demonstrated frequently, these thumbnails need to be read out at an elevated speed from the disc. Thus, it is efficient to store the totality of the menu thumbnails in a sole file. It is unnecessary for the menu thumbnails to be pictures extracted from the moving pictures in the volume, but may be a picture captured from a personal computer or a digital still camera, as shown in FIG. 10.

On the other hand, the Clip and the PlayList need be marked with plural marks, whilst the pictures of the mark points need to be readily viewed in order to grasp the contents of the mark positions. The picture indicating such mark point is termed a mark thumbnail. Therefore, the picture which is the original of the mark thumbnail is mainly an extracted mark point picture rather than a picture captured from outside.

Figure 11:
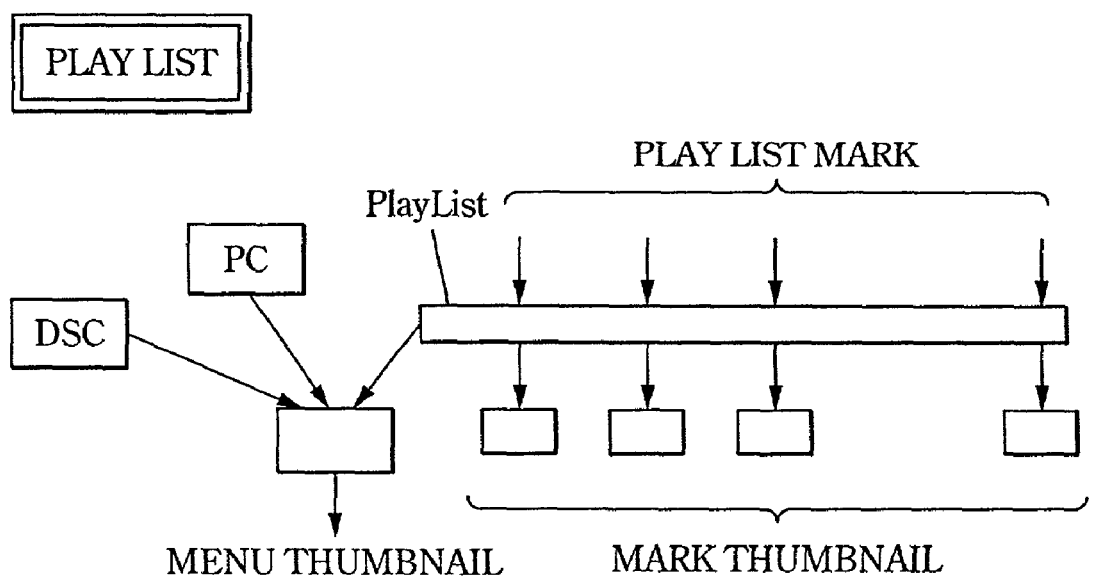
FIG. 11 illustrates mark added to the PlayList.
Figure 12:
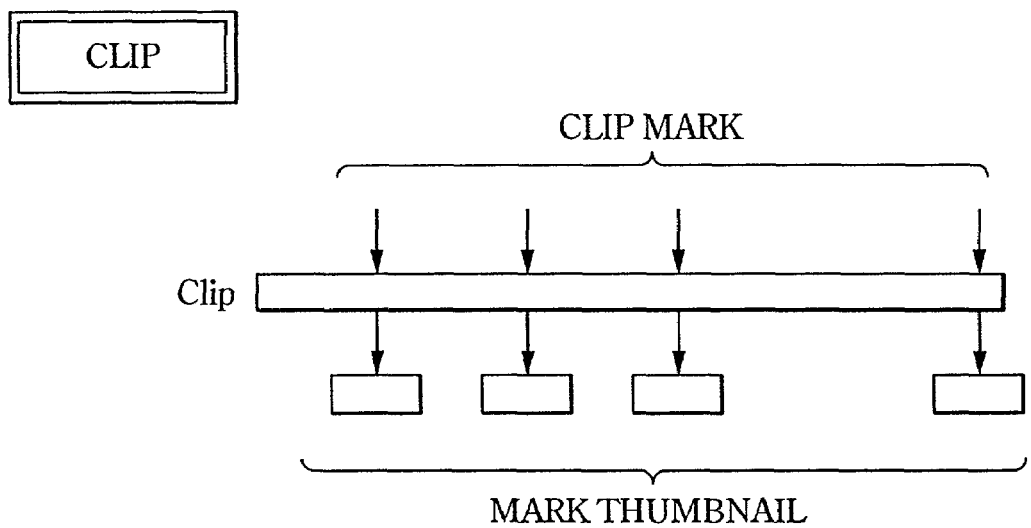
FIG. 12 illustrates a mark added to the Clip.

FIG. 11 shows the relation between the mark affixed to the PlayList and the mark thumbnail, whilst FIG. 12 shows the relation between the mark affixed to the Clip and the mark thumbnail. In distinction from the menu thumbnail, the mark thumbnail is used in e.g., a sub-menu for representing details of the PlayList, while it is not requested to be read out in a short access time. So, whenever a thumbnail is required, the recording and/or reproducing apparatus 1 opens a file and reads out a portion of the file, while there is no problem presented even if file opening and reading out a portion of the file by the recording and/or reproducing apparatus 1 takes some time.

For decreasing the number of files present in a volume, it is preferred for the totality of the mark thumbnails to be stored in one file. While the PlayList may own one menu thumbnail and plural mark thumbnails, the user is not required to select the Clip directly (usually, the Clip is selected through PlayList), and hence there is no necessity of providing menu thumbnails.

Figure 13:
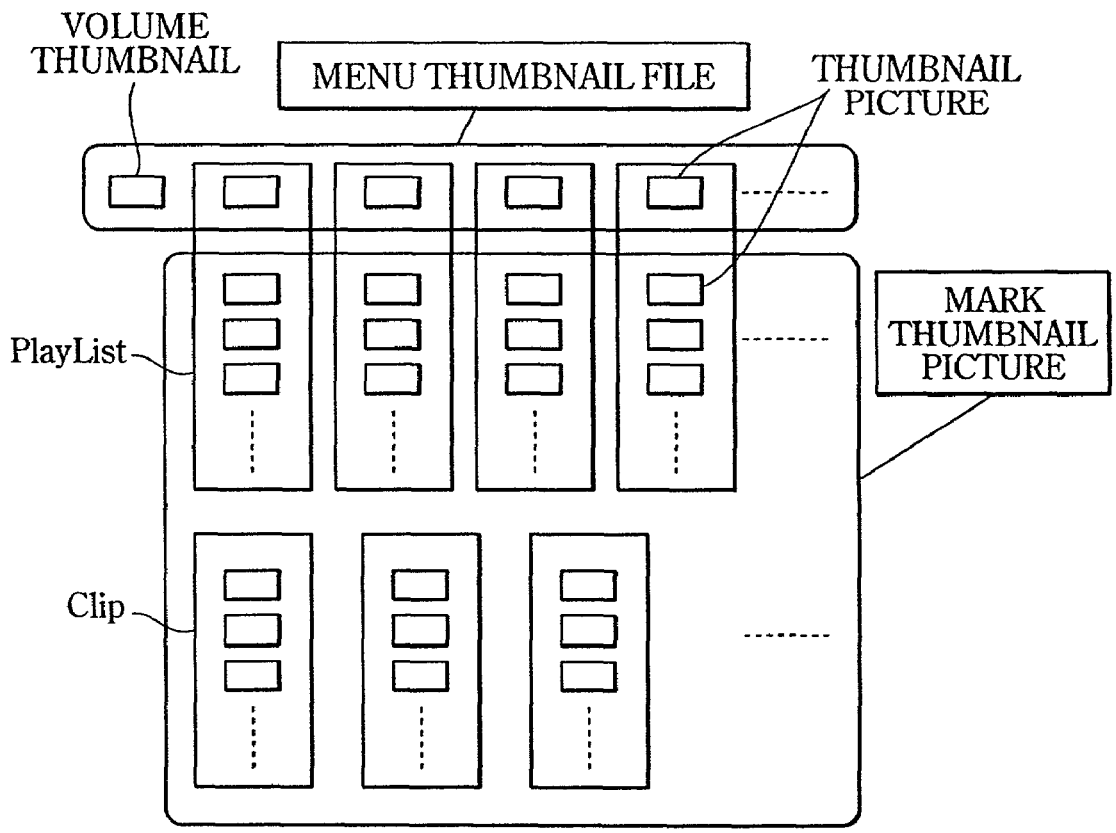
FIG. 13 illustrates the relation between the PlayList, Clip and the thumbnail file.

FIG. 13 shows the relation between the menu thumbnails, mark thumbnails, PlayList and Clips. In the menu thumbnail file are filed menu thumbnails provided from one PlayList to another. In the menu thumbnail file is contained a volume thumbnail representing the contents of data recorded on the disc. In the menu thumbnail file are filed thumbnails created from one PlayList to another and from one Clip to another.

The CPI (Characteristic Point Information) is hereinafter explained. The CPI is data contained in the Clip information file and is used mainly for finding a data address in the Clip AV stream file at which to start the data readout when a time stamp of the access point to the Clip is afforded. In the present embodiment two sorts of the CPI are used, one of them being EP_map and the other being TU_map.

The EP_map is a list of entry point (EP) data extracted from the elementary stream and the transport stream. This has the address information used to find the site of entry points in the AV stream at which to start the decoding. One EP data is made up of a presentation time stamp (PTS) and a data address in the AV stream of the accessing unit associated with the PTS, with the data address being paired to the PTS.

The EP_map is used mainly for two purposes. First, it is used for finding a data address in the AV stream in the accessing unit referenced by the PTS in the PlayList. Second, the EP_map is used for fast forward playback or fast reverse playback. If, in recording the input AV stream by the recording and/or reproducing apparatus 1, the syntax of the stream can be analyzed, the EP_map is created and recorded on the disc.

The TU_map has a list of time unit (TU) data which is derived from the arrival time point of the transport packet input through a digital interface. This affords the relation between the arrival-time-based time and the data address in the AV stream. When the recording and/or reproducing apparatus 1 records an input AV stream, and the syntax of the stream cannot be analyzed, a TU_map is created and recorded on the disc.

The STCInfo stores the discontinuous point information in the AV stream file which stores the MPEG-2 transport stream. When the AV stream has discontinuous points of STC, the same PTS values may appear in the AV stream file. Thus, if a time point in the AV stream is specified on the PTS basis, the PTS pf the access point is insufficient to specify the point. Moreover, an index of the continuous STC domain containing the PTS is required. In this format, the continuous STC domain and its index are termed an STC-sequence and STC-sequence-id, respectively. The STC-sequence information is defined by the STCInfo of the Clip Information file.

The STC-sequence-id is used in an AV stream file and is optional in the AV stream file having the TU_map.

The programs are each a collection of elementary streams and co-own a sole system time base for synchronized reproduction of these streams.

It is useful for a reproducing apparatus (recording and/or reproducing apparatus 1 of FIG. 1) to know the contents of an AV stream prior to its decoding. These contents include e.g., values of the PID of a transport packet transmitting an audio or video elementary stream or the type of the video or audio components, such as HDTV video or MPEG-2 AAC audio stream. This information is useful for creating a menu screen foy illustrating to the user the contents of the PlayList referencing the AV stream. It is similarly useful for setting the initial state of the AV decoder and the demultiplexer of the respective apparatus.

For this reason, the Clip Information file owns ProgramInfo for illustrating the program contents.

It may be an occurrence that program contents be changed in the AV stream file in which the MPEG-2 transport stream is stored. For example, the PID of the transport packet transmitting the video elementary stream may be changed, or the component type of the video stream may be changed from SDTV to HDTV.

The ProgramInfo stores the information on change points of program contents in the AV stream file. The domain of the AV stream file in which the program contents remain constant is termed program-sequence.

This program-sequence is used in an AV stream file having EP_map and is optional in an AV stream file having TU_map.

The present embodiment defines the self-encoding stream format (SESF). The SESF is used for encoding analog input signals and for decoding digital input signals for subsequently encoding the decoded signal into an MPEG-2 transport stream.

The SESF defines an elementary stream pertinent to the MPEG-2 transport stream and the AV stream. When the recording and/or reproducing apparatus 1 encodes and records input signals in the SESF, an EP_map is created and recorded on the disc.

A digital broadcast stream uses one of the following systems for recording on the recording medium 100: First, the digital broadcast stream is transcoded into an SESF stream. In this case, the recorded stream must conform to SESF and EP_map must be prepared and recorded on the disc.

Alternatively, an elementary stream forming a digital broadcast stream is transcoded to a new elementary stream and re-multiplexed to a new transport stream conforming to the stream format prescribed by the organization for standardizing the digital broadcast stream. In this case, an EP_map must be created and recorded on the disc.

For example, it is assumed that the input stream is an MPEG-2 transport stream conforming to the ISDB (standard appellation of digital BS of Japan), with the transport stream containing the HDTV video stream and the MPEG AAC audio stream. The HDTV video stream is transcoded to an SDTV video stream, which SDTV video stream and the original AAC audio stream are re-multiplexed to TS. The SDTV stream and the transport stream both need to conform to the ISDB format.

Another system of recording the digital broadcast stream on the recording medium 100 is to make transparent recording of the input transport stream, that is to record the input transport stream unchanged, in which case the EP_map is formulated and recorded on the disc.

Alternatively, the input transport stream is recorded transparently, that is an input transport stream is recorded unchanged, in which case TU_map is created and recorded on the disc.

Figure 14:
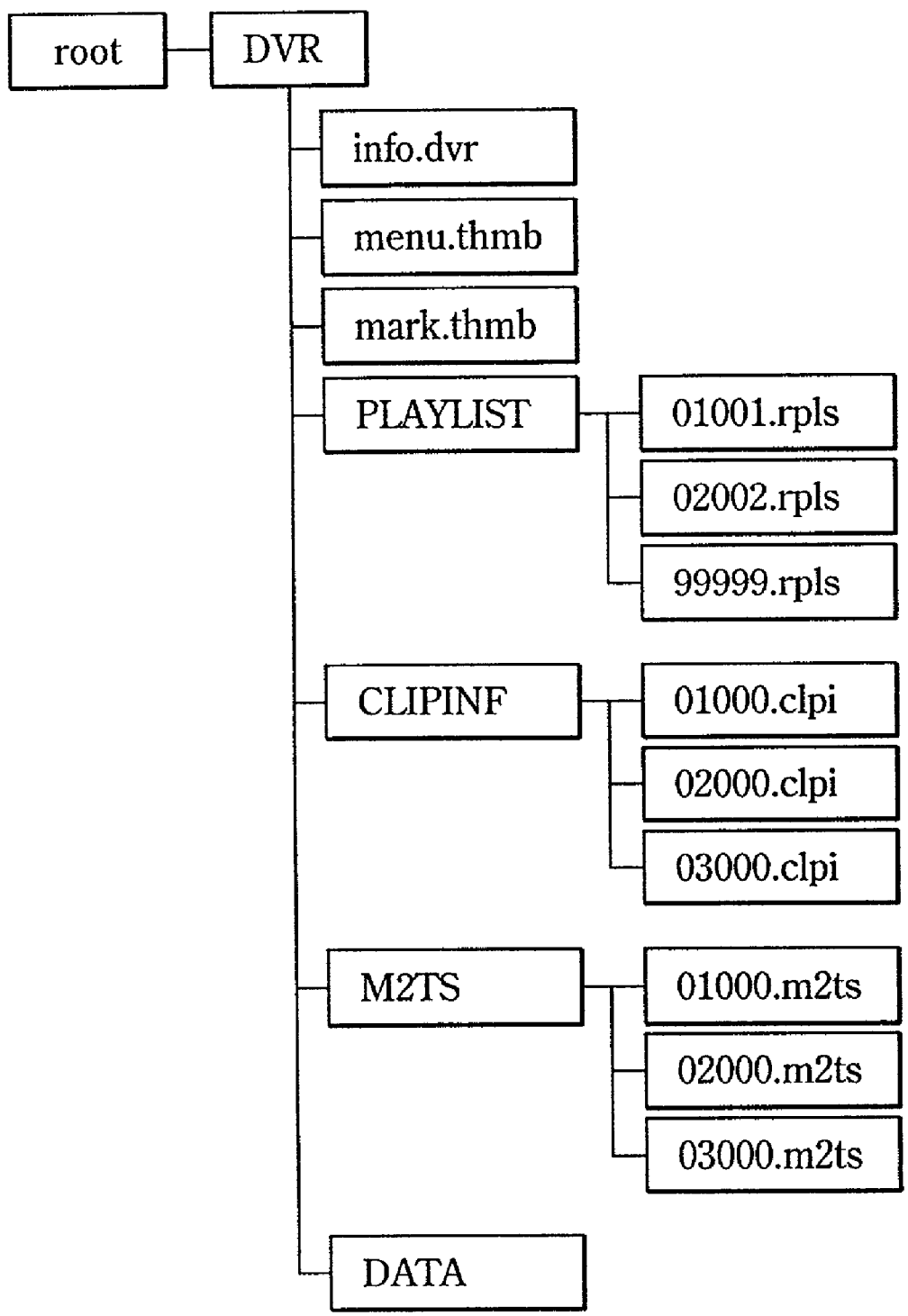
FIG. 14 illustrates a directory structure.

The directory and the file are hereinafter explained. The recording and/or reproducing apparatus 1 is hereinafter described as DVR (digital video recording). FIG. 14 shows a typical directory structure on the disc. The directories of the disc of the DVR may be enumerated by a root directory including "DVR" directory, and the "DVR" directory, including "PLAYLIST" directory, "CLIPINF" directory, "M2TS"0 directory and "DATA" directory, as shown in FIG. 14. Although directories other than these may be created below the root directory, these are discounted in the application format of the present embodiment.

Below the "DATA" directory, there are stored all files and directories prescribed by the DVR application format. The "DVR" directory includes four directories. Below the "PLAYLIST" directory are placed Real PlayList and Virtual PlayList database files. The latter directory may exist in a state devoid of PlayList.

Below "CLIPINF" is placed a Clip database. This directory, too, may exist in a state devoid of AV stream files. In the "DATA" directory, there are stored files of data broadcast, such as digital TV broadcast.

The "DVR" directory stores the following files: That is, an "info.dvr" is created below the DVR directory to store the comprehensive information of an application layer. Below the DVR directory, there must be a sole info.dvr. The filename is assumed to be fixed to info.dvr. The "menu.thmb" stores the information pertinent to the menu thumbnails. Below the DVR directory, there must be 0 or 1 mark thumbnail. The filename is assumed to be fixed to "menu.thmb". If there is no menu thumbnail, this file may not exist.

The "mark.thmb" file stores the information pertinent to the mark thumbnail picture. Below the DVR directory, there must be 0 or 1 mark thumbnail. The filename is assumed to be fixed to "menu.thmb". If there is no menu thumbnail, this file may not exist.

The "PLAYLIST" directory stores two sorts of the PlayList files which are Real PlayList and Virtual PlayList. An "xxxxx.rpls" file stores the information pertinent to one Real PlayList. One file is created for each Real PlayList. The filename is "xxxxx.rpls", where "xxxxx" denotes five numerical figures from 0 to 9. A file extender must be "rpls".

The "yyyyy.vpls" stores the information pertinent to one Virtual PlayList. One file with a filename "yyyyy.vpls" is created from one Virtual PlayList to another, where "yyyyy" denotes five numerical figures from 0 to 9. A file extender must be "vpls".

The "CLIPINF" directory stores one file in association with each AV stream file. The "zzzzz.clpi" is a Clip Information file corresponding to one AV stream file (Clip AV stream file or Bridge-Clip stream file). The filename is "zzzzz.clpi", where "zzzzz" denotes five numerical figures from 0 to 9. A file extender must be "clpi".

The "M2TS" directory stores an AV stream file. The "zzzzz.m2ts" file is an AV stream file handled by the DVR system. This is a Clip AV stream file or a Bridge-Clip AV stream file. The filename is "zzzzz.m2ts", where "zzzzz" denotes five numerical figures from 0 to 9. A file extender must be "m2ts".

The "DATA" directory stores data transmitted from data broadcasting. This data may, for example, be XML or MPEG files.

The syntax and the semantics of each directory (file) are now explained. FIG. 15 shows the syntax of the "info.dvr" file. The "info.dvr" file is made up of three objects, that is DVRVoume( ), TableOfPlayLists( ) and MakersPrivateData( ).

The syntax of info.dvr shown in FIG. 15 is explained. The TableOfPlayLists_Start_address indicates the leading address of the TableOfPlayLists( ) in terms of the relative number of bytes from the leading byte of the "info.dvr" file. The relative number of bytes is counted beginning from 0.

The MakersPrivate_Data_Start_address indicates the leading address of the MakersPrivateData( ), in terms of the relative number of bytes as from the leading byte of the "info.dvr" file. The relative number of bytes is counted from 0. The padding_word is inserted in association with the syntax of "info.dvr". N1 and N2 are optional positive integers. Each padding word may assume an optional value.

The DVRVolume( ) stores the information stating the contents of the volume (disc). FIG. 16 shows the syntax of the DVRVolume. The syntax of the DVRVolume( ), shown in FIG. 16, is now explained. The version_number indicates four character letters indicting the version numbers of the DVRVolume( ). The version_number is encoded to "0045" in association with ISO646.

Length is denoted by 32-bit unsigned integers indicating the number of bytes from directly after the length field to the trailing end of DVRVolume( ).

The ResumeVolume( ) memorizes the filename of the Real PlayList or the Virtual PlayList reproduced last in the Volume. However, the playback position when the user has interrupted playback of the Real PlayList or the Virtual PlayList is stored in the resume-mark defined in the PlayListMark( ) (see FIGS. 42 and 43).

FIG. 17 shows the syntax of the ResumeVolume( ). The syntax of the ResumeVolume( ) shown in FIG. 17 is explained. The valid_flag indicates that the resume_Play_List name field is valid or invalid when this 1-bit flag is set to 1 or 0, respectively.

The 10-byte field of resume_PlayList_name indicates the filename of the Real PlayList or the Virtual PlayList to be resumed.

The UIAppInfoVolume in the syntax of the DVRVolume( ), shown in FIG. 16, stores parameters of the user interface application concerning the Volume. FIG. 18 shows the syntax of the UIAppInfoVolume, the semantics of which are now explained. The 8-bit field of character_set indicates the encoding method for character letters encoded in the Volume_name field. The encoding method corresponds to the values shown in FIG. 19.

The 8-bit field of the name-length indicates the byte length of the Volume name indicated in the Volume_name field. The Volume_name field indicates the appellation of the Volume. The number of bytes of the number of the name_length counted from left of the field is the number of valid characters and indicates the volume appellation. The values next following these valid character letters may be any values.

The Volume_protect_flag is a flag indicating whether or not the contents in the Volume can be shown to the user without limitations. If this flag is set to 1, the contents of the Volume are allowed to be presented (reproduced) to the user only in case the user has succeeded in correctly inputting the PIN number (password). If this flag is set to 0, the contents of the Volume are allowed to be presented to the user even in case the PIN number is not input by the user.

If, when the user has inserted a disc into a player, this flag has been set to 0, or the flag is set to 1 but the user has succeeded in correctly inputting the PIN number, the recording and/or reproducing apparatus 1 demonstrates a list of the PlayList in the disc. The limitations on reproduction of the respective PlayLists are irrelevant to the Volume_protect_flag and are indicated by playback_control_flag defined in the UIAppInfoVolume.

The PIN is made up of four numerical figures of from 0 to 9, each of which is coded in accordance with ISO/IEC 646. The ref_thumbnail_index field indicates the information of a thumbnail picture added to the Volume. If the ref_thumbnail_index field is of a value other than 0×FFFF, a thumbnail picture is added to the Volume. The thumbnail picture is stored in a menu.thumb file. The picture is referenced using the value of the ref_thumbnail_index in the menu.thumb file. If the ref_thumbnail_index field is 0×FFFF, it indicates that a thumbnail picture has been added to the Volume.

The TableOfPlayList( ) in the info.dvr syntax shown in FIG. 15 is explained. The TableOfPlayList( ) stores the filename of the PlayList (Real PlayList and Virtual PlayList). All PlayList files recorded in the Volume are contained in the TableOfPlayList( ), which TableOfPlayList( ) indicates the playback sequence of the default of the PlayList in the Volume.

FIG. 20 shows the syntax of the TableOfPlayList( ), which is now explained. The version_number of the TableOfPlayList( ) indicates four character letters indicating the version numbers of the TableOfPlayLists. The version_number must be encoded to "0045" in accordance with ISO 646.

Length is a unsigned 32-bit integer indicating the number of bytes of the TableOfPlayList( ) from directly after the length field to the trailing end of the TableOfPlayList( ). The 16-bit field of the number_of_PlayLists indicates the number of loops of the for-loop inclusive of the PlayList_file_name. This numerical figure must be equal to the number of PlayLists recorded in the Volume. The 10-byte numerical figure of the PlayList_file_name indicates the filename of the PlayLists.

FIG. 21 shows another configuration of the syntax of the TableOfPlayList( ). The syntax shown in FIG. 21 is comprised of the syntax shown in FIG. 20 in which is contained the UIAppInfoPlayList. By such structure including the UIAppInfoPlayList, it becomes possible to create a menu picture simply on reading out the TableOfPlayLists. The following explanation is premised on the use of the syntax shown in FIG. 20.

The MakersPrivateData in the info.dvr shown in FIG. 15 is explained. The MakersPrivateData is provided to permit the maker of the recording and/or reproducing apparatus 1 to insert private data of the maker in the MakersPrivateData( ) for special applications of different companies. The private data of each maker has standardized maker_ID for identifying the maker who has defined it. The MakersPrivateData( ) may contain one or more maker_ID.

If a preset maker intends to insert private data, and the private data of a different maker is already contained in the MakersPrivateData( ), the new private data is added to the MakersPrivateData( ) without erasing the pre-existing old private data. Thus, in the present embodiment, private data of plural makers can be contained in one MakersPrivateData( ).

FIG. 22 shows the syntax of the MakersPrivateData. The syntax of the MakersPrivateData shown in FIG. 22 is explained. The version_number of the TableOfPlayList( ) indicates four character letters indicating the version numbers of the TableOfPlayLists. The version_number must be encoded to "0045" in accordance with ISO 646. Length is a unsigned 32-bit integer indicating the number of bytes of the TableOfPlayList( ) from directly after the length field to the trailing end of the MakersPrivateData( ).

The mpd_blocks_start_address indicates the leading end address of the first mpd_block( ) in terms of the relative number of bytes from the leading byte of the MakersPrivateData( ). The number_of_maker_entries is the 16-bit codeless integer affording the number of entries of the maker private data included in the MakersPrivateData( ). There must not be present two or more maker private data having the same maker_ID values in the MakersPrivateData( ).

The mpd_blocks_size is a 16-bit unsigned integer affording one mpd_block size in terms of 1024 bytes as a unit. For example, if mpd_block_size=1, it indicates that the size of one mpd_block is 1024 bytes. The number_of_mpd_blocks is a 16-bit unsigned integer affording the number of mpd_blocks contained in the MakersPrivateData( ). The maker_ID is the 16-bit unsigned integer indicating the model number code of the DVR system which has created the maker private data. The value encoded to the maker_ID is specified by the licensor.

The maker_model_code is a 16-bit unsigned integer indicating the model number code of the DVR system which has created the maker private data. The value encoded to the maker_model_code is set by the maker who has received the license of the format. The start mpd_block_number is a 16-bit unsigned integer indicating the number of the mpd_block number at which begins the maker private data. The leading end of the maker private data must be aligned with the leading end of the mpd_block. The start_mpd_block_number corresponds to a variable j in the for-loop of the mpd_block.

The mpd_length is a 32-bit unsigned integer indicating the size of the maker private data. The mpd_block is an area in which is stored maker private data. All of the mpd_blocks in the MakersPrivateData( ) must be of the same size.

The real PlayList file and the Virtual PlayList file, in other words, xxxxx.rpls and yyyyy.vpls, are explained. FIG. 23 shows the syntax of xxxxx.rpls (Real PlayList) and yyyyy.vpls (Virtual PlayList), which are of the same syntax structure. Each of the xxxxx.rpls and yyyyy.vpls is made up of three objects, that is PlayList( ), PlayListMark( ) and MakersPrivateData( ).

The PlayListMark_Start_address indicates the leading address of the PlayListMark( ), in terms of the relative number of bytes from the leading end of the PlayList file as a unit. The relative number of bytes is counted from zero.

The MakersPrivateData_Start_address indicates the leading address of the MakersPrivateData( ), in terms of the relative number of bytes from the leading end of the PlayList file as a unit. The relative number of bytes is counted from zero.

The padding_word (padding word) is inserted in accordance with the syntax of the PlayList file, with N1 and N2 being optional positive integers. Each padding word may assume an optional value.

PlayList will be further explained in the following although it has been explained briefly. A playback domain in all Clips except Bridge-Clip must be referred by all PlayLists in the disc. Also, two or more Real PlayLists must not overlap the playback domains shown by their PlayItems in the same Clip.

Figure 24A:
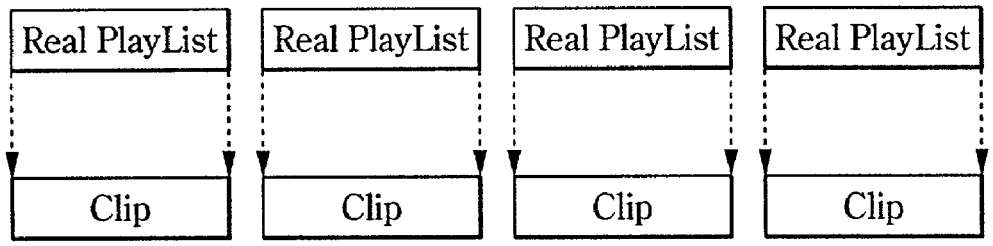
FIGS. 24A to 24C illustrate the PlayList.
Figure 24B:
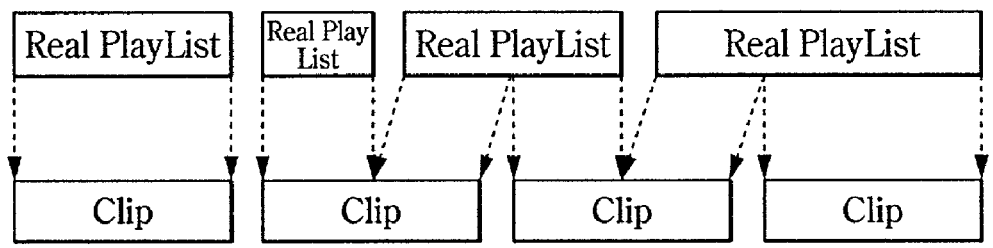
Figure 24C:
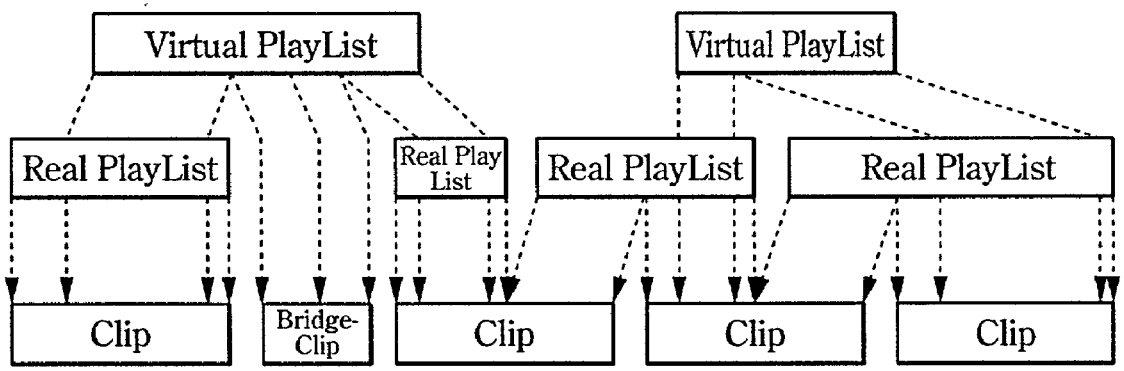

Reference is made to FIGS. 24A, 24B and 24C. For all Clips, there exist corresponding Real PlayLists, as shown in FIG. 24A. This rule is observed even after the editing operation has come to a close, as shown in FIG. 24B. Therefore, all Clips must be viewed by referencing one of Real PlayLists.

Referring to FIG. 24C, the playback domain of the Virtual PlayList must be contained in the playback domain and in the Bridge-Clip playback domain. There must not be present in the disc Bridge-Clip not referenced by any Virtual PlayList.

The Real PlayList, containing the list of the PlayItem, must not contain SubPlayItem. The Virtual PlayList contains the PlayItem list and, if the CPI_type contained in the PlayList( ) is the EP_map type and the PlayList_type is 0 (PlayList containing video and audio), the Virtual PlayList may contain one SubPlayItem. In the PlayList( ) in the present embodiment, the SubPlayItem is used only for audio post recording. The number of the SubPlayItems owned by one Virtual PlayList must be 0 or 1.

The PlayList is hereinafter explained. FIG. 25 shows the PlayList syntax which is now explained. The version_number indicates four character letters indicting the version numbers of the PlayList( ). The version_number is encoded to "0045" in association with ISO 646. Length is a 32-bit unsigned integer indicating the total number of byte of the PlayList( ) as from directly after the length field to the trailing end of the PlayList( ). The PlayList_type, one example of which is shown in FIG. 26, is an 8-bit field indicating the PlayList type.

The CPI_type is one-bit flag indicating the value of the CPI_type of the Clip referenced by the PlayItem( ) and by the SubPlayItem( ). The CPI_types defined in the CPIs of all Clips referenced by one PlayList must be of the same values. The number_of_PlayItems is a 16-bit field indicating the number of PlayItems present in the PlayList.

The PlayItem_id corresponding to the preset PlayItem( ) is defined by the sequence in which the PlayItem( ) appears in the for-loop containing the PlayItem( ). The PlayItem_id begins with 0. The nimber_of_SubPlayItems is a 16-bit field indicating the number of SubPlayItem in the PlayList. This value is 0 or 1. An additional audio stream path (audio stream path) is a sort of a sub path.

The UIAppInfoPlayList of the PlayList syntax shown in FIG. 25 is explained. The UIAppInfoPlayList stores parameters of the user interface application concerning the PlayList. FIG. 27 shows the syntax of the UIAppInfoPlayList, which is now explained. The character_set is an 8-bit field indicating the method for encoding character letters encoded in the PlayList_name field. The encoding method corresponds to the values conforming to the table shown in FIG. 19.

The name_length is an 8-bit field indicating the byte length of the PlayList name indicated in the PlayList_name field. The PlayList_name field shows the appellation of the PlayList. The number of bytes of the number of the name_length counted from left of the field is the number of valid characters and indicates the PlayList appellation. The values next following these valid character letters may be any values.

The record_time and_date is a 56-bit field storing the date and time on which the PlayList was recorded. This field is 14 numerical figures for year/month/day/hour/minute/second encoded in binary coded decimal (BCD). For example, 2001/12/23:01:02:03 is encoded to "0x20011223010203".

The duration is a 24-bit field indicating the total replay time of the PlayList in terms of hour/minute/second as a unit. This field is six numerical figures encoded in binary coded decimal (BCD). For example, 01:45:30 is encoded to "0x014530".

The valid_period is a 32-bit field indicating the valid time periods of the PlayList. This field is 8 numerical figures encoded in 4-bit binary coded decimal (BCD). The valid_period is used in the recording and/or reproducing apparatus 1 e.g., when the PlayList, for which the valid period has lapsed, is to be automatically erased. For example, 2001/05/07 is encoded to "0x20010507".

The maker_ID is a 16-bit unsigned integer indicating the maker of the DVR player (recording and/or reproducing apparatus 1) which has been the last to update its PlayList. The value encoded to maker_ID is assigned to the licensor of the DVR format. The maker_code is a 16-bit unsigned integer indicating the model number of the DVR player which has been the last to update the PlayList. The value encoded to the maker_code is determined by the maker who has received the license of the DVR format.

If the flag of the playback_control_flag is set to 1, its PlayList is reproduced only when the user successfully entered the PIN number. If this flag is set to 0, the user may view the PlayList without the necessity of inputting the PIN number.

If the write_protect_flag is set to 1, the contents of the PlayList are not erased nor changed except the write_protect_flag. If this flag is set to 0, the user is free to erase or change the PlayList. If this flag is set to 1, the recording and/or reproducing apparatus 1 demonstrates a message requesting re-confirmation by the user before the user proceeds to erase, edit or overwrite the PlayList.

The Real PlayList, in which the write_protect_flag is set to 0, may exist, the Virtual PlayList, referencing the Clip of the Real PlayList may exist, and the write_protect_flag of the Virtual PlayList may be set to 1. If the user is desirous to erase the Real PlayList, the recording and/or reproducing apparatus 1 issues an alarm to the user as to the presence of the aforementioned Virtual PlayList or "minimizes" the Real PlayList before erasing the Real PlayList.

If is_played_flag is set to 1, as shown in FIG. 28B, it indicates that the PlayList was reproduced at least once since it was recorded, whereas, if it is set to 0, it indicates that the PlayList was not reproduced even once since it was recorded.

Archive is a two-bit field indicating whether the PlayList is an original or a copy, as shown in FIG. 28C. The field of ref_thumbnail_index indicates the information of a thumbnail picture representative of the PlayList. If the ref_thumbnail_index field is of a value other than 0×FFFF, a thumbnail picture representative of the PlayList is added in the PlayList, with the PlayList being stored in the menu.thmb file. The picture is referenced using the value of ref_thumbnail_index in the menu.thmb file. If the ref_thumbnail_index field is 0×FFFF, no thumbnail picture representative of the PlayList is added in the PlayList.

The PlayItem is hereinafter explained. One PlayItem( ) basically contains the following data: Clip_Information_file_name for specifying the filename of the Clip, IN-time and OUT-time, paired together to specify the playback domain of Clip, STC_sequence_id referenced by IN-time and OUT-time in case the CPI_type defined in PlayList( ) is EP_map type, and Connection_Condition indicating the connection condition of previous PlayItem and current PlayItem.

Figure 29:
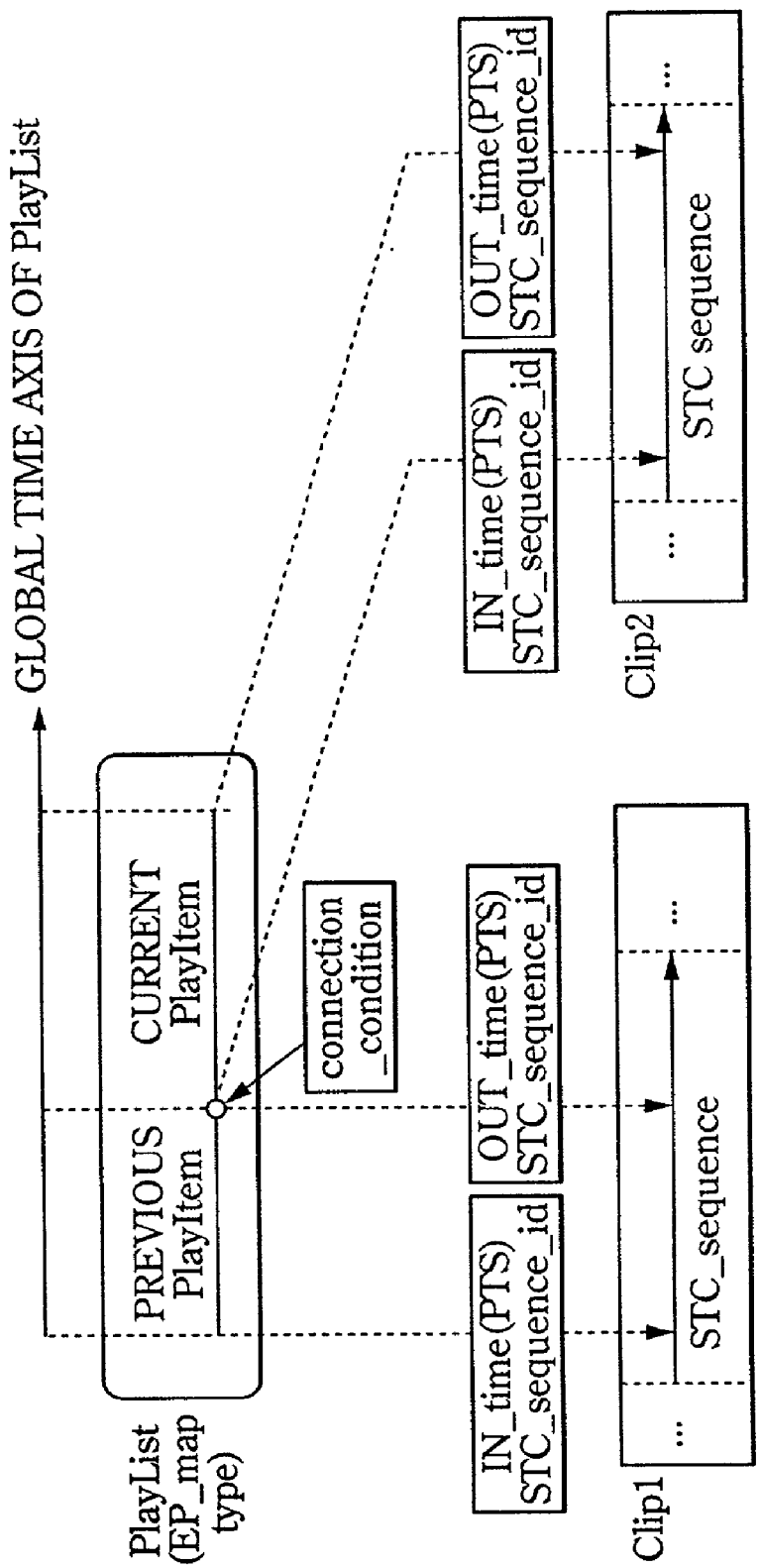
FIG. 29 illustrates a PlayItem.

If PlayList is made up of two or more PlayItems, these PlayItems are arrayed in a row, without temporal gap or overlap, on the global time axis of the PlayList. If CPI_type defined in the PlayList is EP_map type and the current PlayList does not have the BridgeSequence( ), the IN-time and OUT-time pair must indicate the same time on the STC continuous domain as that specified by the STC_sequence_id. Such instance is shown in FIG. 29.

Figure 30:
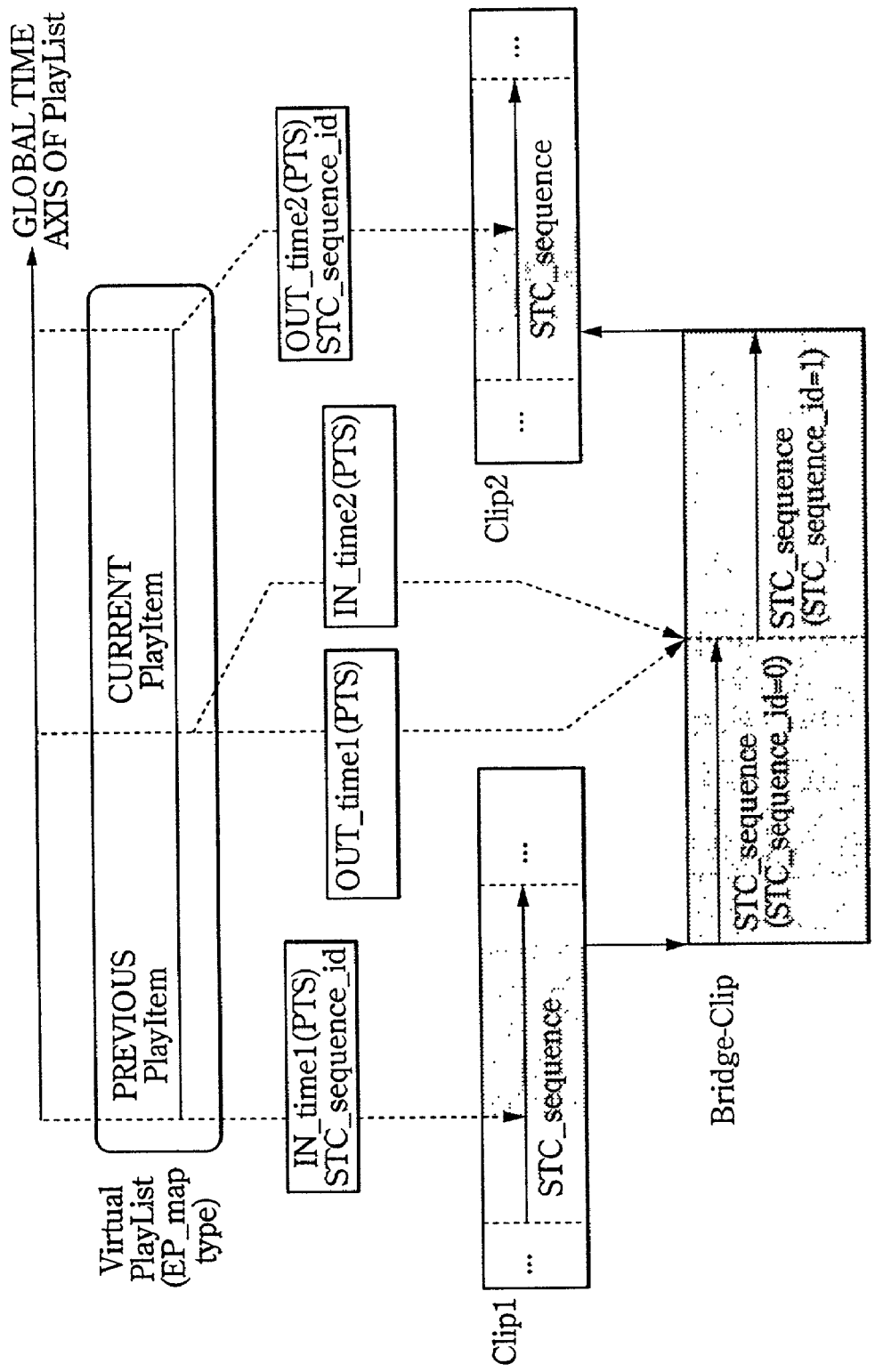
FIG. 30 illustrates a PlayItem.

FIG. 30 shows such a case in which the CPI_type defined by PlayList( ) and, if the current PlayItem has the BridgeSequence( ), the rules as now explained are applied. The IN_time of the PlayItem previous to the current PlayItem, shown as IN_time1, indicates the time in Bridge-Clip specified in the BridgeSequenceInfo( ) of the current PlayItem. This OUT_time must obey the encoding limitations which will be explained subsequently.

The IN_time of the current PlayItem, shown as IN_time2, indicates the time in Bridge-Clip specified in the BridgeSequenceInfo( ) of the current PlayItem. This IN_time also must obey the encoding limitations as later explained. The OUT_time of PlayItem of the current PlayItem, shown as OUT_time2, indicates the time on the STC continuous domain specified by STC_sequenbce_id of the current PlayItem.

Figure 31:
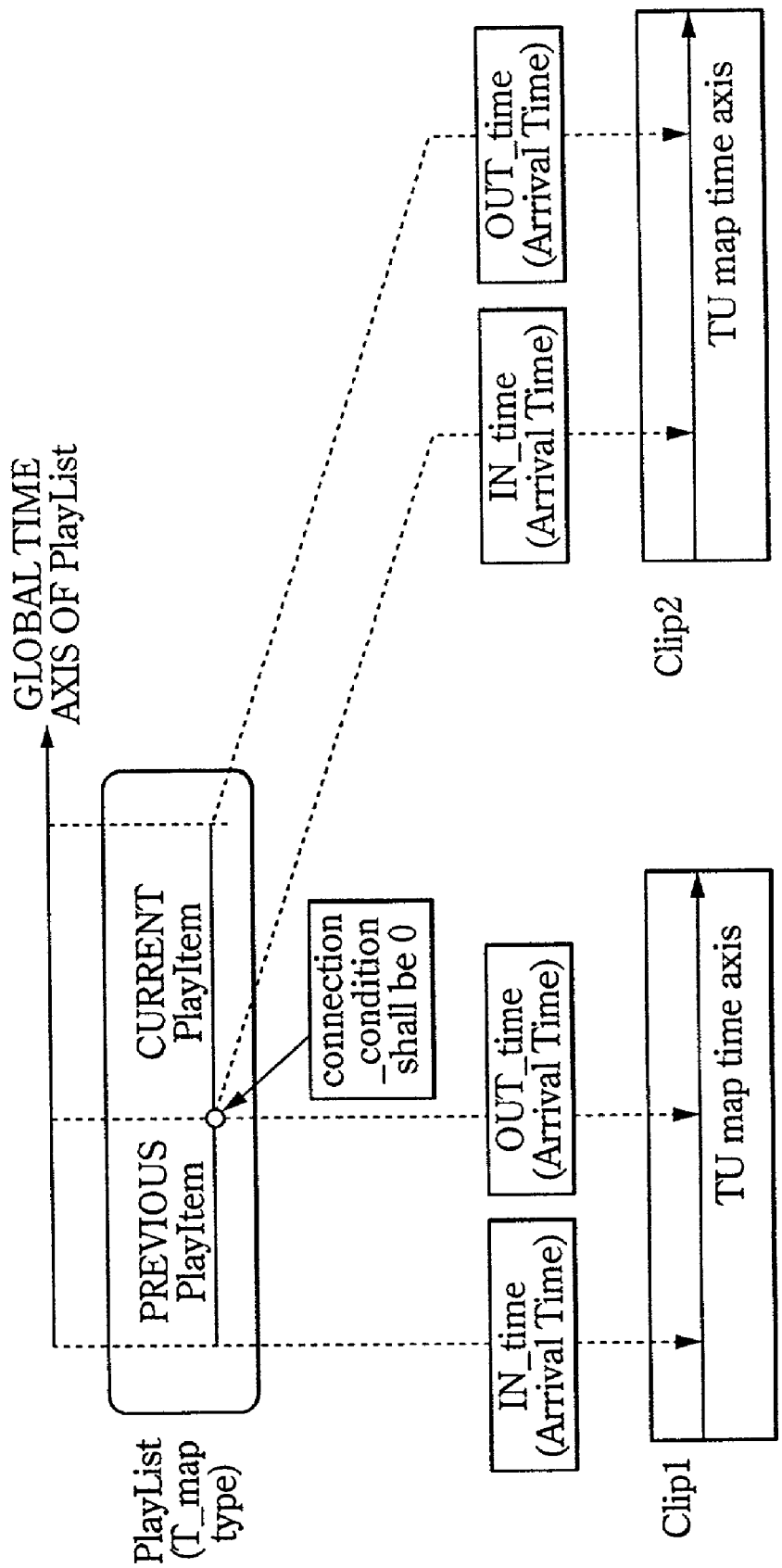
FIG. 31 illustrates a PlayItem.
Figure 36A:
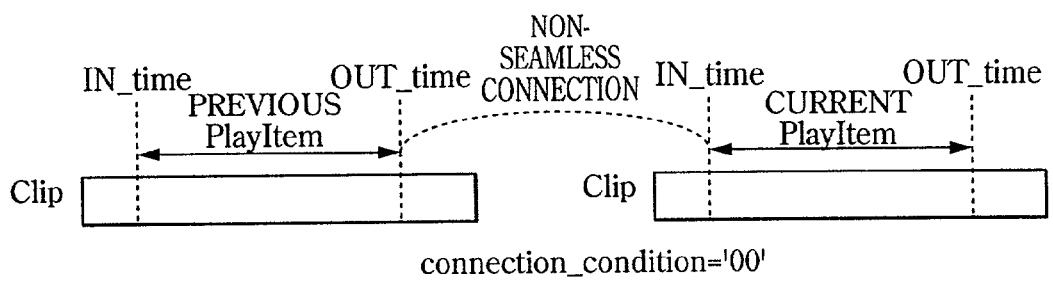
FIGS. 36A to 36D illustrate Connection_Condition.
Figure 36B:
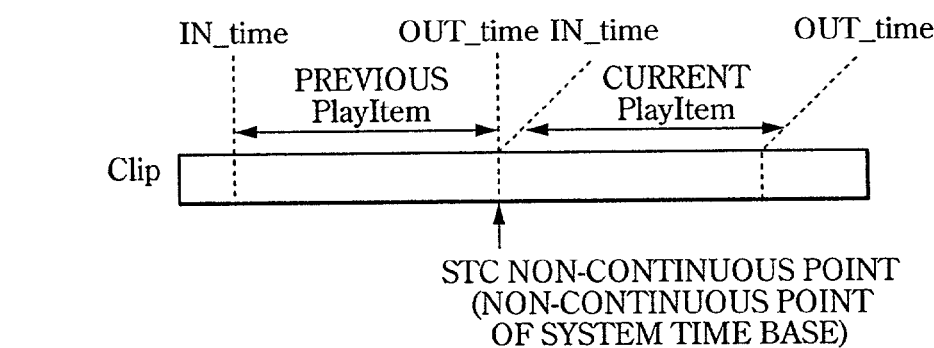
Figure 36C:
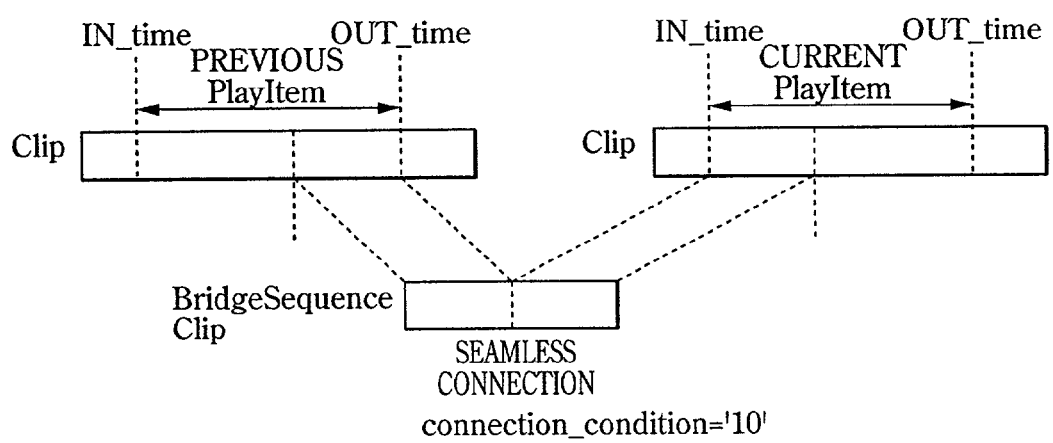
Figure 36D:
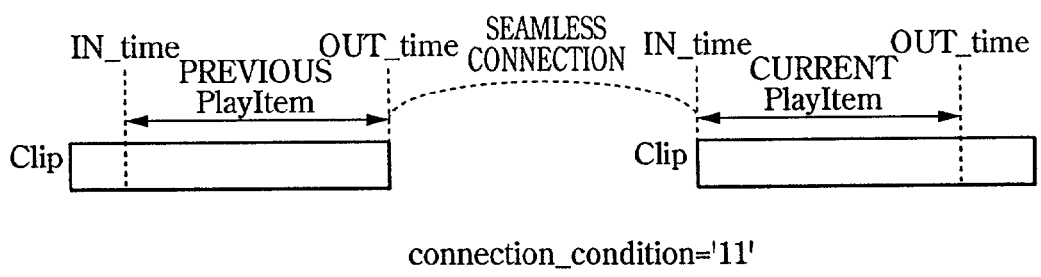

If the CPI_type of PlayList( ) is TU_map type, the IN_time and OUT_time of PlayItem, paired together, indicate the time on the same Clio AV stream, as shown in FIG. 31.

The PlayItem syntax is as shown in FIG. 32. As to the syntax of the PlayItem, shown in FIG. 32, the field of the Clip_information_file_name indicates the filename of the Clip Information. The Clip_stream_type defined by the ClipInfo( ) of this Clip Information file must indicate the Clip AV stream.

The STC_sequence_id is an 8-bit field and indicates the STC_sequence_id of the continuous STC domain referenced by the PlayItem. If the CPI_type specified in the PlayList( ) is TU_map type, this 8-bit field has no meaning and is set to 0. IN_time is a 32-bit field and used to store the playback start time of PlayItem. The semantics of IN_time differs with CPI_type defined in the PlayList( ), as shown in FIG. 33.

OUT_time is a 32-bit field and is used to store the playback end time of PlayItem. The semantics of OUT_time differs with CPI_type defined in the PlayList( ), as shown in FIG. 34.

Connection_condition is a 2-bit field indicating the connection condition between the previous PlayItem and the current PlayItem, as shown in FIG. 35. FIGS. 36A to 36D illustrate various states of Connection_condition shown in FIG. 35.

BridgeSequenceInfo is explained with reference to FIG. 37. This BridgeSequenceInfo is the ancillary information of the current PlayItem and includes the following information. That is, BridgeSequenceInfo includes Bridge_Clip_Information_file_name for specifying the Bridge_Clip AV file and a Bridge_Clip_Information_file_name specifying the corresponding Clip Information file (FIG. 45).

It is also an address of a source packet on the Clip AV stream referenced by the previous PlayItem. Next to this source packet is connected the first source packet of the Bridge-Clip AV stream. This address is termed the RSPN_exit_from_previous_Clip. It is also an address of the source packet on the Clip AV stream referenced by the current PlayItem. Ahead of this source packet is connected the last source packet of the Bridge_clip AV stream file. This address is termed RSPN_enter_to_current_Clip.

Figure 37:
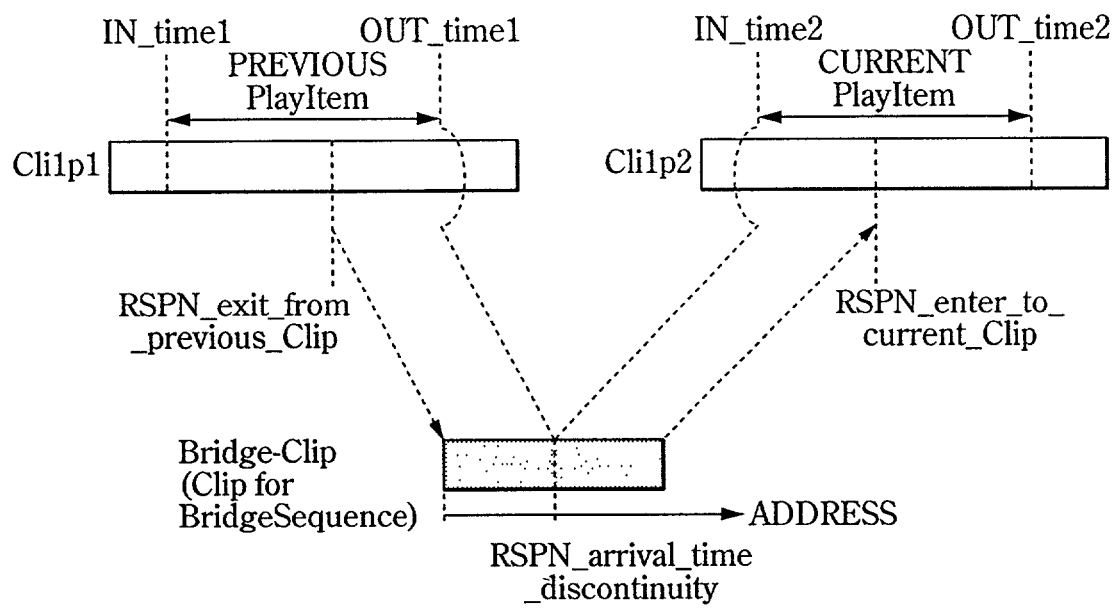
FIG. 37 illustrates BridgeSequenceInfo.

In FIG. 37, RSPN_arrival_time_discontinuity indicates an address of a source packet in the Bridge_Clip AV stream where there is a discontinuous point in the arrival time base. This address is defined in the ClipInfo( ) (FIG. 46).

FIG. 38 shows the syntax of the BridgeSequenceInfo. Turning to the syntax of BridgeSequenceInfo shown in FIG. 38, the field of Bridge_Clip_Information_file_name indicates the filename of the Clip Information file corresponding to the Bridge_Clip _Information_file. The Clip_stream_type defined in ClipInfo( ) of this Clip information file must indicate 'Bridge_Clip AV stream'.

The 32-bit field of the RSPN_exit_from_previous_Clip is a relative address of a source packet on the Clip AV stream referenced by the previous PlayItem. Next to this source packet is connected the first source packet of the Bridge_Clip AV stream file. The RSPN_exit_from_previous_Clip has a size based on the source packet number as a unit, and is counted with the value of the offset_SPN defined in the ClipInfo( ) from the first source packet of the Clip AV stream file referenced by the previous PlayItem.

The 32-bit field of RSPN_enter_to_curent_Clip is the relative address of the source packet on the Clip AV stream referenced by the current PlayItem. Ahead of this source packet is connected the last source packet of the Bridge_Clip_AV stream file. The RSPN_enter_to_curent_Clip has a size that is based on the source packet number as a unit. The RSPN_enter_to_curent_Clip is counted with the value of the offset_SPN, defined in the ClipInfo( ) from the first source packet of the Clip AV stream file referenced by the current PlayItem, as an initial value.

Figure 39:
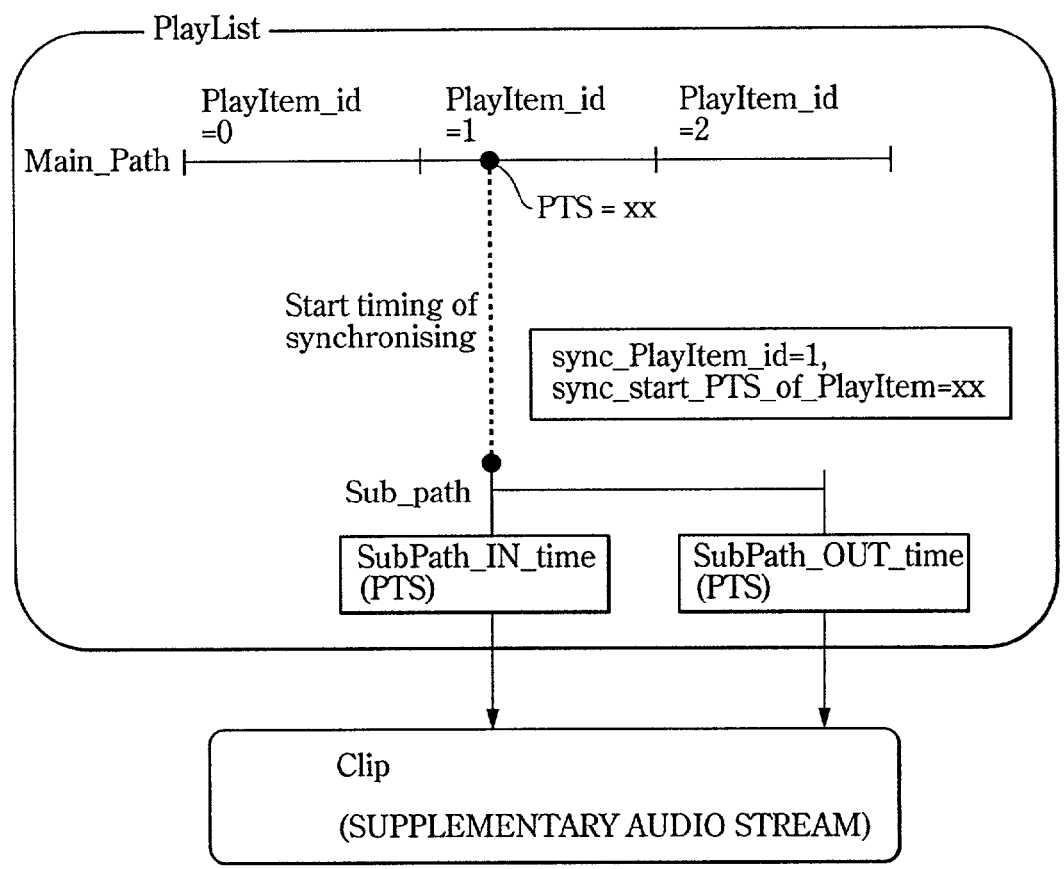
FIG. 39 illustrates SubPlayItem.

The SubPlayItem is explained with reference to FIG. 39. The use of SubPlayItem( ) is permitted only if the CPI_type of the PlayList( ) is the EP_map type. In the present embodiment, SubPlayItem is used only for audio post recording. The SubPlayItem( ) includes the following data. First, it includes Clip_Information_file_name for specifying the Clip referenced by the sub path in the PlayList.

It also includes SubPath_IN_time and SubPath_OUT_time for specifying the sub path playback domain in the Clip. Additionally, it includes sync_PlayItem_id and start_PTS_of_PlayItem for specifying the time of starting the sub path reproduction on the main path time axis. The Clip AV stream, referenced by the sub path, must not contain STC discontinuous points (discontinuous points of the system time base). The clocks of audio samples of the Clip used in the sub path are locked to the clocks of the audio samples of the main path.

FIG. 40 shows the syntax of the SubPlayItem. Turning to the syntax of the SubPlayItem, shown in FIG. 40, the field of the Clip__Information_file_name indicates the filename of the Clip Information file and is used by a sub path in the PlayList. The Clip_stream_type defined in this ClipInfo( ) must indicate the Clip AV stream.

An 8-bit field of sync PlayItem id indicates the sub path type. Here, only '0x00' is set, as shown in FIG. 41, while other values are reserved for future use.

The 8-bit field of sync_PlayItem_id indicates the PlayItem_id of the PlayItem containing the time of playback start of the sub path on the time axis of the main path. The value of PlayItem_id corresponding to the preset PlayItem is defined in the PlayList( ) (FIG. 25).

A 32-bit field of sync_start_PTS_of_PlayItem denotes the time of playback start of the sub path on the time axis of the main path, and denotes the upper 32 bits of the PTS (presentation time stamp) on the PlayItem referenced by the sync_PlayItem_id. The upper 32 bit field of the SubPath_IN_time stores the playback start time of the sub path. SubPath_IN_time denotes upper 32 bits of the PTS of 33 bits corresponding to the first presentation unit in the sub path.

The upper 32 bit field of subPath_OUT_time stores the playback end time of the sub path. SubPath_OUT_time indicates upper 32 bits of the value of the Presentation_end_TS calculated by the following equation:

Presentation_end_TS=PTS_OUT+AU_duration where PTS_out is the PTS of the 33 bit length corresponding to the last presentation unit of the SubPath and AU_duration is the 90 kHz based display period of the last presentation unit of the SubPath.

Next, PlayListMark( ) in the syntax of xxxxx.rpls and yyyyy.vpls shown in FIG. 23 is explained. The mark information pertinent to the PlayList is stored in this PlayListMark. FIG. 42 shows the syntax of PlayListMark. Turning to the syntax of the PlayListMark shown in FIG. 42, version_number is four character letters indicating the version number of this PlayListMark( ). The version_number must be encoded to "0045" in accordance with ISO 646.

Length is an unsigned 32-bit integer indicating the number of bytes of PlayListMark( ) from directly after the length field to the trailing end of the PlayListMark( ). The number_of_PlayListMarks is a 16-bit unsigned integer indicating the number of marks stored in the PlayListMark. The number_of_PlayListMarks may be zero. The mark_type is an 8-bit field indicating the mark type and is encoded in the table shown in FIG. 43.

A 32-bit filed of mark_time_stamp stores a time stamp indicating the point specified by the mark. The semantics of the mark_time_stamp differ with CPI_type defined in the PlayList ( ), as shown in FIG. 44. The PlayItem_id is an 8-bit field specifying the PlayItem where the mark is put. The values of PlayItem_id corresponding to a preset PlayItem is defined in the PlayList( ) (see FIG. 25).

An 8-bit field of character_set shows the encoding method of character letters encoded in the mark_name field. The encoding method corresponds to values shown in FIG. 19. The 8-bit field of name_length indicates the byte length of the mark name shown in the mark_name field. The mark_name field denotes the mark name indicated in the mark_name field. The number of bytes corresponding to the number of name_lengths from left of this field is the effective character letters and denotes the mark name. In the mark_name field, the value next following these effective character letters may be arbitrary.

The field of the ref_thumbnail_index denotes the information of the thumbnail picture added to the mark. If the field of the ref_thumbnail_index is not 0×FFFF, a thumbnail picture is added to its mark, with the thumbnail picture being stored in the mark.thmb file. This picture is referenced in the mark.thmb file, using the value of ref_thumbnail_index, as explained subsequently. If the ref_thumbnail_index field is 0×FFFF, it indicates that no thumbnail picture is added to the mark.

The Clip Information file is now explained. The zzzzz.clpi (Clip Information file) is made up of six objects, as shown in FIG. 45. These are ClipInfo( ), STC_Info( ), Program( ), CPI( ), ClipMark( ) and MakersPrivateData( ). For the AV stream (Clip AV stream or Bridge-Clip AV stream) and the corresponding Clip Information file, the same string of numerals "zzzzz" is used.

Turning to the syntax of zzzzz.clpi (Clip Information file) shown in FIG. 45 is explained. The ClipInfo_Start_address indicates the leading end address of ClipInfo( ) with the relative number of bytes from the leading end byte of the zzzzz.clpi file as a unit. The relative number of bytes is counted from zero.

The STC_Info_Start_address indicates the leading end address of STC_Info with the relative number of bytes from the leading end byte of the zzzzz.clpi file as a unit. The ProgramInfo_Start_address indicates the leading end address of ProgramInfo( ) with the relative number of bytes from the leading end byte of the zzzzz.clpi file as a unit. The relative number of bytes is counted from 0. The CPI_Start_address indicates the leading end address of CPI( ) with the relative number of bytes from the leading end byte of the zzzzz.clpi file as a unit. The relative number of bytes is counted from zero.

The ClipMark_Start_address indicates the leading end address of ClipMark( ) with the relative number of bytes from the leading end byte of the zzzzz.clpi file as a unit. The relative number of bytes is counted from zero. The_Makers PrivateData Start_address indicates the leading end address of MakersPrivateData( ) with the relative number of bytes from the leading end byte of the zzzzz.clpi file as a unit. The relative number of bytes is counted from zero. The padding_word is inserted in accordance with the syntax of the zzzzz.clpi file. N1, N2, N3, N4 and N5 must be zero or optional positive integers. The respective padding words may also assume optional values.

The ClipInfo is now explained. FIG. 46 shows the syntax of ClipInfo. FIG. 46 shows the syntax of ClipInfo. In the ClipInfo( ) is stored the attribute information of corresponding AV stream files (Clip AV stream or Bridge-Clip AV stream file).

Turning to the syntax of the ClipInfo shown in FIG. 46, version_number is the four character letters indicating the version number of this ClipInfo( ). The version_number must be encoded to "0045" in accordance with the ISO 646. Length is a 32-bit unsigned integer indicating the number of bytes of ClipInfo( ) from directly at back of the length field to the trailing end of the ClipInfo( ). An 8-bit field of Clip_stream_type indicates the type of the AV stream corresponding to the Clip Information file, as shown in FIG. 47. The stream types of the respective AV streams will be explained subsequently.

The 32-bit field of offset_SPN gives an offset value of the source packet number of the first source packet number of the first source packet of the AV stream (Clip AV stream or the Bridge-Clip AV stream). When the AV stream file is first recorded on the disc, this offset_SPN must be zero.

Figure 48:
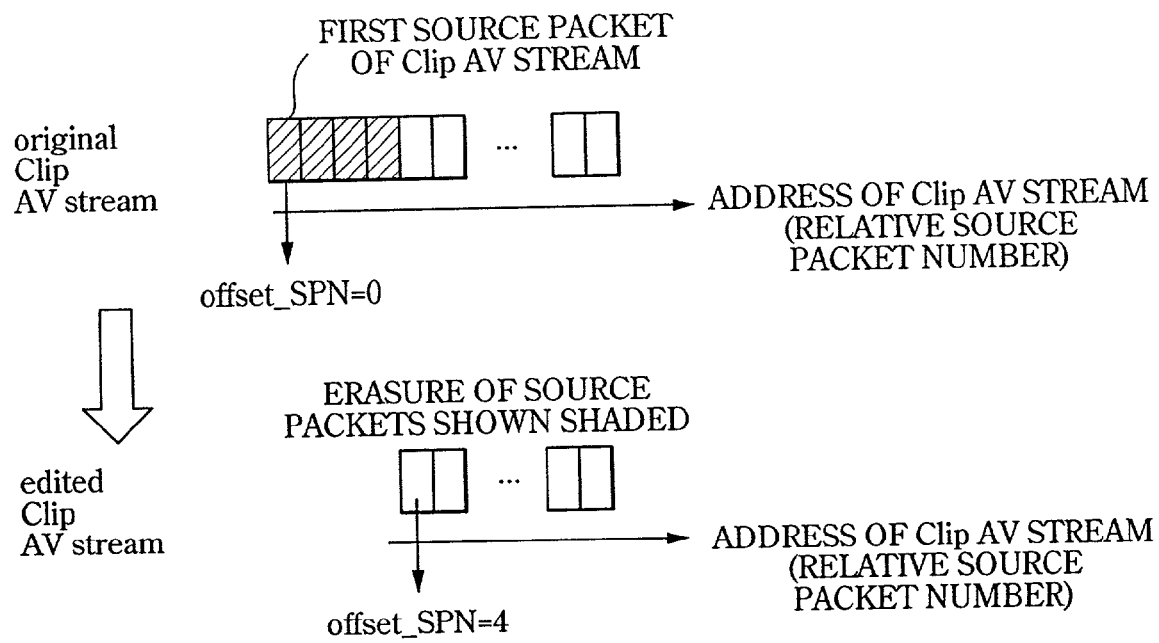
FIG. 48 illustrates offset_SPN.
Figure 49:
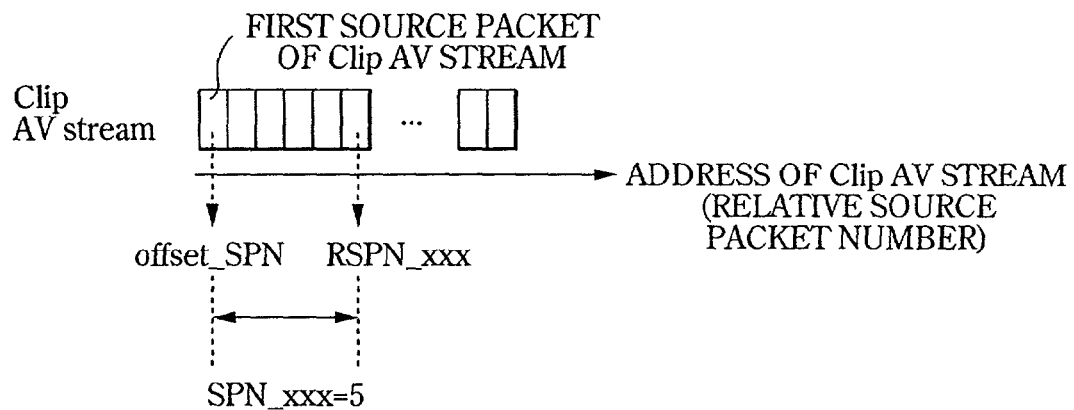
FIG. 49 illustrates offset_SPN.

Referring to FIG. 48, when the beginning portion of the AV stream file is erased by editing, offset_SPN may assume a value other than 0. In the present embodiment, the relative source packet number (relative address) referencing the offset_SPN is frequently described in the form of RSPNxxx, where xxx is modified such that RSPN_xxx is RAPN_EP_start. The relative source packet number is sized with the source packet number as a unit and is counted from the first source packet number of the AV stream file with the value of the offset_SPN as the initial value.

The number of source packets from the first source packet of the AV stream file to the source packet referenced by the relative source packet number (SPN_xxx) is calculated by the following equation:

SPN_xxx=RSPN_xxx−offset_SPN

FIG. 48 shows an instance in which offset_SPN is 4.

TS_recording_rate is a 24-bit unsigned integer, which affords an input/output bit rate required for the AV stream to the DVR drive (write unit 22) or from the DVR drive (readout unit 28). The record_time_and date is a 56-bit field for storing the date and time of recording of the AV stream corresponding to the Clip and is an encoded representation of year/month/day/hour/minute in 4-bit binary coded decimal (BCD) for 14 numerical figures. For example, 2001/2/23:01:02:03 is encoded to "0×20011223010203".

The duration is a 24-bit field indicating the total playback time of the Clip by hour/minute/second based on arrival time clocks. This field is six numerical figures encoded in 4-bit binary coded decimal (BCD). For example, 01:45:30 is encoded to "0×014530".

A flag time_controlled_flag indicates the recording mode of an AV stream file. If this time_controlled_flag is 1, it indicates that the recording mode is such a mode in which the file size is proportionate to the time elapsed since recording, such that the condition shown by the following equation:

Ts_average_rate*192/188*(t−start_time)−
α>=size_clip(t)>=
TS_average_rate*192/188*(t−start_time)+α where TS_average_rate is an average bit rate of the transport stream of the AV stream file expressed by bytes/second.

In the above equation, t denotes the time in seconds, while start_time is the time point when the first source packet of the AV stream file was recorded. The size_clip(t) is 10*192 bytes and α is a constant dependent on TS_average_rate.

If time_controlled_flag is set to 0, it indicates that the recording mode is not controlling so that the time lapse of recording is proportionate to the file size of the AV stream. For example, the input transport stream is recorded in a transparent fashion.

If time_controlled_flag is set to 1, the 24-bit field of TS_average_rate indicates the value of TS_average_rate used in the above equation. If time_controlled flag is set to 0, this field has no meaning and must be set to 0. For example, the variable bit rate transport stream is encoded by the following sequence: First, the transport rate is set to the value of TS_recording_rate. The video stream is encoded with a variable bit rate. The transport packet is intermittently encoded by not employing null packets.

The 32-bit field of RSPN_arrival_time_discontinuity is a relative address of a site where arrival timebase discontinuities are produced on the Bridge-Clip AV stream file. The RSPN_arrival_time_discontinuity is sized with the source packet number as a unit and is counted with the value of offset_SPN defined in the ClipInfo( ) as from the first source packet of the Bridge-Clip AV stream file. An absolute address in the Bridge-Clip AV stream file is calculated based on the aforementioned equation:

SPN_xxx=RSPN_xxx−offset_SPN

The 144-bit field of reserver_for_system_use is reserved for a system. If is_format_identifier_valid flag is 1, it indicates that the field of format_identifier is effective. If is_format_identifier_valid flag is 1, it indicates that the format_identifier field is valid. If original_network_ID_valid flag is 1, it indicates that the field of is_transport stream_ID-valid is valid. If the flag is transport_stream_ID-valid is 1, it indicates that the transport_stream_ID field is valid. If is_servece_ID_valid flag is 1, it indicates that the servece_ID field is valid.

If is_country_code_valid flag is 1, it indicates that the field country_code is valid. The 32-bit field of format_identifier indicates the value of format_identifier owned by a registration descriptor (defined in ISO/IEC13818-1) in the transport stream. The 16-bit field of original_network_ID indicates the value of the original_network_ID defined in the transport stream.

The 16-bit field in servece_ID denotes the value of servece_ID defined in the transport stream. The 24-bit field of country_code shows a country code defined by ISO3166. Each character code is encoded by IS08859-1. For example, Japan is represented as "JPN" and is encoded to "0×4A 0×50 0×4E". The stream_format_name is 15 character codes of ISO-646 showing the name of a format organization affording stream definitions of transport streams. An invalid byte in this field has a value of '0×FF'.

Format_identifier, original_network_ID, transport_stream_ ID, servece_ID, country_code and stream_format_name indicate service providers of transport streams. This allows to recognize encoding limitations on audio or video streams and stream definitions of private data streams other than audio video streams or SI (service information). These information can be used to check if the decoder is able to decode the stream. If such decoding is possible, the information may be used to initialize the decoder system before starting the decoding.

Figure 50A:
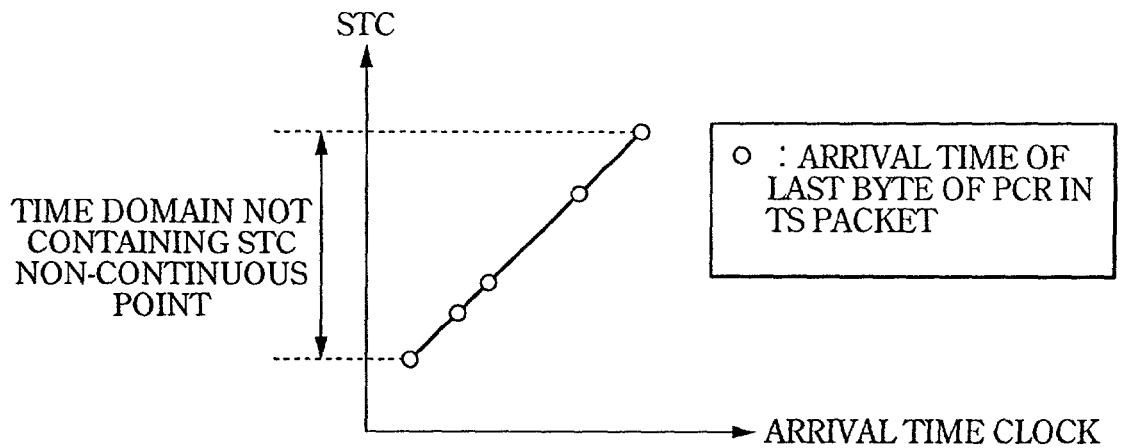
FIGS. 50A, 50B illustrate the STC domain.
Figure 50B:
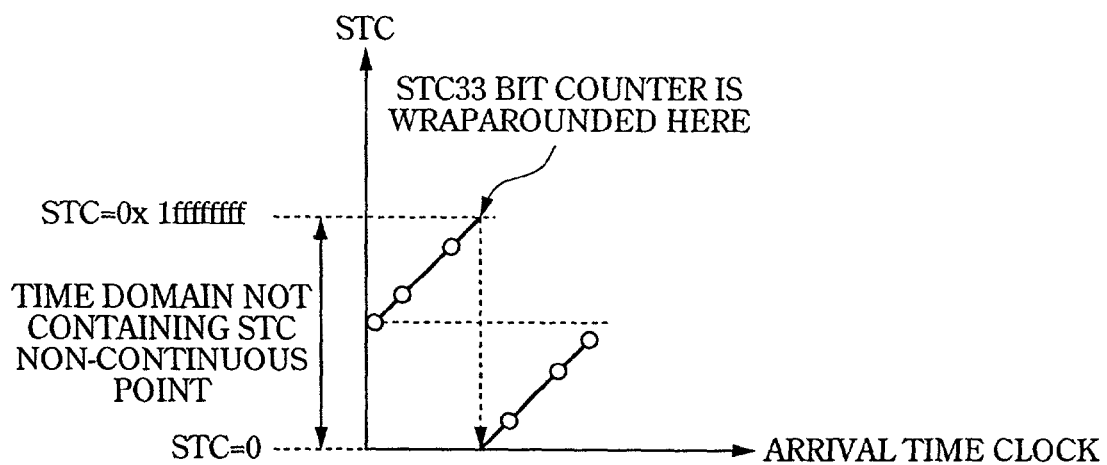

STC_Info is now explained. The time domain in the MPEG-2 transport stream not containing STC discontinuous points(discontinuous points of the system time base) is termed the STC_sequence. In the Clip, STC_sequence is specified by the value of STC_sequence_id. FIGS. 50A and 50B illustrate a continuous STC domain. The same STC values never appear in the same STC_sequence, although the maximum tine length of Clip is limited, as explained subsequently. Therefore, the same PTS values also never appear in the same STC_sequence. If the AV stream contains N STC discontinuous points, where N>0, the Clip system time base is split into (N+1) STC_sequences.

Figure 51:
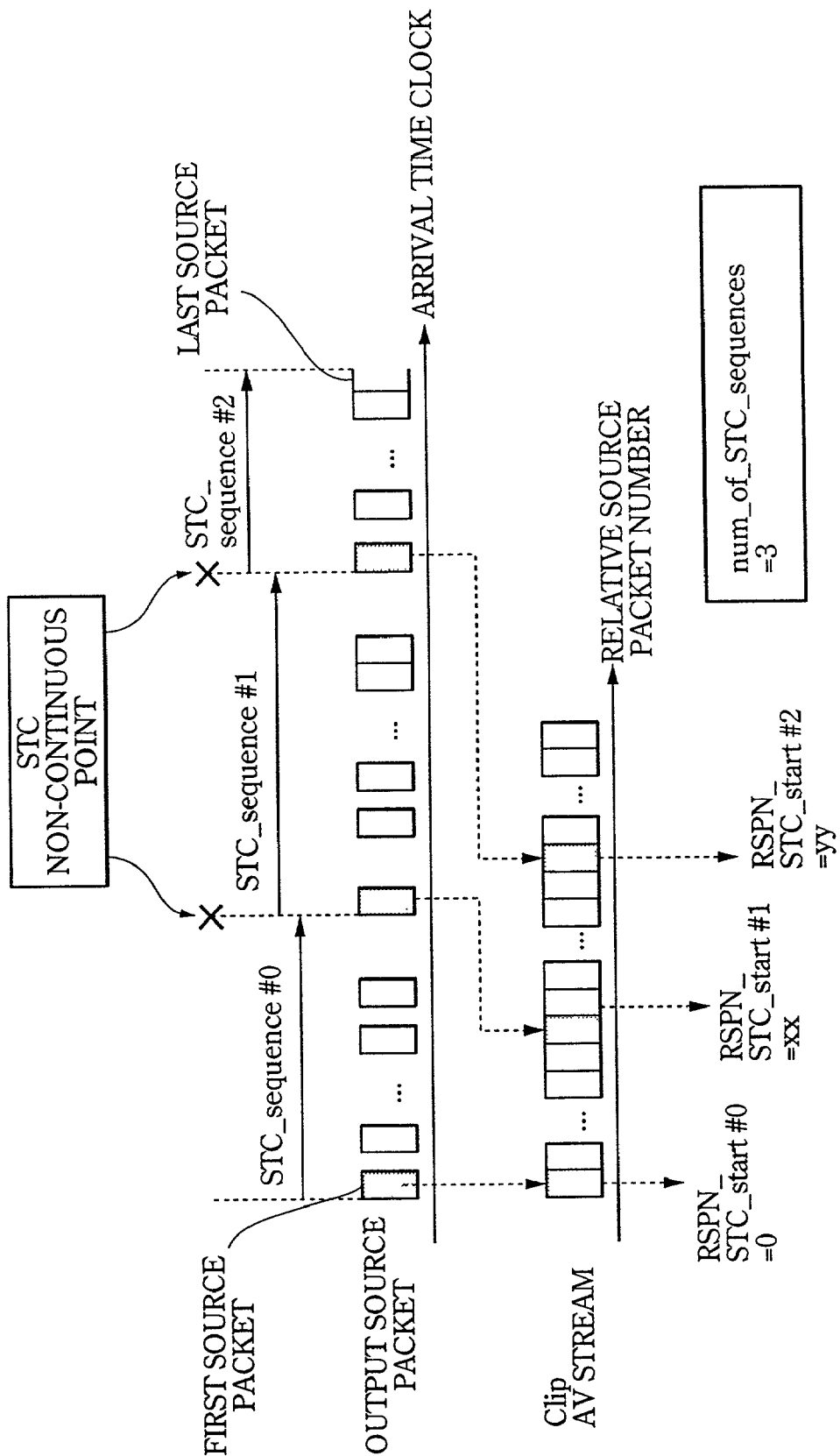
FIG. 51 illustrates STC_Info.

STC_Info stores the address of the site where STC discontinuities (system timebase discontinuities) are produced. As explained with reference to FIG. 51, the RSPN_STC_start indicates the address and begins at a time point of arrival of the source packet referenced by the (k+1)st RSPN_STC_start and ends at a time point of arrival of the last source packet.

FIG. 52 shows the syntax of the STC_Info. Turning to the syntax of STC_Info shown in FIG. 52, version_number is four character letters indicating the version number of STC_Info( ). The version_number must be encoded to "0045" in accordance with ISO 646.

Length is a 32-bit unsigned integer indicating the number of bytes of STC_Info( ) from directly after this length field to the end of STC_Info. If CPI_type of CPI( ) indicates TU_map type, 0 may be set in this length field. If CPI_type of CPI( ) indicates EP_map type, the num_of_STC_sequence mut be of a value not less than 1.

An 8-bit unsigned integer of num_of_STC_sequence indicates the number of sequences in the Clip. This value indicates the number of the for-loops next following the field. The STC_sequence_id corresponding to the preset STC_sequence is defined by the order in which appears the RSPN_STC_start corresponding to the STC_sequence in the for-loop containing the RSPN_STC_start. The STC_sequence_id commences at 0.

Figure 53:
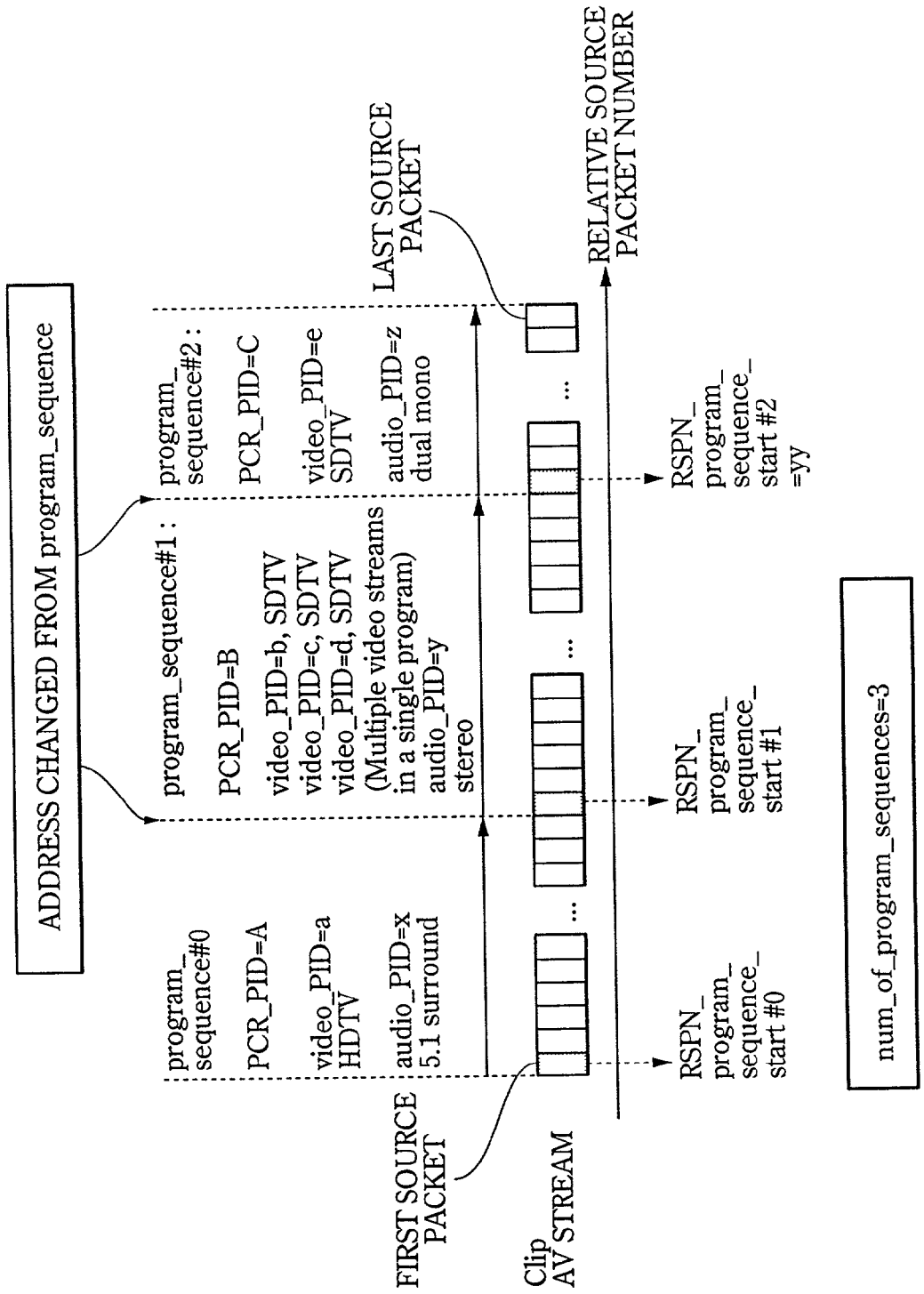
FIG. 53 illustrates ProgramInfo.

The 32-bit field of RSPN_STC_start indicates an address at which the STC_sequence commences on the AV stream file. RSPN_STC_start denotes an address where system time base discontinuities are produced in the AV stream file. The RSPN_STC_start may also be a relative address of the source packet having the first PCR of the new system time base in the AV stream. The RSPN_STC_start is of a size based on the source packet number and is counted from the first source packet of the AV stream file with the offset_SPN value defined in ClipInfo( ) as an initial value. In this AV stream file, the absolute address is calculated by the above-mentioned equation, that is SPN_xxx=RSPN_xxx−offset_SPN ProgramInfo in the syntax of zzzz.clip shown in FIG. 45 is now explained with reference to FIG. 53. The time domain having the following features in the Clip is termed program_sequence. These feature are that the value of PCR_PID is not changed, the number of audio elementary streams is also not changed, the PID values in the respective video streams are not changed, the encoding information which is defined by VideoCondingInfo thereof is not changed, the number of audio elementary streams is also not changed, the PID values of the respective audio streams are not changed, and that the encoding information, which is defined by AudoCodingInfo thereof, is not changed.

Program_sequence has only one system time base at the same time point. Program_sequence has a sole PMT at the same time point. ProgramInfo( ) stores the address of the site where the program_sequence commences. RSPN program_sequence-start indicates the address.

FIG. 54 illustrates the syntax of ProgramInfo. Turning to the ProgramInfo shown in FIG. 54, version_number is four character letters indicating the version number of ProgramInfo( ). The version_number must be encoded to "0045" in accordance with ISO 646.

Length is a 32-bit unsigned integer indicating the number of bytes of ProgramInfo( ) from directly at back of this length field to the end of program(info( ). If CPI_type of CPI( ) indicates the TU_map type, this length field may be set to 0. If the CPI_type of CPI( ) indicates EP_map type, the number_of_programs must be of a value not less than 1.

An 8-bit unsigned integer of number_of_program_sequences denotes the number of program_sequences in the Clip. This value indicates the number of for-loops next following this field. If program_sequence in the Clip is not changed, 1 must be set in the number of program_sequences. A 32-bit field of RSPN_program_sequence_start is a relative address where the program sequence commences on the AV stream.

RSPN_program_sequence_start is sized with the source packet number as a unit and is counted with the value of offset_SPN defined in the ClipInfo( ) as from the first source packet of the AV stream file. An absolute address in the AV stream file is calculated by:

SPN_xxx=RSPN_xxx−offset_SPN

The values of RSPN_program_sequence_start in the for-loop syntax must appear in the rising order.

A 16-bit field of PCR_PID denotes the PID of the transport packet containing an effective PCR field effective for the program_sequence. An 8-bit field of number_of_audios indicates the number of for-loops containing audio_stream_PID and AudoCondingInfo( ). A 16-bit field of video_stream_PID indicates the PID of the transport packet containing a video stream effective for its program_sequence. VideoCodingInfo( ), next following this field, must explain the contents of the video stream referenced by its video_stream_PID.

A 16-bit field of audio_stream_PID indicates the PID of a transport packet containing the audio stream effective for its program_sequence. The AudioCodingInfo( ), next following this field, must explain the contents of the video stream referenced by its audio_stream_PID.

The order in which the values of video_stream_PID in the for-loop of the syntax must be equal to the sequence of PID encoding of the video stream in the PMT effective for the program_sequence. Additionally, the order in which the values of audio_stream_PID appears in the for-loop of the syntax must be equal to the sequence of PID encoding of the audio stream in the PMT effective for the program_sequence.

FIG. 55 shows the syntax of VideoCodingInfo in the syntax of the ProgramInfo shown in FIG. 54. Turning to the syntax of the VideoCoding Info shown in FIG. 55, an 8-bit field of video_format indicates the video format corresponding to video_stream_PID in ProgramInfo( ), as shown in FIG. 56.

Referring to FIG. 57, an 8-bit field of frame_rate indicates the video frame rate corresponding to the video_stream_PID in ProgramInfo( ). An 8-bit field of display_aspect_ratio indicates a video display aspect ratio corresponding to video_stream_PID in ProgramInfo( ).

FIG. 59 shows the syntax of AudioCodingInfo in the syntax of ProgramInfo shown in FIG. 54. Turning to the syntax of the AudioCoding Info shown in FIG. 59, an 8-bit field of audio_format indicates the audio encoding method corresponding to audio_stream_PID in ProgramInfo( ), as shown in FIG. 60.

An 8-bit field of audio_component_type indicates an audio component type corresponding to audio_stream_PID in ProgramInfo( ) as shown in FIG. 61, whilst an 8-bit field of sampling_frequency indicates an audio sampling frequency corresponding to audio_stream_PID in ProgramInfo( ) as shown in FIG. 62.

Figure 63:
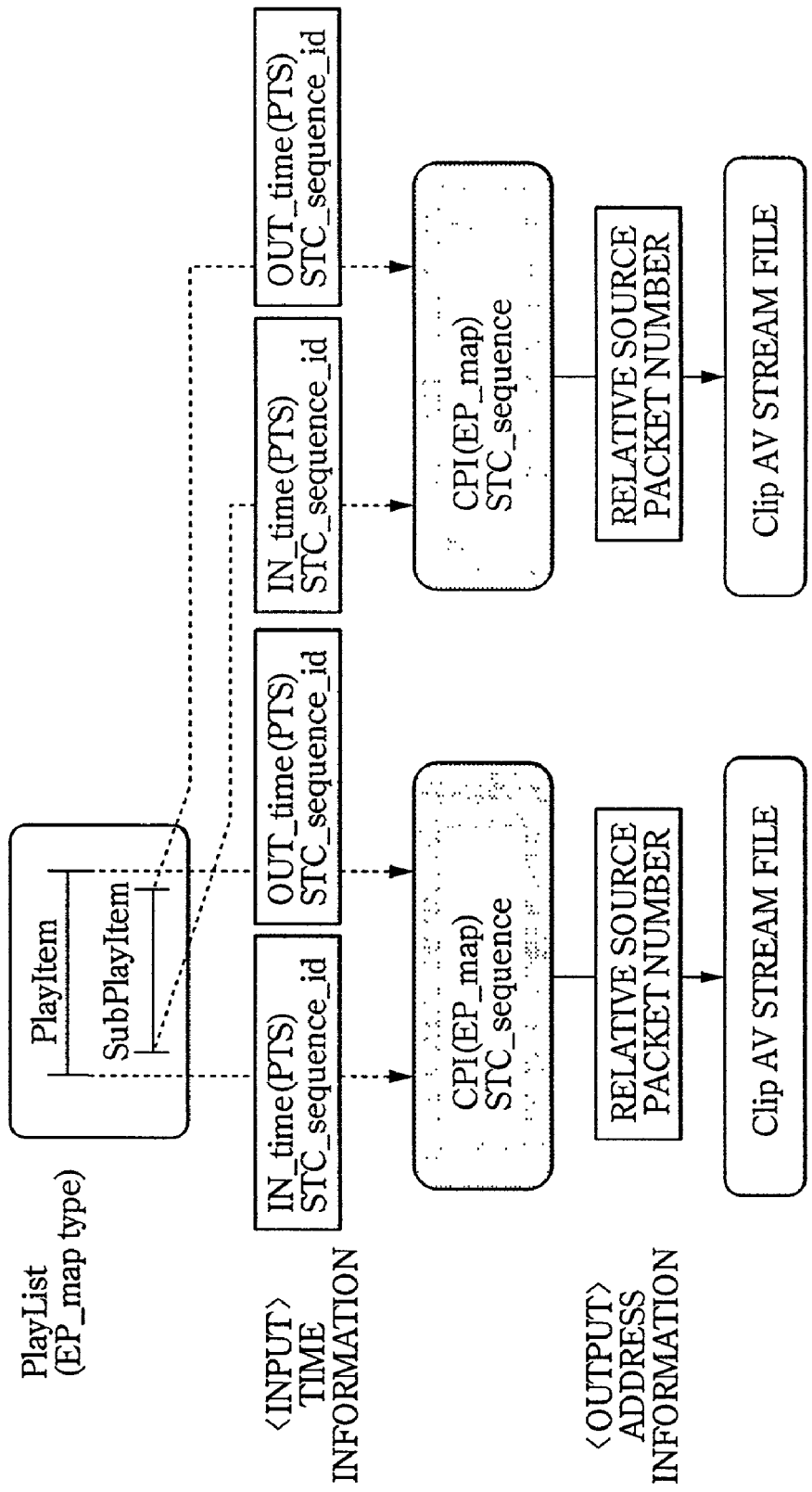
FIG. 63 illustrates CPI.
Figure 64:
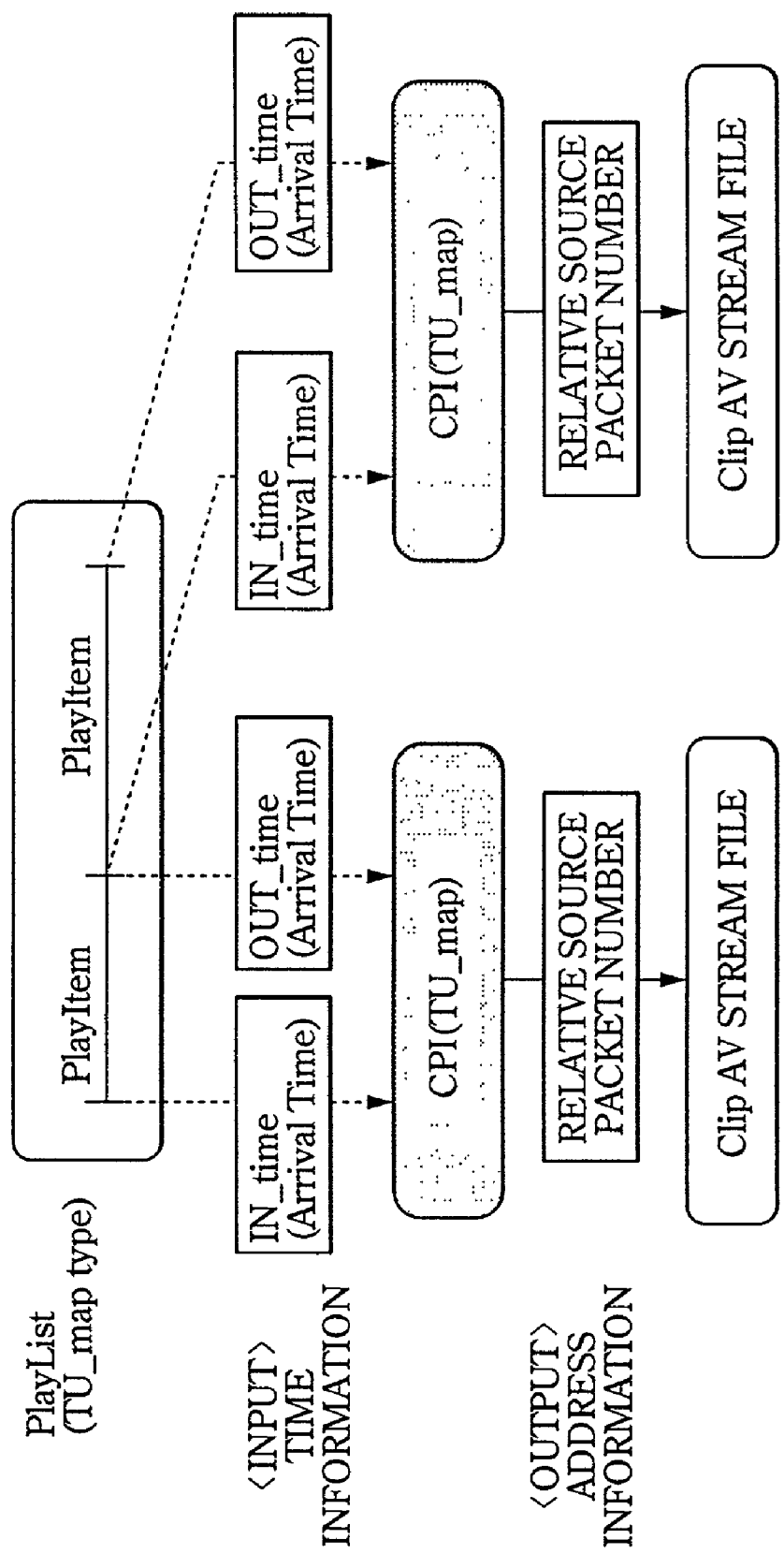
FIG. 64 illustrates CPI.

The CPI (Characteristics Point Information) in the syntax of zzzzz.clip shown in FIG. 45 is explained. The CPI is used for correlating the time information in the AV stream with the address in its file. The CPI is of two types, namely EP_map and TU_map. In FIG. 63, if CPI_type in CPI( ) is EP_map, its CPI( ) contains EP_map. In FIG. 64, if CPI_type in CPI( ) is TU_map, its CPI( ) contains TU_map. One AV stream has one EP_map or one TU_map. If the AV stream is an SESF transport stream, the corresponding Clip must own an EP_map.

FIG. 65 show the syntax of CPI. Turning to the syntax of CPI shown in FIG. 65, the version_number is four character letters indicating the version number of this CPI( ). The version_number must be encoded to "0045" in accordance with ISO 646. Length is a 32-bit unsigned integer indicating the number of bytes as from directly after this length field to the trailing end of the CPI( ). The CPI_type is a 1-bit flag and indicates the CPI type of Clip, as shown in FIG. 66.

The EP_map in the CPI syntax shown in FIG. 65 is explained. There are two types of the EP_map, that is EP_map for a video stream and an EP_map for an audio stream. The EP_map_type in the EP_map differentiates between these EP_map types. If the Clip contains one or more video streams, the EP_map for the video stream must be used. If the Clip does not contain a video stream but contains one or more audio streams, the EP_map for the audio stream must be used.

The EP_map for a video stream is explained with reference to FIG. 67. The EP_map for the video stream has data stream_PID, PTS_EP_start and RSPN_EP_start. The stream_PID shows the PID of the transport packet transmitting a video stream. The PTS_EP_start indicates the PTS of an access unit beginning from the sequence header of the video stream. The RSPN_RP_start indicates the address A of a source packet including the first byte of the access unit referenced by the PTS_EP_start in the AV stream.

A sub table, termed EP_map_for_one_stream_PID( ) is created from one video stream transmitted by the transport packet having the same PID to another. If plural video streams exist in the Clip, the EP_map may contain plural EP_map_for_one_stream PID( ).

The EP_map for audio stream has data stream_PID, PTS_EP_start and RSPN_EP_start. The stream_PID shows a PID of a transport packet transmitting an audio stream. The PTS_EP_start shows the PTS of an accessing unit in the audio stream. The RSPN_EP-start indicates an address of a source packet containing a first byte of the access unit referenced by PTS_EP_start of the AV stream.

The sub table termed EP_map_for_one_stream_PID( ) is created from one audio stream transmitted by the transport packet having the same PID to another. If there exist plural audio streams in the Clip, EP_map may contain plural EP_map_for_one_stream_PID( ).

Figure 68:
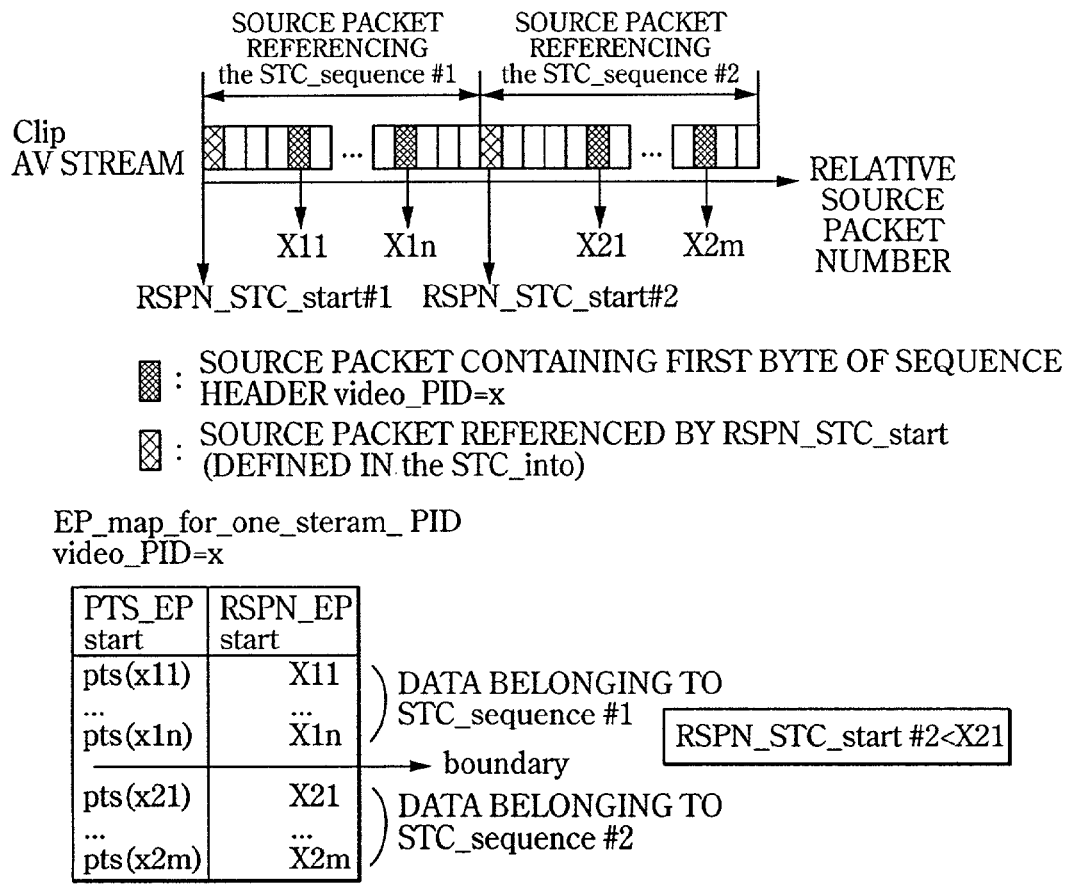
FIG. 68 illustrates EP_map.
Figure 69:
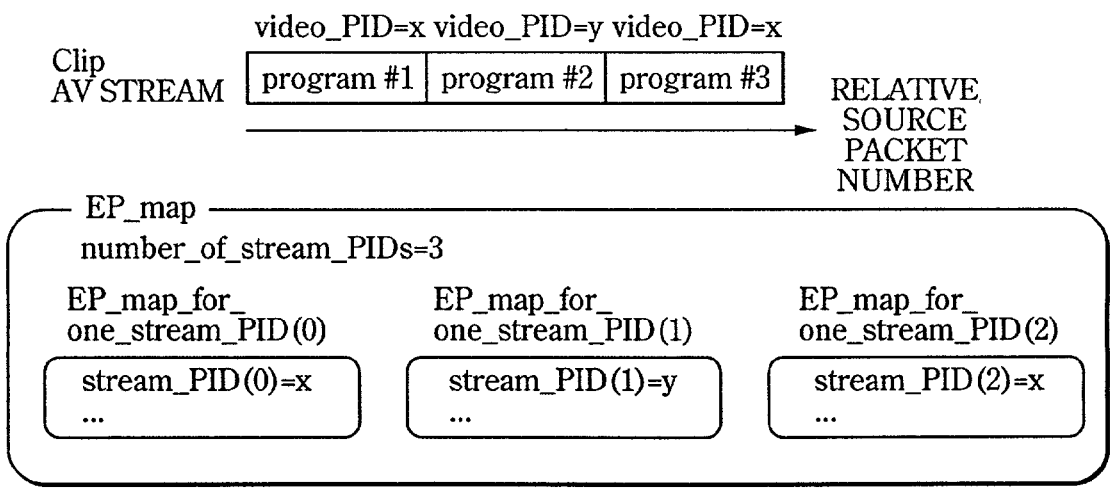
FIG. 69 illustrates EP_map.

Turning to the relation between EP_map and STC_Info, one EP_map for_one_stream_PID( ) is created in one table irrespective of discontinuous points in the STC. Comparison of the value of the RSPN_EP_start to the value of RSPN_STC_start defined in STC_Info( ) reveals the boundary of data of EP_map belonging to respective STC_sequences (see FIG. 68). The EP_map must have one EP_map_for_one_stream_PID for a continuous stream range transmitted by the same PID. In the case shown in FIG. 69, program#1 and program#3 have the same video PID, however, the data range is not continuous, so that EP_map_for_one_stream_PID must be provided for each program.

FIG. 70 shows the EP_map syntax. By way of explanation of the EP_map syntax shown in FIG. 70, the EP_type is a 4-bit field and shows the EP_map entry point type, as shown in FIG. 71. The EP_type shows the semantics of the data field next following this field. If Clip includes one or more video stream, the EP_type must be set to 0 ('video'). Alternatively, if the Clip contains no video stream but contains one or more audio stream, then EP_type must be set to 1 ('audio').

The 16-bit field of number_of_stream_PIDs indicates the number of times of loops of the for-loop having number_of_stream_PIDs in the EP_map( ) as a variable. The 16-bit field of stream_PID(k) indicates the PID of the transport packet transmitting the number k elementary stream (video or audio stream) referenced by EP_map_for_one_stream_PID (num_EP_entries(k)). If EP_type is 0 ('video'), its elementary stream must be a video stream. If EP_type is equal to 1 ('audio'), its elementary stream must be the audio stream.

The 16-bit field of num_EP_entries(k) indicates the num_EP_entries(k) referenced by EP_map_entries(k)). The EP_map_for_one_stream_PID_Start_address(k): This 32-bit field indicates the relative address position at which the EP_map_for_one_stream_PID(num_EP_entries(k)) begins in the EP_map( ). This value is indicated by the size as from the first byte of the EP_map( ).

Padding_word must be inserted in accordance with the EP_map( ) syntax. X and Y must be optional positive integers. The respective padding words may assume any optional values.

FIG. 72 shows the syntax of EP_map_for_one_stream_PID. By way of explanation of the syntax of the EP_map_for_one_stream_PID shown in FIG. 72, the semantics of the 32-bit field of PTS_EP_start differs with the EP_type defined by EP_map( ). If EP_type is equal to 0 ('video'), this field has upper 32 bits of the 33-bit precision PTS of the access unit beginning with a sequence header of the video stream. If the EP_type is equal to 1 ('audio'), this field has upper 32 bits of PTS of 33 bit precision of the access unit of the audio stream.

The semantics of the 32-bit field of RSPN_EP_start differs with the EP_type defined in EP_map( ). If EP_type is equal to 0 ('video'), this field indicates the relative address of the source packet including the first byte of the sequence header of the access unit referenced by the PTS_EP_start in the AV stream. Alternatively, if EP_type is equal to 1 ('audio'), this field indicates the relative address of the source packet containing the first byte in the audio stream of the access unit referenced by the PTS_EP_start in the AV stream.

RSPN_EP_start is of a size which is based on the source packet number as a unit, and is counted from the first source packet of the AV stream file, with the value of the offset_SPN, defined in ClipInfo( ), as an initial value. The absolute address in the AV stream file is calculated by $$SPN\_xxx = RSPN\_xxx - offset\_SPN$$

It is noted that the value of the RSPN_EP_start in the syntax must appear in the rising order.

Figure 73:
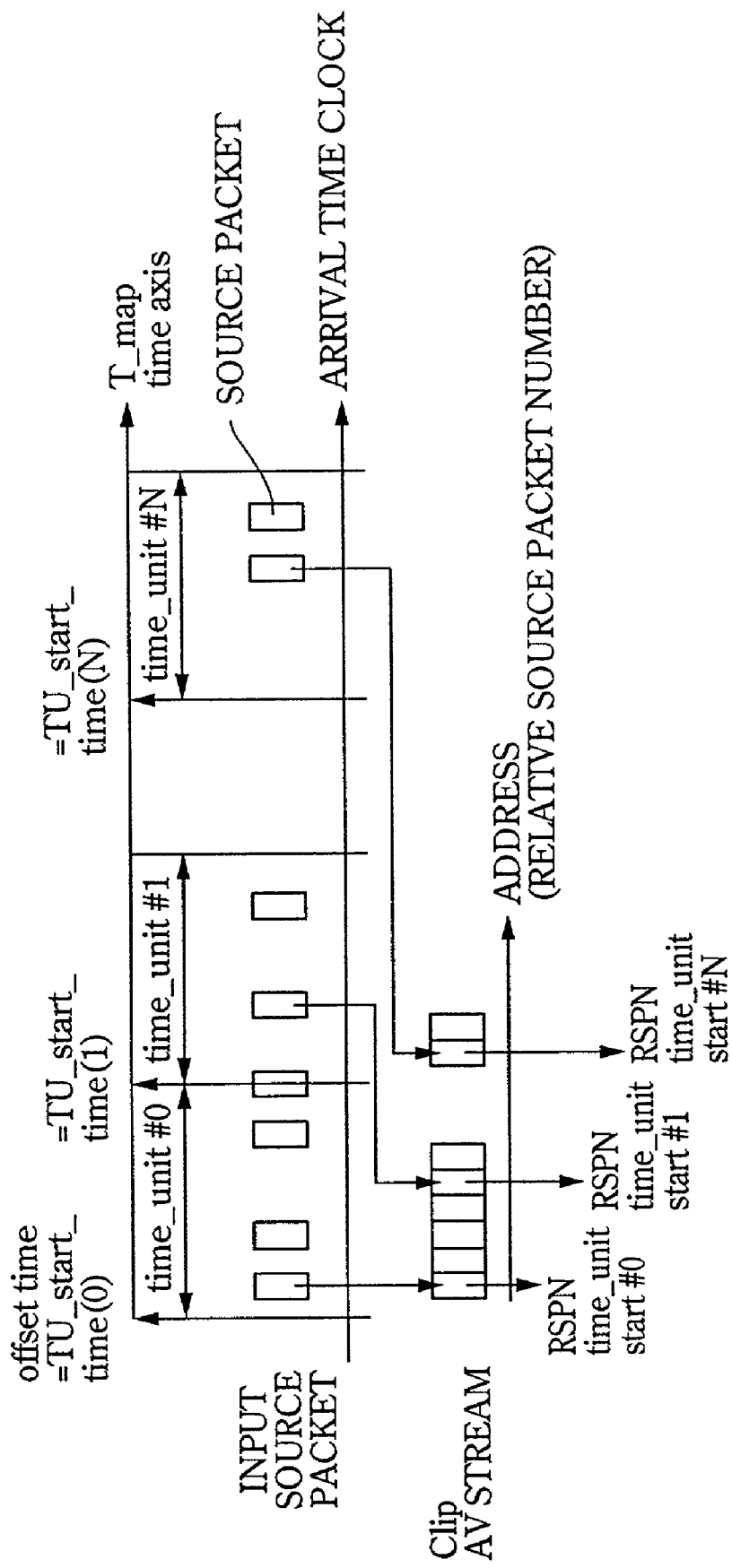
FIG. 73 illustrates TU_map.

The TU_map is now explained with reference to FIG. 73. TU_map forms a time axis based on the source packet arrival time clock (timepiece of the arrive time base). This time axis is termed TU_map_time_axis. The point of origin of TU_map_time_axis is indicated by offset_time in the TU_map( ). TU_map_time_axis is divided in a preset unit as from offset_time, this unit being termed time_unit.

In each time_unit in the AV stream, addresses on the AV stream file of the source packet in the first complete form are stored in TU_map. These addresses are termed RSPN_time_unit_start. The time at which begins the k(k≧0)th time_unit on the TU_map_time_axis is termed TU_start_time(k). This value is calculated based on the following equation:

$$TU\_start\_time(k) = offset\_time + k*time\_unit\_size$$

It is noted that TU_start_time(k) has a precision of 45 kHz.

FIG. 74 shows the syntax of TU_map. By way of explanation of the TU_map syntax shown in FIG. 74, the 32-bit field of offset_time gives an offset time relative to TU_map_time_axis. This value indicates the offset time relative to the first time_unit in the Clip. The offset_time is of a size based on 45 kHz clock derived from the 27 MHz precision arrival time clocks as unit. If the AV stream is to be recorded as new Clip, offset_time must be set to 0.

The 32-bit field of time_unit_size affords the size of the time_unit, and is based on 45 kHz clocks, derived from the 27 MHz precision arrival time clocks, as unit. Preferably, time_unit_size is not longer than one second (time_unit_size≦45000). The 32bit field of number_of_time_unit_entries indicates the number of entries stored in TU_map( ).

The 32-bit field of RSN_time_unit_start indicates the relative address of a site in the AV stream at which begins each time_unit. RSN_time_unit_start is of a size based on the source packet number as unit and is counted with the value of offset_SPN defined in ClipInfo( ) as from the first source packet of the AV stream file as an initial value. The absolute address in the AV stream file is calculated by SPN_xxx=RSPN_xxx−offset_SPN It is noted that the value of RSN_time_unit_start in the for-loop of the syntax must appear in the rising order. If there is no source packet in the number (k+1) time_unit, the number (k+1) RSN_time_unit_start must be equal to the number k RSPN_time_unit_start.

By way of explanation of the ClipMark in the syntax of zzzzz.clip shown in FIG. 45, the ClipMark is the mark information pertinent to clip and is stored in the ClipMark. This mark is not set by a user, but is set by a recorder (recording and/or reproducing apparatus 1).

FIG. 75 shows the ClipMark syntax. By way of explanation of the ClipMark syntax shown in FIG. 75, the version_number is four character letters indicating the version number of this ClipMark. The version_number must be encoded in accordance with ISO 646 to "0045".

Length is a 32-bit unsigned integer indicating the number of bytes of the ClipMark( ) as from directly after the length field to the trailing end of ClipMark( ). The number_of_Clip_marks is a 16-bit unsigned integer indicating the number of marks stored in ClipMark and may be equal to 0. Mark_type is an 8-bit field indicating the mark type and is encoded in accordance with the table shown in FIG. 76.

Mark_time_stamp is a 32-bit field and stores the time stamp indicating a pointer having a specified mark. The semantics of mark_time_stamp differs with CPI_type in the PlayList( ), as shown in FIG. 77.

If CPI_type in CPI( ) indicates the EP_map type, this 8-bit field indicates the STC_sequence_id of the continuous STC domain where there is placed mark_time_stamp. If CPI_type in CPI( ) indicates TU_map type, this 8-bit field has no meaning but is set to 0. The 8-bit field of Character_set indicates the indicating method of character letters encoded in the mark_name field. The encoding method corresponds to the value shown in FIG. 19.

The 8-bit field of name_length indicates the byte length of the mark name shown in the mark_name field. This mark name field indicates the mark name. The byte number corresponding to the number of the name_length from left of this field is the effective character number and denotes the mark name. In the mark name field, the values next following these effective character letters may be arbitrary.

The field of ref_thumbnail_index indicates the information of the thumbnail picture appended to the mark. If the ref_thumbnail_index field is of a value different from 0×FFFF, a thumbnail picture is added to its mark, with the thumbnail picture being stored in the mark.thumb file. This picture is referenced using the value of ref_thumbnail_index in the mark.thumb file. If the ref_thumbnail_index field is of a value equal to 0×FFFF, a thumbnail picture is not appended to its mark.

MakerPrivateData has already been explained with reference to FIG. 22 and hence is not explained here specifically.

Next, thumbnail_information is explained. A thumbnail picture is stored in a menu.thmb file or in a mark.thmb file. These files are of the same syntax structure and own a sole Thumbnail( ). The menu.thmb file stores a picture representing respective PlatyLists. The totality of menu thumbnails are stored in the sole menu.thmb file.

The mark.thmb file stores a mark thumbnail picture, that is a picture representing a mark point. The totality of mark thumbnails corresponding to the totality of PlayLists and Clips are stored in the sole mark.thmb file. Since the thumbnails are frequently added or deleted, the operation of addition and partial deletion must be executable readily and speedily. For this reason, Thmbnail( ) has a block structure. Picture data is divided into plural portions each of which is stored in one tn_block. One picture data is stored in consecutive tn_blocks. In the string of tn_blocks, there may exist a tn_block not in use. The byte length of a sole thumbnail picture is variable.

FIG. 78 shows the syntax of menu.thmb and mark.thmb and FIG. 79 the syntax of Thumbnail in the syntax of menu.thmb and mark.thmb shown in FIG. 78. By way of explanation of the syntax of Thumbnail, shown in FIG. 79, version_number is four character letters denoting the version number of this Thumbnail( ). Version_number must be encoded to "0045" in accordance with ISO 646.

Length is a 32-bit unsigned integer indicating the number of bytes of MakerPrivateData( ) as from directly at back of the length field up to the trailing end of Thumbnail( ). Tu_block_start_address is a 32-bit unsigned integer indicating the leading end byte address of the first tn_block, in terms of the relative number of bytes as from the leading end byte of Thumbnail( ) as a unit. The number of relative bytes is counted from 0. Number_of_thumbnails is a 16-bit unsigned integer which gives the number of entries of a thumbnail picture contained in Thumbnail( ).

Tu_block_size is a 16-bit unsigned integer which gives the size of one tn_block, in terms of 1024 bytes as a unit. If, for example, tn_block_size=1, it indicates that the size of one tn_block is 1024 bytes. Number_of_tn_blocks is a 116-bit unsigned integer indicating the number of entries of tn_block in this Thumbnail( ). Thumbnail_index is a 16-bit unsigned integer indicating the index number of the thumbnail picture represented by the thumbnail information for one for-loop beginning from the thumbnail_index field. The value 0×FFFF must not be used as Thumbnail_index. This Thumbnail_index is referenced by ref_thumbnail_index in UIAppInfoVolume( ), UIAppInfoPlayList( ), PlayListMark( ) and ClipMark( ).

Thumbnail_picture_format is an 8-bit unsigned integer representing the picture format of a thumbnail picture and assumes a value shown in FIG. 80. In the table, DCF and PNG are allowed only in menu.thumb. The mark thumbnail must assume the value of "0×00" (MPEG-2 Video 1-picture).

Picture_data_size is a 32-bit unsigned integer indicating the byte length of a thumbnail picture in terms of bytes as a unit. Start_tn_block_number is a 16-bit unsigned integer indicating the tn_block number of the tn_block where data of the thumbnail picture begins. The leading end of the thumbnail picture data must coincide with the leading end of the tn_block. The tn_block number begins from 0 and is relevant to the value of a variable k in the for-loop of tn_block.

X_picture_length is a 16-bit unsigned integer indicating the number of pixels in the horizontal direction of a frame of a thumbnail picture. Y_picture_length is a 16-bit unsigned integer indicating the number of pixels in the vertical direction of a frame of a thumbnail picture. Tn_block is an area in which to store a thumbnail picture. All tn_block in the Thumbnail( ) are of the same size (fixed length) and are of a size defined by tn_block_sixe.

FIGS. 81A and 81B schematically show how thumbnail picture data are stored in tn_block. If, as shown in FIGS. 81A and 81B, the thumbnail picture begins at the leading end of tn_block, and is of a size exceeding 1 tn block, it is stored using the next following tn_block. By so doing, data with a variable length can be managed as fixed length data, so that the editing of deletion can be coped with by simpler processing.

An AV stream file is now explained. The AV stream file is stored in the "M2TS" directory (FIG. 14). There are two types of the AV stream file, namely a Clip A stream file and a Bridge-Clip AV stream file. Both AV streams must be of the structure of DVR MPEG-2 transport stream file as hereinafter defined.

Figure 82:
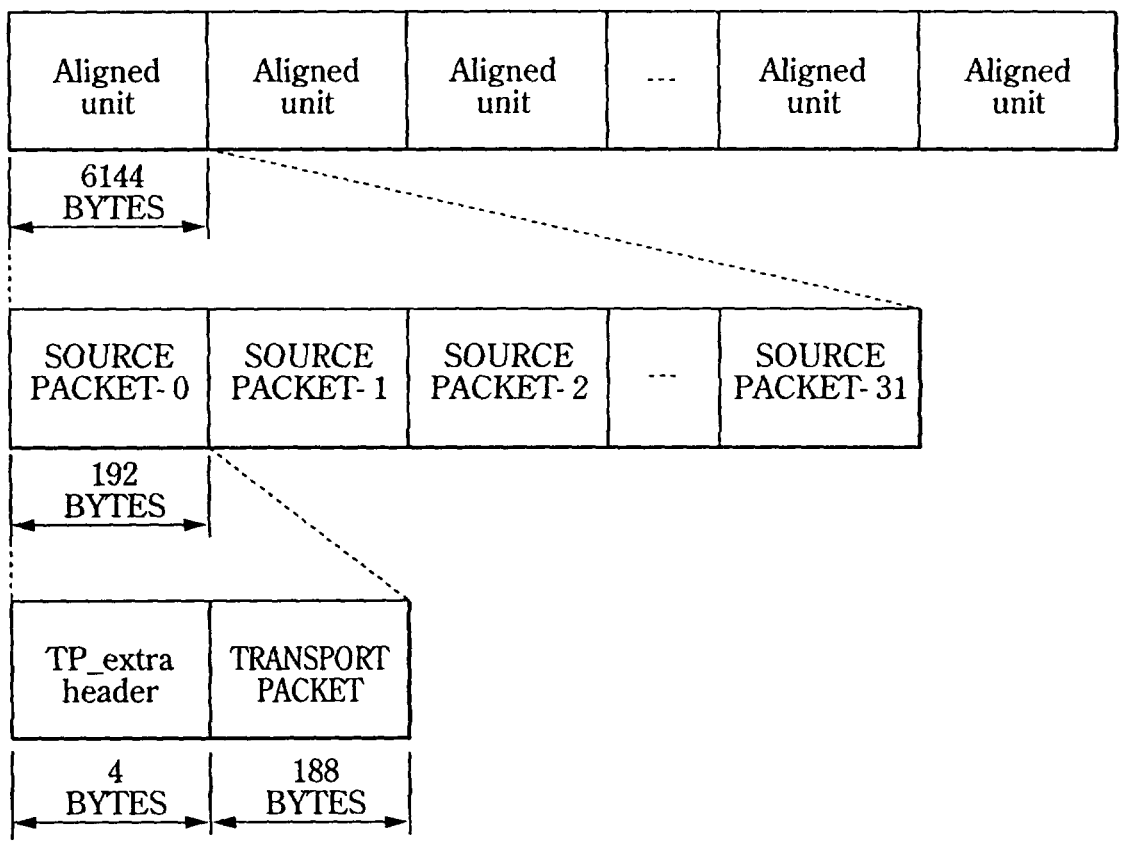
FIG. 82 illustrates a structure of a transport stream of DVR MPEG2.

First, the DVR MPEG2 transport stream is explained. The structure of the DVR MPEG-2 transport stream is shown in FIG. 82. The AV stream file has the structure of a DVR MPEG 2 transport stream. The DVR MPEG 2 transport stream is made up of an integer number of Aligned units. The size of the aligned unit is 6144 bytes (2048*3 bytes). The Aligned unit begins from the first byte of the source packet. The source packet is 192 bytes long. One source packet is comprised of TP_extra_header and a transport packet. TP_extra_header is 4 bytes long, with the transport packet being 188 bytes long.

One Aligned unit is made up of 32 source packets. The last Aligned unit in the DVR MPEG 2 transport stream is also made up of 32 source packets. Therefore, the DVR MPEG 2 transport stream ends at a boundary of the Aligned unit. If the number of the transport packets of the input transport stream recorded on a disc is not a multiple of 32, a source packet having a null packet (transport packet of PID=0×1FFFF) must be used as the last Aligned unit. The file system must not use excess information in the DVR MPEG 2 transport stream.

Figure 83:
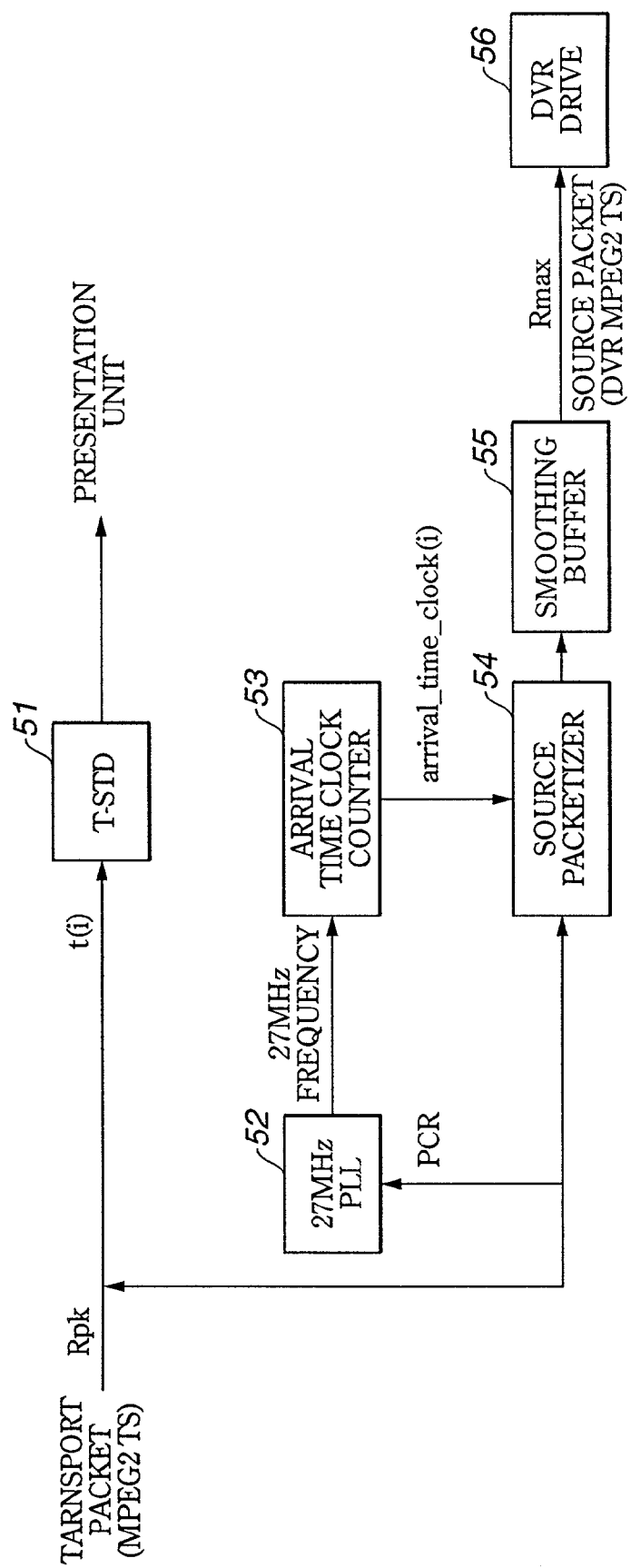
FIG. 83 shows a recorder model of a transport stream of DVR MPEG2.

FIG. 83 shows a recorder model of the DVR MPEG 2 transport stream. The recorder shown in FIG. 83 is a conceptual model for prescribing the recording process. The DVR MPEG 2 transport stream obeys this model.

The input timing of the MPEG 2 transport stream is now explained. The input MPEG 2 transport stream is a full transport stream or a partial transport stream. The input MPEG 2 transport stream must obey the ISO/IEC13818-1 or ISO/IEC 13818-9. The number i byte of the MPEG 2 transport stream is input simultaneously at time t(i) to T-STD (transport stream system target decoder provided for in SO/IEC13818-1) and to the source packetizer. Rpk is an instantaneous maximum value of the input rate of the transport packet.

A 27 MHz PLL 52 generates a frequency of 27 MHz clock. The 27 MHz clock frequency is locked at a value of the program clock reference (PCR) of the MPEG 2 transport stream. An arrival time clock counter 53 counts the pulses of the 27 MHz frequency. Arrival_time_clock(i) is a count value of the arrival time clock counter at time t(i).

A source packetizer 54 appends TP_extra header to the totality of the transport packets to create a source packet. Arrival_time_stamp indicates the time when the first byte of the transport packet reaches both the T-STD and the source packetizer. Arrival_time_stamp(k) is a sampled value of the Arrival_time_clock(k) as represented by the following equation:

arrival_time_stamp(k)=arrival_time_clock(k)% 230 where k denotes the first byte of the transport packet.

If the time separation between two neighboring transport packets is 230/2 7000000 sec (about 40 sec) or longer, the difference of the arrival_time_stamp of the two transport packets should be set to 230/2 7000000 sec. The recorder is provided for such case.

A smoothing buffer 55 smoothes the bitrate of the input transport stream. The smoothing buffer must not overflow. Rmax is the output bitrate of the source packet from the smoothing buffer when the smoothing buffer is not null. If the smoothing buffer is null, the output bitrate of the smoothing buffer is 0.

Next, the parameters of the recorder model of the DVR MPEG 2 transport stream are explained. The value of Rmax is given by TS_recording_rate as defined in ClipInfo( ) associated with the AV stream file. This value may be calculated from the following equation:

Rmax=TS_recording_rate*192/188 where the value of TS_recording_rate is of a size in bytes/second.

If the input transport stream is an SESF transport stream, Rpk must be equal to TS_recording_rate as defined in Clip-Info( ) associated with the AV stream file. If the input transport stream is not an SESF transport stream, reference may be made to values defined e.g., in a descriptor of the MPEG 2 transport stream, such as maximum_bitrate_descriptor or partial_stream_descriptor for this value.

If the input transport stream is an SESF transport stream, the smoothing buffer size is 0. If the input transport stream is not an SESF transport stream, reference may be made to values defined in the descriptor of the MPEG 2 transport stream, such as, for example, the values defined in the smoothing_buffer_descriptor, short_smoothing_buffer_descriptor or in the partial_transport_stream_descriptor.

For the recorder and the player (reproducing apparatus), a sufficient size buffer needs to be provided. The default buffer size is 1536 bytes.

Figure 84:
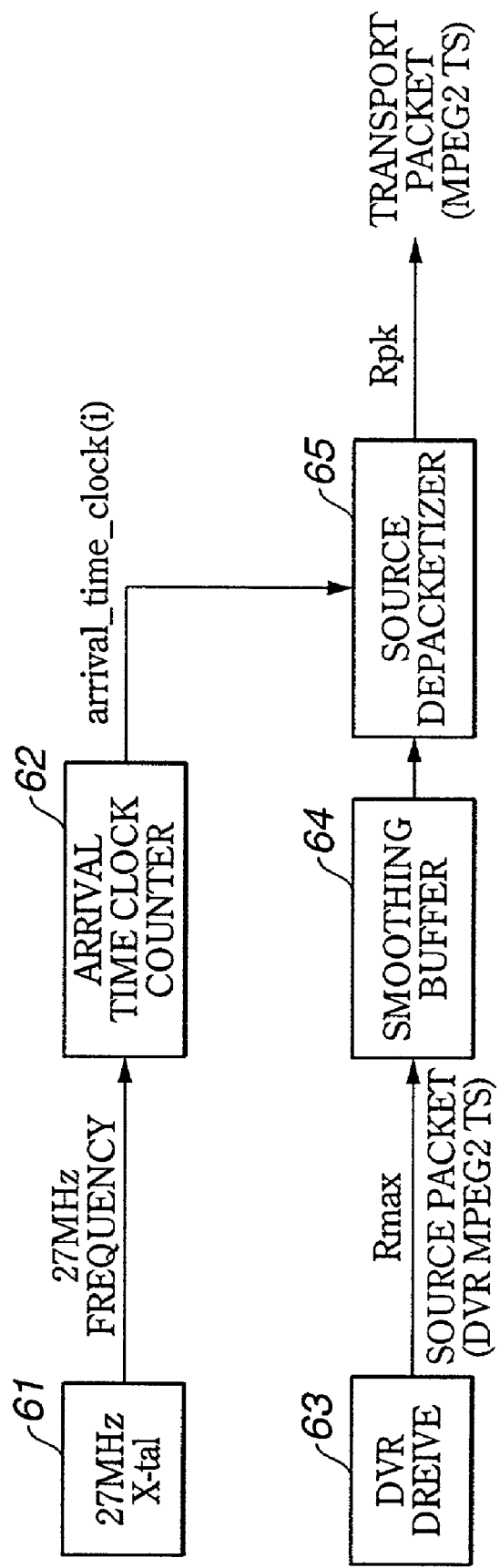
FIG. 84 shows a player model of a transport stream of DVR MPEG2.

Next, a player model of the DVR MPEG 2 transport stream is explained. FIG. 84 shows a player model of the DVR MPEG 2 transport stream. This is a conceptual model for prescribing the reproduction process. The DVR MPEG 2 transport stream obeys this model.

A 27 MHz X-tal 61 generates the frequency of 27 MHz. An error range of the 27 MHx frequency must be ±30 ppm (2 7000000±810 Hz). The arrival time clock counter 62 is a binary counter for counting the pulses of the frequency of 27 MHz. Arrival_time_clock(i) is a count value of the arrival time clock counter at time t(i).

In the smoothing buffer 64, Rmax is the input bitrate of the source packet to the smoothing buffer when the smoothing buffer is not full. If the smoothing buffer is full, the input bitrate to the smoothing buffer is 0.

By way of explaining the output timing of the MPEG 2 transport stream, if the arrival_time_stamp of the current source packet is equal to 30 bits on the LSB side of arrival_time_clock(i), the transport packet of the source packet is removed from the smoothing buffer. Rpk is an instantaneous maximum value of the transport packet rate. The overflow of the smoothing buffer is not allowed.

The parameters of the player model of the DVR MPEG 2 transport stream are the same as those of the recorder model of the DVR MPEG 2 transport stream described above.

FIG. 85 shows the syntax of the source packet. Transport_packet( ) is an MPEG 2 transport stream provided in ISO/IEC 13818-1. The syntax of TP_Extra-header in the syntax of the source packet shown in FIG. 85 is shown in FIG. 86. By way of explaining the syntax of the TP_Extra-header, shown in FIG. 86, copy_permission_indicator is an integer representing the copying limitation of the payload of the transport packet. The copying limitation may be copy free, no more copy, copy once or copying prohibited. FIG. 87 shows the relation between the value of copy_permission_indicator and the mode it designates.

Copy permission_indicator is appended to the totality of transport packets. If the input transport stream is recorded using the IEEE1394 digital interface, the value of copy_permission_indicator may be associated with the value of EMI (encryption mode indicator). If the input transport stream is recorded without employing the IEEE1394 digital interface, the value of copy_permission_indicator may be associated with the value of the CCI embedded in the transport packet. If an analog signal input is self-encoded, the value of copy_permission_indicator may be associated with the value of CGMS-A of the analog signal.

Arrival_time_stamp is an integer having a value as specified by arrival_time_stamp in the following equation:

$$arrival\_time\_stamp(k) = arrival\_time\_clock(k) \% 230$$

By way of defining the ClipAV stream, the ClipAV stream must have a structure of the DVR MPEG 2 transport stream defined as described above. Arrival_time_clock(i) must increase continuously in the Clip AV stream. If there exists a discontinuous point of the system time base (STC base) in the Clip AV stream, arrival_time_clock(i) in the Clip AV stream must increase continuously.

The maximum value of the different of the arrival_time_clock(i) between the beginning and the end of the Clip AV stream must be 26 hours. This limitation guarantees that, if there is no discontinuous point in the system time base (STC base) in the MPEG 2 transport stream, the PTS (presentation time stamp) of the same value never appears in the Clip AV stream. The MPEG 2 system standard provides that the PTS has a wraparound period of 233/90000 sec (about 26.5 hours).

By way of defining the Bridge-Clip AV stream, the Bridge-Clip AV stream must have a structure of the DVR MPEG 2 transport stream defined as described above. The Bridge-Clip AV stream must include a discontinuous point of one arrival time base. The transport stream ahead and at back of the discontinuous point of the arrival time base must obey the encoding limitations and the DVR-STD as later explained.

The present embodiment supports the video-audio seamless connection between PlayItems being edited. Seamless connection between PlayItems guarantees "continuous data supply" to the player/decoder and "seamless decoding processing". The "continuous data supply" is the capability of guaranteeing data supply to the decoder at a bitrate necessary to prevent buffer underflow. In order to enable data to be read out from the disc as data real-time properties are assured, data is to be stored in terms of a continuous block of a sufficiently large size as a unit.

The "seamless decoding processing" means the capability of a player in displaying audio video data recorded on the disc without producing pause or gap in the playback output of the decoder.

The AV stream, referenced by the seamless connected PlayItems, is explained. Whether or not the seamless display of a previous PlayItem and the current PlayItem is guaranteed may be verified from the connection_condition field defined in the current PlayItem. There are two methods for seamless connection of PlayItems, that is a method employing Bridge-Clip and a method not employing Bridge-Clip.

Figure 88:
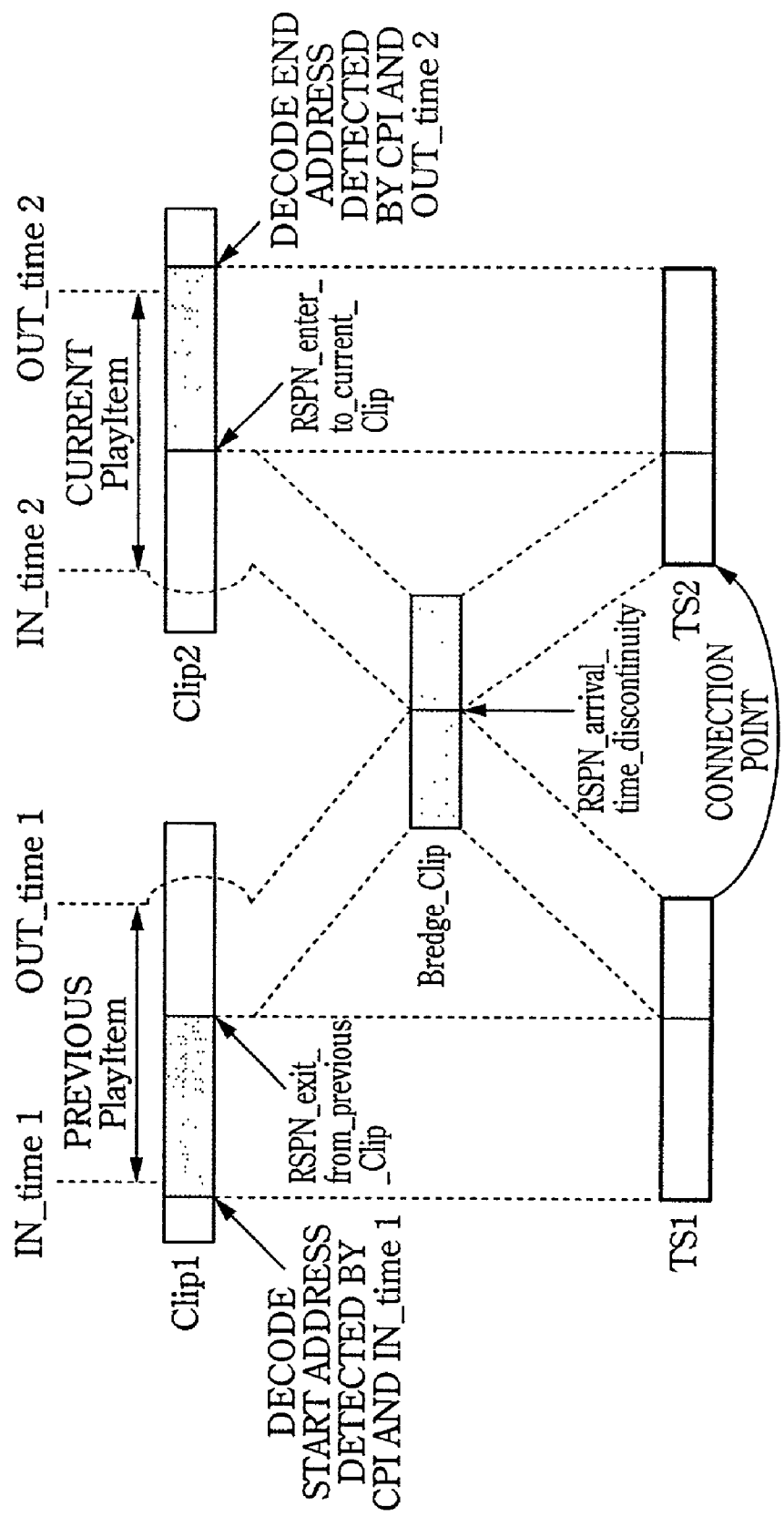
FIG. 88 illustrates seamless connection.

FIG. 88 shows the relation between the previous PlayItem and the current PlayItem in case of employing Bridge-Clip. In FIG. 88, the stream data, read out by the player, is shown shaded. In FIG. 88, TS1 is made up of shaded stream data of the Clip1 (Clip AV stream) and shaded stream data previous to RSPN_arrival_time_discontinuity.

The shaded stream data of Clip1 of TS1 is stream data from an address of a stream required for decoding the presentation unit corresponding to IN_item of the previous PlayItem (shown as IN-time1 in FIG. 88) up to the source packet referenced by RSPN_exit_from_previous_Clip. The shaded stream data prior to RSPN_arrival_time_discontinuity of Bridge-Clip contained in TS1 is stream data as from the first source packet of Bridge-Clip up to the source packet directly previous to the source packet referenced by RSPN_arrival time_discontinuity.

In FIG. 88, TS2 is made up of shaded stream data of Clip 2 (Clip AV stream) and shaded stream data subsequent to RSPN_ arrival_time_discontinuity of Bridge-Clip. The shaded stream data as from the RSPN_arrival_time_discontinuity of Bridge-Clip contained in TS2 stream data from the source packet referenced by RSPN_arrival_time_discontinuity to the last source packet of Bridge-Clip. The shaded stream data of Clip2 of TS2 is stream data from the source packet referenced by RSPN_enter_to_current_Clip to the address of the stream required for decoding the presentation unit corresponding to OUT_time of current PlayItem (shown by OUT_time2 in FIG. 88).

Figure 89:
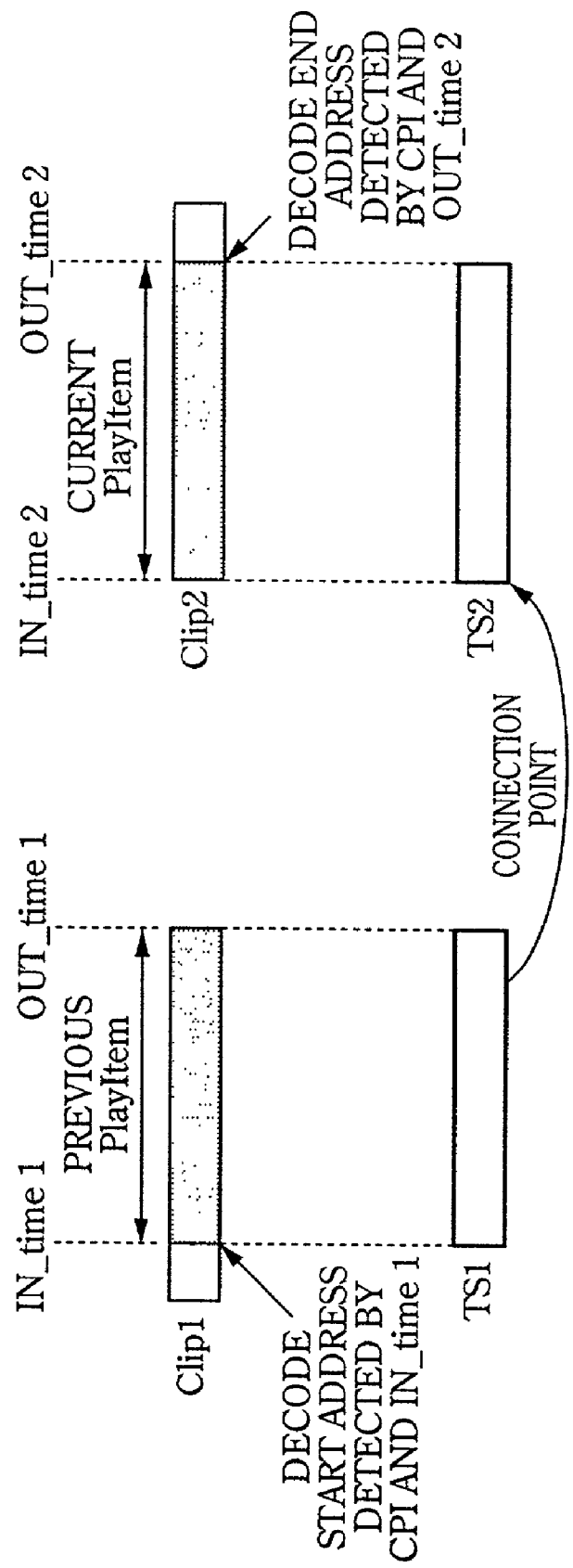
FIG. 89 illustrates seamless connection.

FIG. 89 shows the relation between the previous PlayItem and the current PlayItem in case of not employing Bridge-Clip. In this case, the stream data read out by the player is shown shaded. In FIG. 89, TS1 is made up of shaded stream data of the Clip1 (Clip AV stream). The shaded stream data of Clip1 of TS1 is data beginning at an address of a stream necessary in decoding a presentation unit corresponding to IN_time of the previous PlayItem, shown at IN_time1 in FIG. 89 as far as the last source packet of Clip1.

In FIG. 89, TS2 is shaded stream data of Clip2 (Clip AV stream).

The shaded stream data of Clip2 of TS2 is stream data beginning at a first source packet of Clip2 as far as an address of the stream necessary for decoding the presentation unit corresponding to OUT_time of current PlayItem (shown at OUT_time2 in FIG. 89).

In FIGS. 88 and 89, TS1 and T2 are continuous streams of the source packet. Next, the stream provisions of TS1 and TS2 and the connection conditions therebetween are scrutinized. First, encoding limitations for seamless connection are scrutinized. By way of limitations on the encoding structure of a transport stream, the number of programs contained in TS1 and TS2 must be 1. The number of video streams contained in TS1 and TS2 must be 1. The number of audio streams contained in TS and TS2 must be 2 or less. The numbers of the audio streams contained in TS1 and TS2 must be equal to each other. It is also possible for elementary streams or private streams other than those depicted above to be contained in TS1 and/or TS2.

Figure 90:
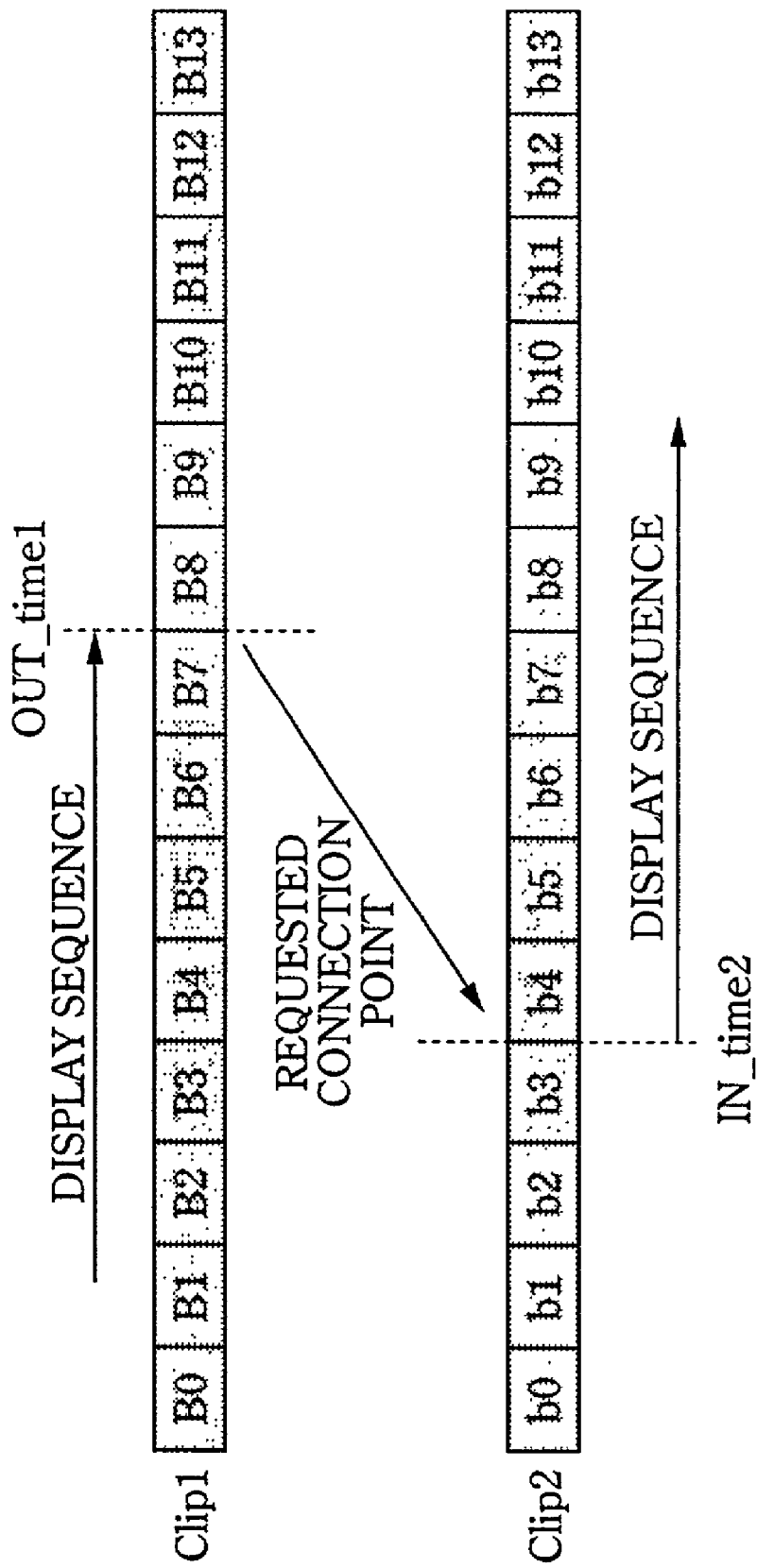
FIG. 90 illustrates seamless connection.

The limitations on the video bitstream are now explained. FIG. 90 shows a typical seamless connection indicated by a picture display sequence. In order for a video stream to be demonstrated seamlessly in the vicinity of a junction point, unneeded pictures displayed at back of OUT_time1 (OUT_time of Clip1) and ahead of IN_time2 (IN_time of Clip2) must be removed by a process of re-encoding the partial stream of the Clip in the vicinity of the junction point.

Figure 91:
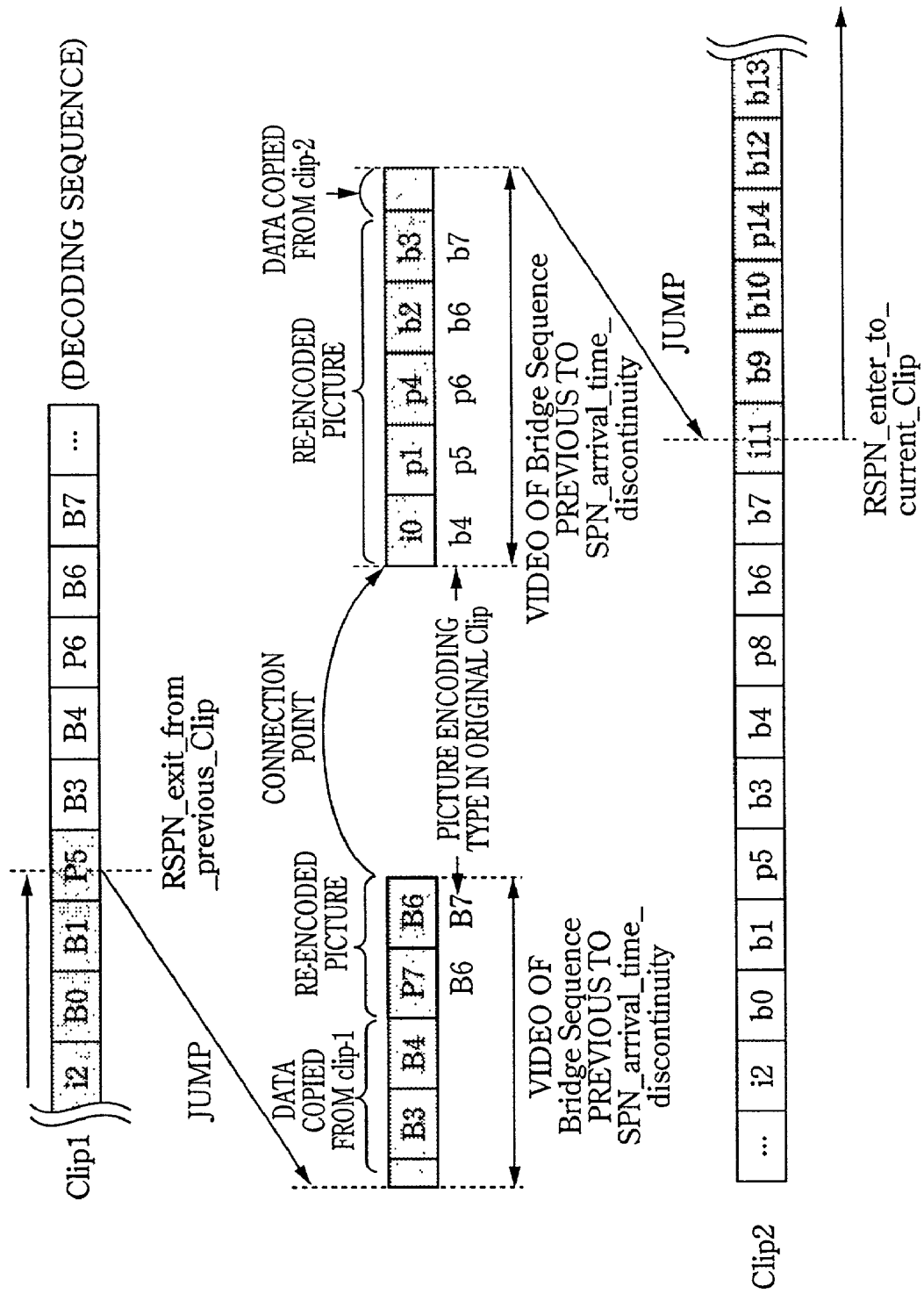
FIG. 91 illustrates seamless connection.

FIG. 91 shows an embodiment of realizing seamless connection using BridgeSequence. The video stream of Bridge-Clip previous to RSPN_arrival_time_discontinuity is comprised of an encoded video stream up to a picture corresponding to OUT_time1 of Clip1 of FIG. 90. This video stream is connected to the video stream of previous Clip1 and is re-encoded to form an elementary stream conforming to the MPEG2 standard.

The video stream of Bridge-Clip subsequent to RSPN_arrival_time_discontinuity is made up of an encoded video stream subsequent to a picture corresponding to IN_time2 of Clip2 of FIG. 90. The decoding of this video stream can be started correctly for connecting the video stream to the next following Clip2 video stream. Re-encoding is made such that a sole continuous elementary stream conforming to MPEG 2 standard will be formed. For creating Bridge-Clip, several pictures in general need to be re-encoded, whilst other pictures can be copied from the original Clip.

Figure 92:
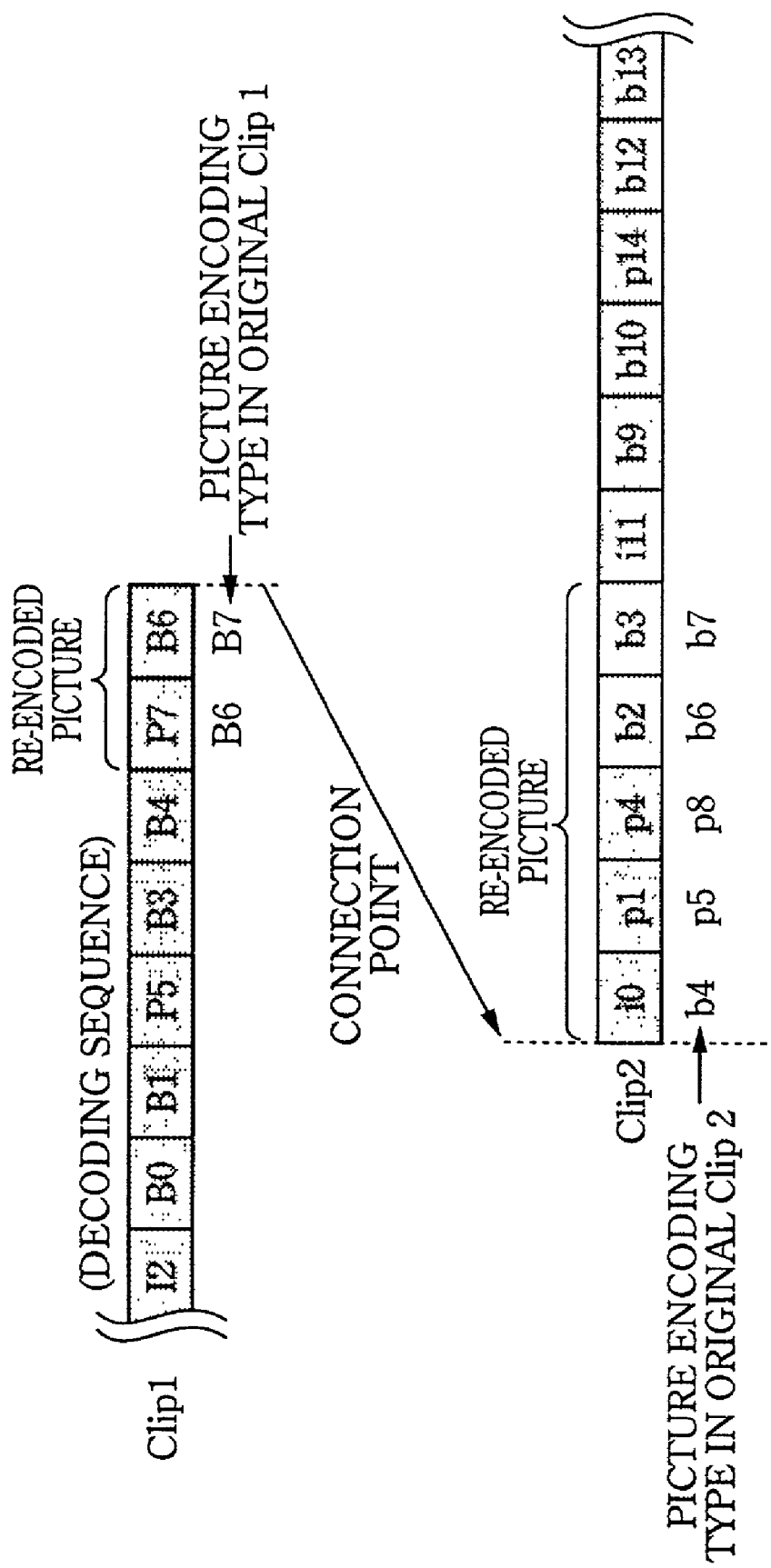
FIG. 92 illustrates seamless connection.

FIG. 92 shows an embodiment of realizing seamless connection without employing BridgeSequence in the embodiment shown in FIG. 90. The Clip1 video stream is comprised of an encoded video stream as far as the picture corresponding to OUT_time1 of FIG. 90 and is re-encoded so as to give an elementary stream conforming to the MPEG2 standard. In similar manner, the video stream of Clip2 is made up of encoded bitstreams subsequent to the picture associated with IN_time2 of Clip2 of FIG. 90. These encoding bitstreams are already re-encoded to give a sole continuous elementary stream conforming to the MPEG2 standard.

By way of explaining encoding limitations of the video stream, the frame rates of the video streams of TS1 and TS2 must be equal to each other. The video stream of TS1 must be terminated at sequence_end_code. The video stream of TS2 must commence at Sequence header, GOP Header and with an I-picture. The video stream of TS2 must commence at a closed GOP.

The video presentation units defined in a bitstream (frame or field) must be continuous with a junction point in-between. No gap of the fields or frames are allowed to exist at junction points. In case of encoding employing 3-2 pulldown, it may be necessary to rewrite "top_field_first" and "repeat_first_field" flags. Alternatively, local re-encoding may be made to prevent field gaps from being produced.

By way of explaining encoding limitations on the audio bitstream, the audio sampling frequency of TS1 and that of TS2 must be equal to each other. The audio encoding method of TS1 and that of TS2 (for example, MPEG1 layer 2, AC3, SESF LPCM and AAC) must be equal to each other.

By way of explaining encoding limitations on MPEG-2 transport stream, the last audio frame of the audio stream of TS1 must contain audio samples having a display timing equal to the display end time of the last display picture of TS1. The first audio frame of the audio stream of TS2 must contain an audio sample having a display timing equal to the display start timing of the first display picture of TS2.

Figure 93:
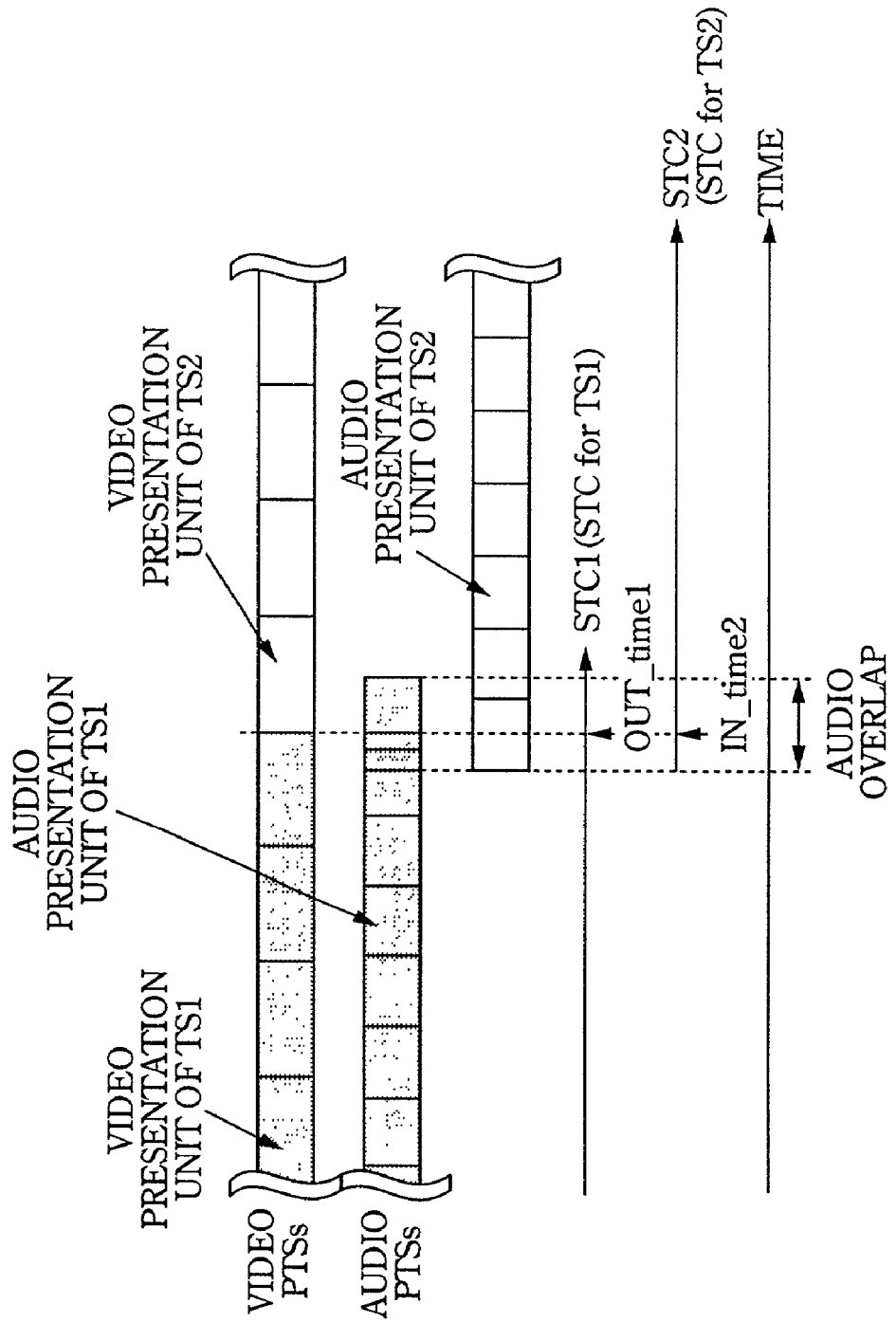
FIG. 93 illustrates audio overlap.

At a junction point, no gap may be allowed to exist in a sequence of the audio presentation units. As shown in FIG. 93, there may be an overlap defined by the length of the audio presentation unit less than two audio frame domains. The first packet transmitting an elementary stream of TS2 must be a video packet. The transport stream at the junction point must obey the DVR-STD which will be explained subsequently.

By way of explaining limitations on the Clip and Bridge-Clip, no discontinuities in the arrival time base are allowed to exist in TS1 or in TS2.

The following limitations are applied only to the case of employing the Bridge-Clip. The Bridge-Clip AV stream has a sole discontinuous point in the arrival time base only at a junction point of the last source packet of TS1 and the first source packet of TS2. The SPN_arrival_time_discontinuity defined in ClipInfo( ) represents an address of the discontinuous point, which must represent the address referencing the first source packet of TS2.

The source packet referenced by RSPN_exit_from_previous_Clip defined in BridgeSequenceInfo( ) may be any source packet in Clip1. It is unnecessary for this source packet to be a boundary of the Aligned unit. The source packet referenced by RSPN_enter_to_current_Clip defined in BridgeSequenceInfo( ) may be any source packet in Clip2. It is unnecessary for this source packet to be a boundary of the Aligned unit.

By way of explaining limitations on PlayItem, the OUT_time of the previous PlayItem (OUT_time 1 shown in FIG. 89) must represent the display end time of the last video presentation unit of TS1. The IN_time of the current PlayTime (IN_time2 shown in FIG. 88 and 89) must represent the display start time of the first presentation unit of TS2.

Figure 94:
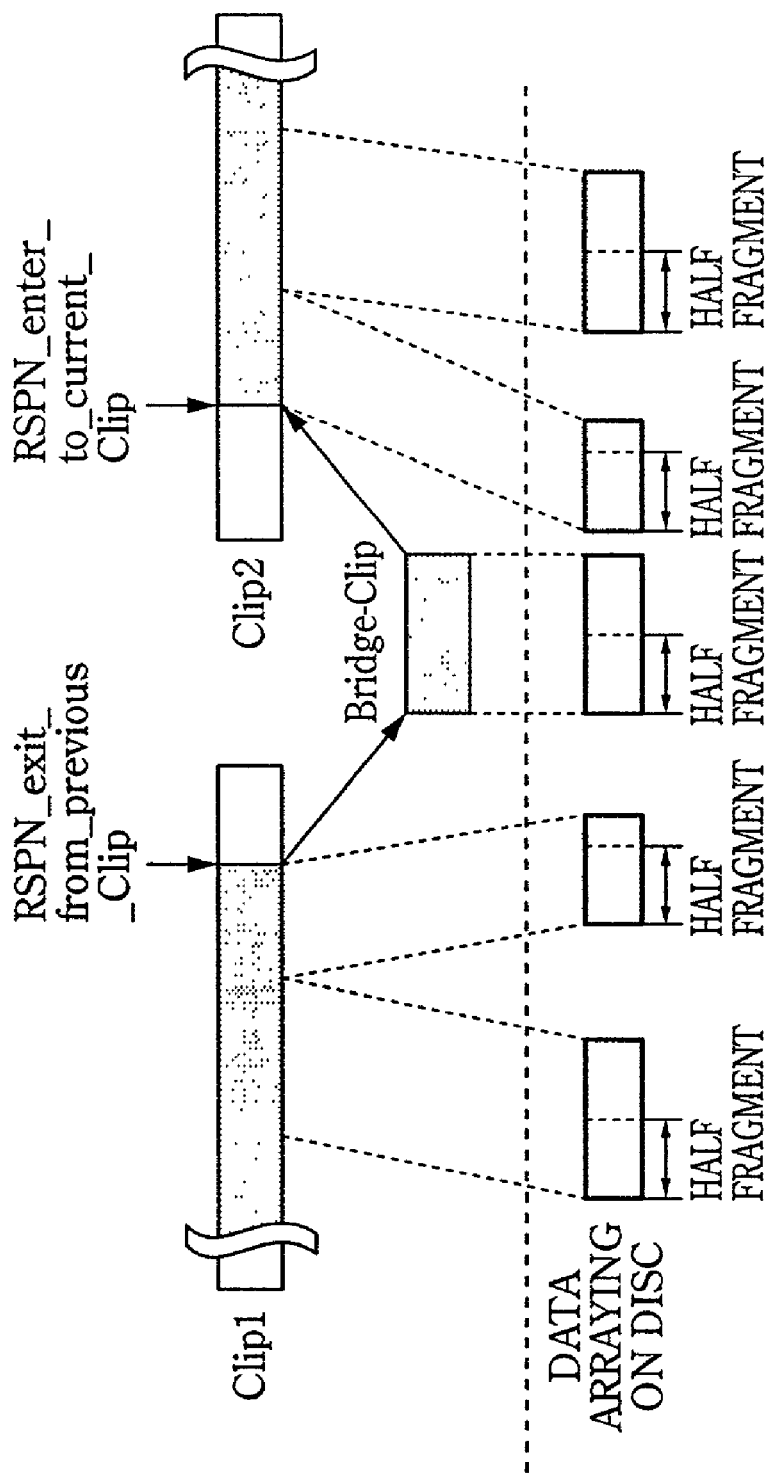
FIG. 94 illustrates seamless connection employing BridgeSequence.

By way of explaining the limitations on the data allocation in case of employing Bridge-Clip by referring to FIG. 94, the seamless connection must be made to guarantee continuous data supply by the file system. This must be realized by arranging the Bridge-Clip AV stream, connecting to Clip1 (Clip AV stream file) and Clip2 (Clip AV stream file), such as to satisfy data allocation prescriptions.

RSPN_exit_from_previous_Clip must be selected so that the stream portion of Clip1 (Clip AV stream file) previous to RSPN_exit_from_previous_Clip will be arranged in a continuous area not less than half fragment. The data length of the Bridge-Clip AV stream must be selected so that the data will be arranged in the continuous area not less than half fragment. RSPN_enter_to_current_Clip must be selected so that the stream portion of Clip2 (Clip AV stream file) subsequent to RSPN_enter_to_current_Clip will be arranged in a continuous area not less than half fragment.

Figure 95:
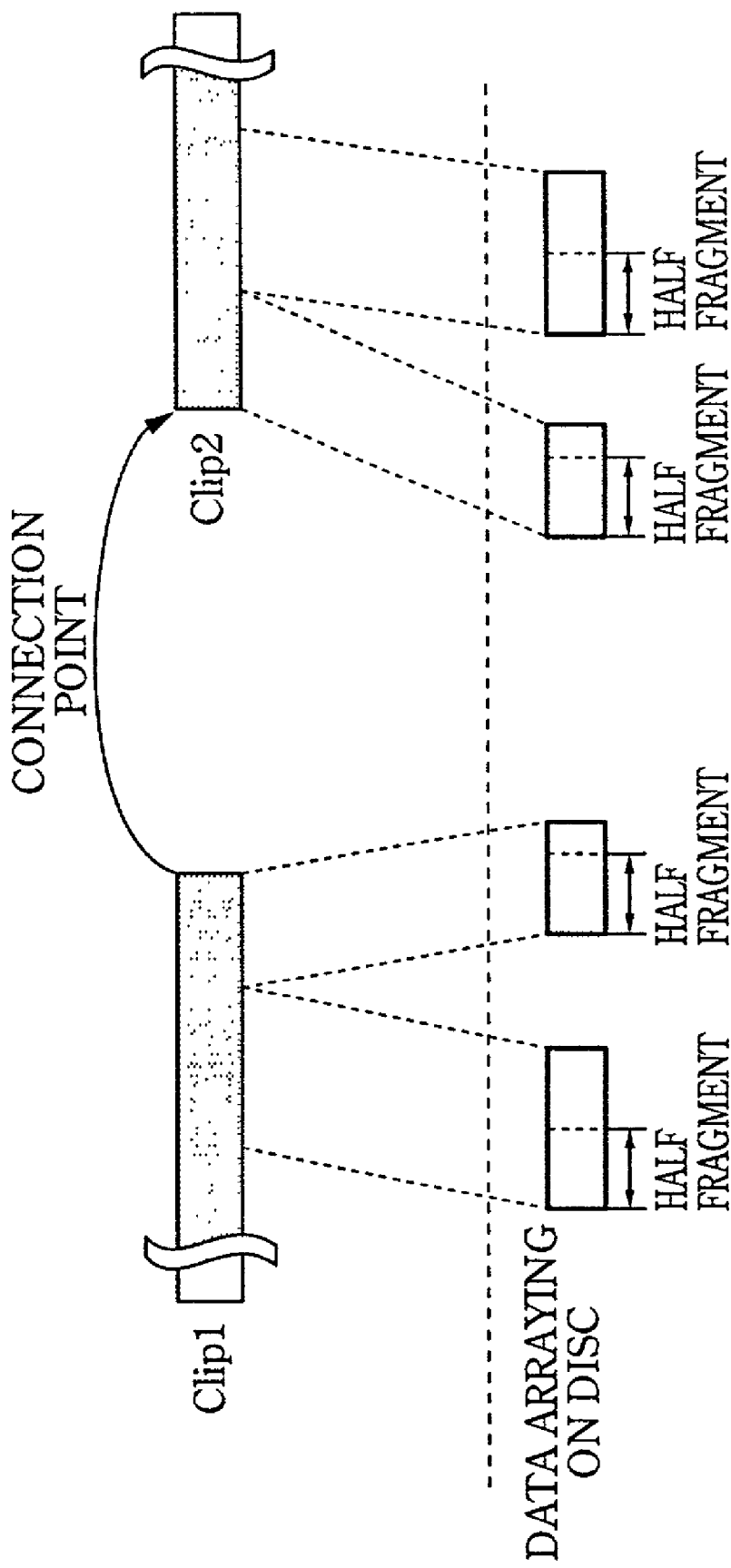
FIG. 95 illustrates seamless connection not employing BridgeSequence.

By way of explaining data allocation limitations in case of seamless connection not employing Bridge-Clip, by referring to FIG. 95, the seamless connection must be made so as to guarantee continuous data supply by the file system. This must be realized by arranging the last portion of the Clip1 (Clip AV stream file) and the first portion of the Clip2 (Clip AV stream file) so that the provisions on data allocation will be met.

The last stream portion of Clip1 (Clip AV stream file) must be arranged in a continuous area not less than one half fragment. The first stream portion of Clip2 (Clip AV stream file) must be arranged in a continuous area not less than one half fragment.

Next, DVR-STD is explained. This DVR-STD is a conceptual model for modeling the decoding processing in the generation and verification of the DVR MPEG 2 transport stream. The DVR-STD is also a conceptual model for modeling the decoding processing in the generation and verification of the AV stream referenced by two PlayItems seamlessly connected to each other as described above.

Figure 96:
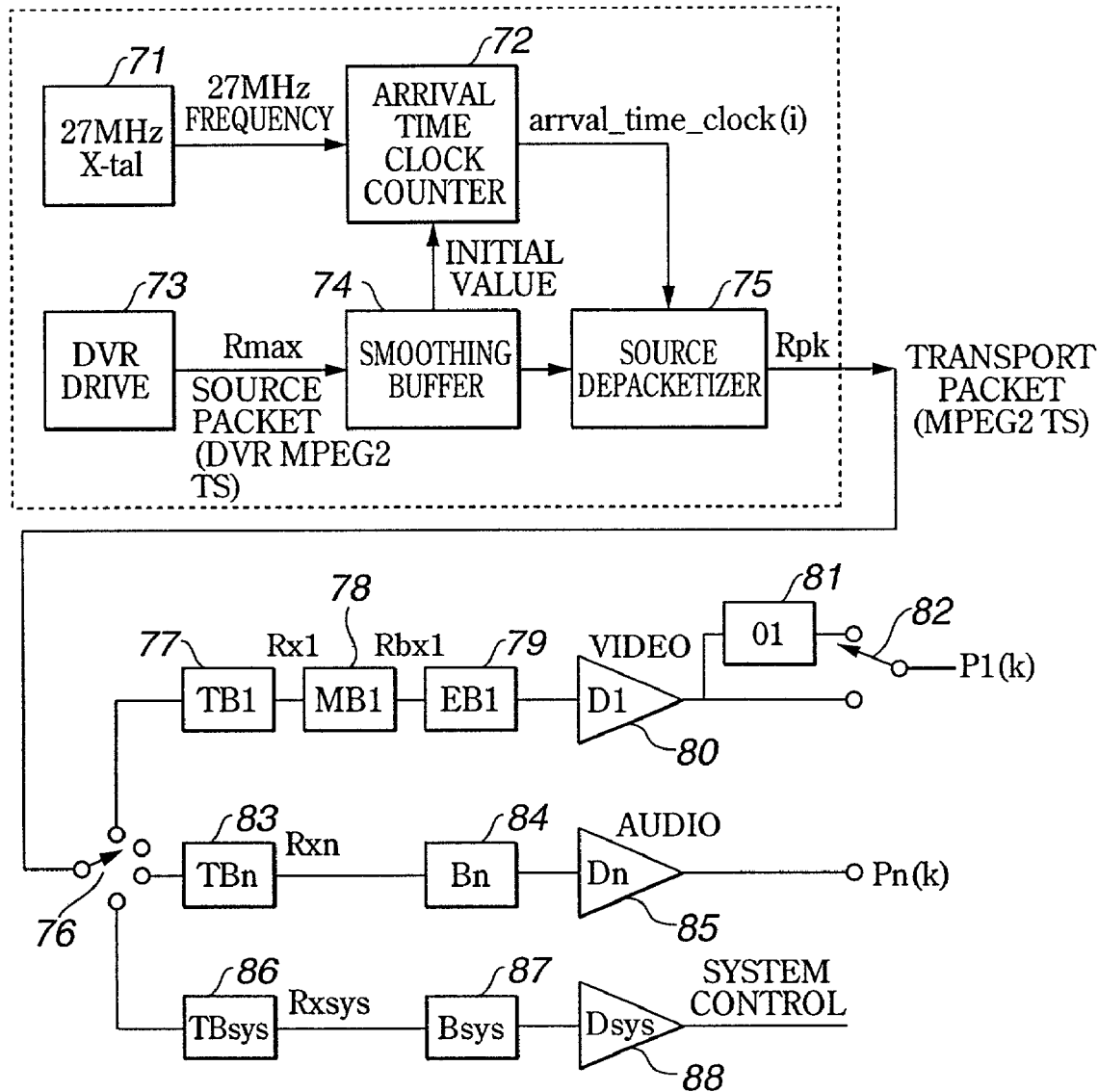
FIG. 96 shows a DVR STD model.

FIG. 96 shows a DVR-STD model. The model shown in FIG. 96 includes, as a constituent element, a DVR MPEG 2 transport stream player model. The notation of n, Thn, Mbn, Ebn, Tbsys, Bsys, Rxn, Rbxn, Rxsys, Dn, Dsys, On and P9(k) is the same as that defined in T-STD of ISO/IEC 13818-1, wherein n is an index number of an elementary stream and TBn is a transport buffer of the elementary stream n.

MBn is a multiplexing buffer of the elementary stream n and exists only for the video stream. EBn is an elementary stream buffer of the elementary stream n and is present only for the video stream. TBsys is a main buffer in a system target decoder for the system information for a program being decoded. Rxn is a transmission rate with which data is removed from TBn. Rbxn is a transmission rate with which the PES packet payload is removed from MBn and is present only for a video stream.

Rxsys is a transmission rate with which data is removed from TBsys. Dn is a decoder of the elementary stream n. Dsys is a decoder pertinent to the system information of a program being decoded. On is a re-ordering buffer of the video stream n. Pn(k) is a number k presentation unit of the elementary stream.

The decoding process for DVR-STD is explained. During the time a sole DVR MPEG 2 transport stream is being reproduced, the timing of inputting the transport packet to TB1, TBn or TBsys is determined by arrival_time_stamp of the source packet. The prescriptions for the buffering operation of TB1, MB1, EB1, TBn Bn, TBsys and Bsys are the same as those of the T-STD provided for in ISO/IEC 13818-1, while the prescriptions for the deciding and display operations are also the same as the T-STD provided for in ISO/IEC 13818-1.

The decoding process during the time the seamlessly connected PlayLists are being reproduced is now explained. Here, the reproduction of two AV streams referenced by the seamlessly connected PlayItems is explained. In the following explanation, the reproduction of TS1 and TS2, shown for example in FIG. 88, is explained. TS1 and TS2 are a previous stream and a current stream, respectively.

Figure 97:
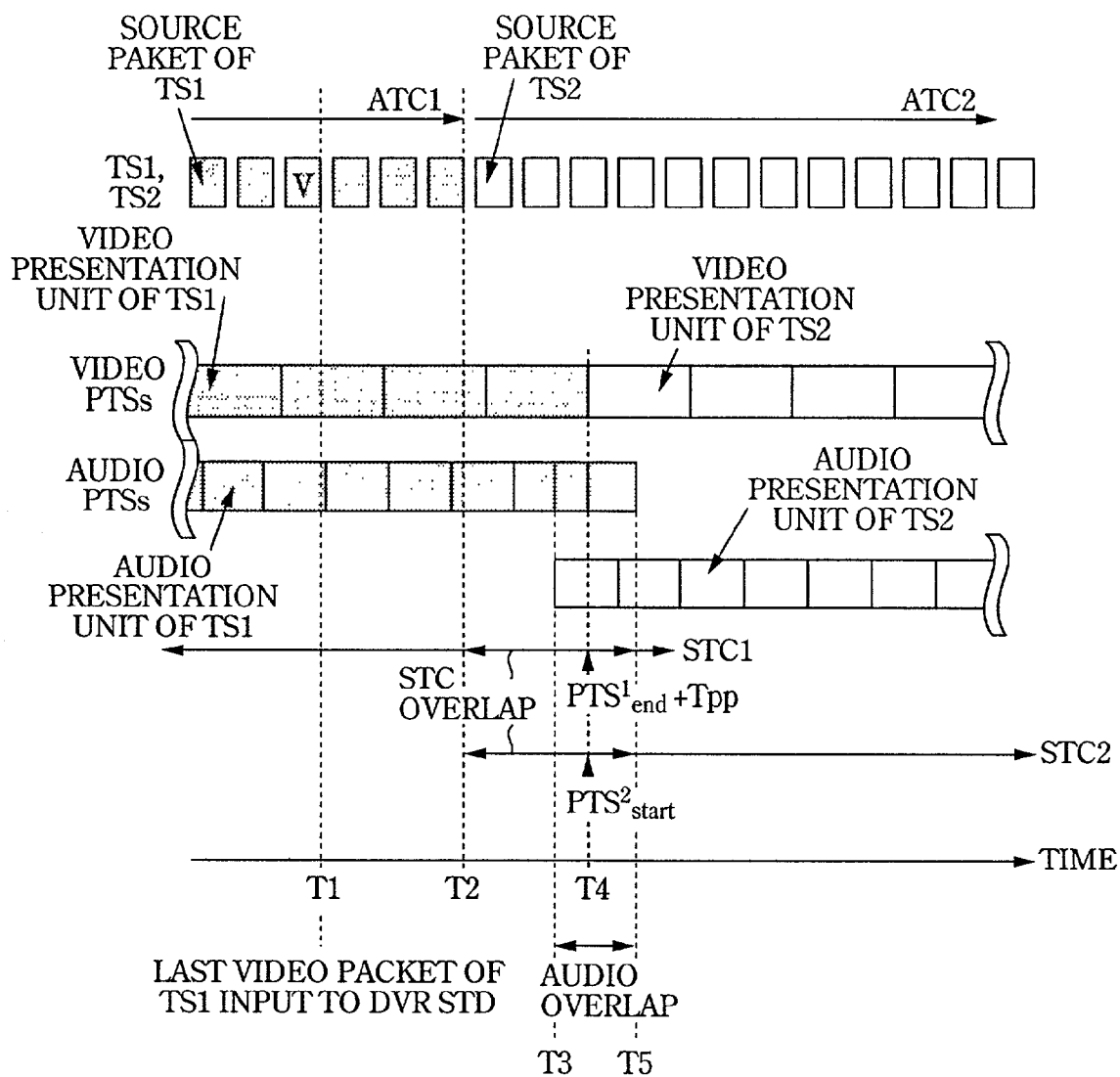
FIG. 97 is a timing chart for decoding and display.

FIG. 97 shows a timing chart for inputting, decoding and display of transport packets when transferring from a given AV stream (TS1) to the next AV stream seamlessly connected thereto (TS2). During transfer from a preset AV stream (TS1) to the next AV stream seamlessly connected thereto (TS2), the time axis of the arrival time base of TS2 is not the same as the time axis of the arrival time base of TS1 (indicated by ATC1 in FIG. 97).

Moreover, the time axis of the system time base of TS2 (indicated by ATC1 in FIG. 97) is not the same as the time axis of the system time base of TS1 (indicated by STC1 in FIG. 97). The video display is required to be continuous seamlessly, however, there may be overlap in the display tine of the presentation units.

The input timing to DVR-STD is explained. During the time until time T1, that is until the inputting of the last video packet to the TB1 of DVR-STD, the input timing to the buffers of TB1, TBn or TBsys of DVR-STD is determined by arrival_time_stamp of the arrival time base of TS1.

The remaining packets of TS1 must be input to buffers of TBn or to TBsys of DVR-STD at a bitrate of TS_recording_rate (TS1). The TS_recording_rate (TS1) is the value of TS_recording_rate defined in ClipInfo( ) corresponding to Clip1. The time the last byte of TS1 is input to the buffer is the time T2. So, during the time between time T1 and time T2, arrival_time_stamp of the source packet is discounted.

If N1 is the number of bytes of the transport packet of TS1 next following the last video packet of TS1, the time DT1 from time T1 until time T2 is the time necessary for N1 bytes to be input completely at a bitrate of TS_recording_rate (TS1), and is calculated in accordance with the following equation:

$$DT1=T2-T1=N1/TS\_recording\_rate$$

During the time from time T1 until time T2 (TS1), both the values of RXn and RXsys are changed to the value of TS-recording_rate (TS1). Except this rule, the buffering operation is the same as that of T-STD.

At time T2, the arrival time clock counter is reset to the value of arrival_time_stamp of the first source packet of TS2. The input timing to the buffer of TB1, TBn or TBsys of DVR-STD is determined by arrival_time_stamp of the source packet of TB2. Both RXn and RXsys are changed to values defined in T-STD.

By way of explaining additional audio buffering and system data buffering, the audio decoder and the system decoder need to have an additional buffering amount (data amount equivalent to one second) in addition to the buffer amount defined in T-STD in order to allow input data of a domain from time T1 to time T2.

By way of explaining the video presentation timing, the display on the video presentation unit must be continuous, that is devoid of gaps, through junction point. It is noted that STC1 is the time axis of the system time base of TS1 (indicated as STC1 in FIG. 9), while STC2 is the time axis of the system time base of TS2 (shown at STC2 in FIG. 97; correctly, STC2 begins at time the first PCR of TS2 has been input to the T-STD).

The offset between STC1 and STC2 is determined as follows: the PTS1end is the PTS on STC1 corresponding to the last video presentation unit of TS2. PTS2start is PTS on STC2 corresponding to the first video presentation unit of TS2 and Tpp is the display time period of the last video presentation unit of TS1, the offset STC_delta between two system time bases is calculated in accordance with the following equation:

$$STC\_delta=PTS1end+Tpp-PTS2start$$

By way of explanation of the audio presentation timing, there may be overlap in the display timing of the audio presentation unit, with the overlap being less than 0 to 2 audio frames (see "audio overlap" shown in FIG. 97). The indication as to which of audio samples is to be selected and re-synchronization of the display of the audio presentation unit to the corrected time base at back of the junction point are set on the player.

By way of explaining the system time clock of DVR-STD, the last audio presentation unit of TS1 is displayed at time T5. The system time clock may be overlapped between time T2 and time T5. During this time domain, the DVR-STD switches the system time clocks between the value of the old time base (STC1) and the value of the new time base (STC2). The value of STC2 may be calculated in accordance with the following equation:

$$STC2=STC1-STC\_delta$$

The buffering continuity is explained. STC11video_end is the value of STC on the system time base STC2 when the first byte of the first video packet reaches TB1 of DVR-STD. STC22video_start is the value of STC on the system time base STC2 when the first byte of the first video packet reaches TB1 of DVR-STD. STC21video_end is the value of STC11video_end calculated as the value on STC2 of the system time base STC2. STC21video_end is calculated in accordance with the following equation:

$$STC21video\_end=STC11video\_end\_STC\_delta$$

In order to obey DVR-STD, the following two conditions must be met: First, the arrival timing of the first video packet of TS2 at TB1 must satisfy the following inequality:

$$STC22video\_start>STC21video\_end+\Delta T1$$

If it is necessary to re-encode and/or multiplex the partial stream of Clip1 and/or Clip2, in such a manner that the above inequality will be satisfied, this re-encoding or multiplexing is performed as appropriate.

Second, the inputting of the video packet from TS1 followed by the inputting of the video packet from TS2 on the time axis of the system time base, mapped from STC1 and STC2 on the same time axis, must not overflow or underflow the video buffer.

If the above syntax, data structure and the rules are used as basis, the contents of data recorded on the recording medium or the reproduction information can be managed properly to enable the user to confirm the contents of data recorded on the recording medium at the time of reproduction or to reproduce desired data extremely readily.

In the above-described embodiment, the MPEG 2 transport stream is taken as an example of the multiplexed stream. This, however, is merely exemplary, such that the MPEG 2 program stream DSS or the transport stream used in the DirecTV Service (trade mark) of USA may also be used as the multiplexed stream.

FIG. 98 shows a modification of a PlayList file. The marked difference between the syntax of FIG. 98 and that of FIG. 99 is the place where UIAppInfoPlayList( ) is stored. In the embodiment of FIG. 98, in which UIAppInfoPlayList( ) is outside the PlayList( ), the future information expansion of UIAppInfoPlayList( ) may be achieved rather easily.

Version_number is four figures indicating the version number of the thumbnail header information file.

PlayList_start_address indicates the leading address of PlayList( ) in terms of the number of relative bytes from the leading end of the PlayList file as a unit. The number of relative bytes is counted from 0.

PlayListMark_start_address indicates the leading address of PlayListMark( ) in terms of the number of relative bytes from the leading byte of the PlayList file as a unit. The number of relative bytes is counted from 0.

MakersPrivateData_start_address denotes the leading address of MakersPrivateData in terms of the number of relative bytes from the leading byte of the PlayList file as a unit. The number of relative bytes is counted from 0.

FIG. 99 shows the syntax of UIAppInfoPlayList in the PlayList file of FIG. 98. PlayList_service_type indicates the type of the PlayList file, an example of which is shown in FIG. 26. The PlayList_service_type may have the same meaning as that of the service type shown by the digital TV broadcast. For example, in the BS broadcast in Japan, there are three service types, namely the TV service, audio service and data broadcast service. The value representing the service type of the program contained in the Clip AV stream used by the PlayList is set in the PlayList_service_type.

PlayList_character_set denotes the encoding method for character letters encoded in channel_name, PlayList_name and PlayList_detail field, while denoting the encoding method for character letters encoded in mark_name field in PlayListMark.

Channel_number denotes the broadcast channel number or service number as selected by the user when recording the PlayList. If plural PlayLists are combined into one PlayList, channel_number denotes a representative value of the PlayList. If this field is set to 0×FFFF, the field has no meaning.

Channel_name_length denotes the byte length of the channel name indicated in the channel_name field. This field has a value not larger than 20.

Channel_name denotes the name of the service or the broadcast channel as selected by the user when the PlayList is recorded. The number of bytes of a number indicated by the channel_name_length from left of this field represents effective character letters and denotes the above-mentioned name. The remaining bytes next following these effective character letters may be set to any arbitrary value. If plural PlayLists are combined into one PlayList, this field indicates the name representative of the PlayList.

PlayList_name_length denotes the byte length of the PlayList name indicated in the PlayList_name field.

Play_list_name shows the name of the PlayList. The number of bytes of the number indicated by the PlayList_name_length from left of this field represents the effective character letters and denote the above-mentioned name. The remaining bytes in this field next following these effective character letters may be set to any optional value.

PlayList_detail_length denotes the byte length of the detailed information of the PlayList indicated in the PlayList_detail field. This field has a value not larger than 1200.

PlayList_detail denotes the text for illustrating the detailed information of the PlayList. The number of bytes of a number indicated by PlayList_detail_length as from left of this field is the effective character letters. The remaining bytes in this field next following these effective character letters may be set to any optional value.

The meaning of this syntax field is otherwise the same as that of the field of the same name shown in FIG. 27.

FIG. 100 shows the syntax of PlayList( ) in the PlayList file of FIG. 98. This syntax is basically the same as the embodiment of FIG. 25 except that the present syntax lacks in the UIAppInfoPlayList( ).

FIG. 101 shows a modification of the syntax of SubPlayItem. The present syntax differs appreciably from the embodiment of FIG. 40 in that STC_sequence_id has now been added.

STC_sequence_id indicates STC_sequence_id of STC referenced by SubPath_IN_time and SubPath_OUT_time used for identifying the reproduction domain on the AV stream file corresponding to Clip_Information_file_name. SubPath_IN_ time and SubPath_OUT_time denote the time on the same STC continuous domain specified by the STC_sequence_id.

By adding STC_sequence_id to the SubPlayItem, it is allowed that the AV stream file referenced by SubPlayItem has an STC discontinuous point.

The syntax field otherwise has the same meaning as that of the field of the same name shown in FIG. 40.

Figure 102:
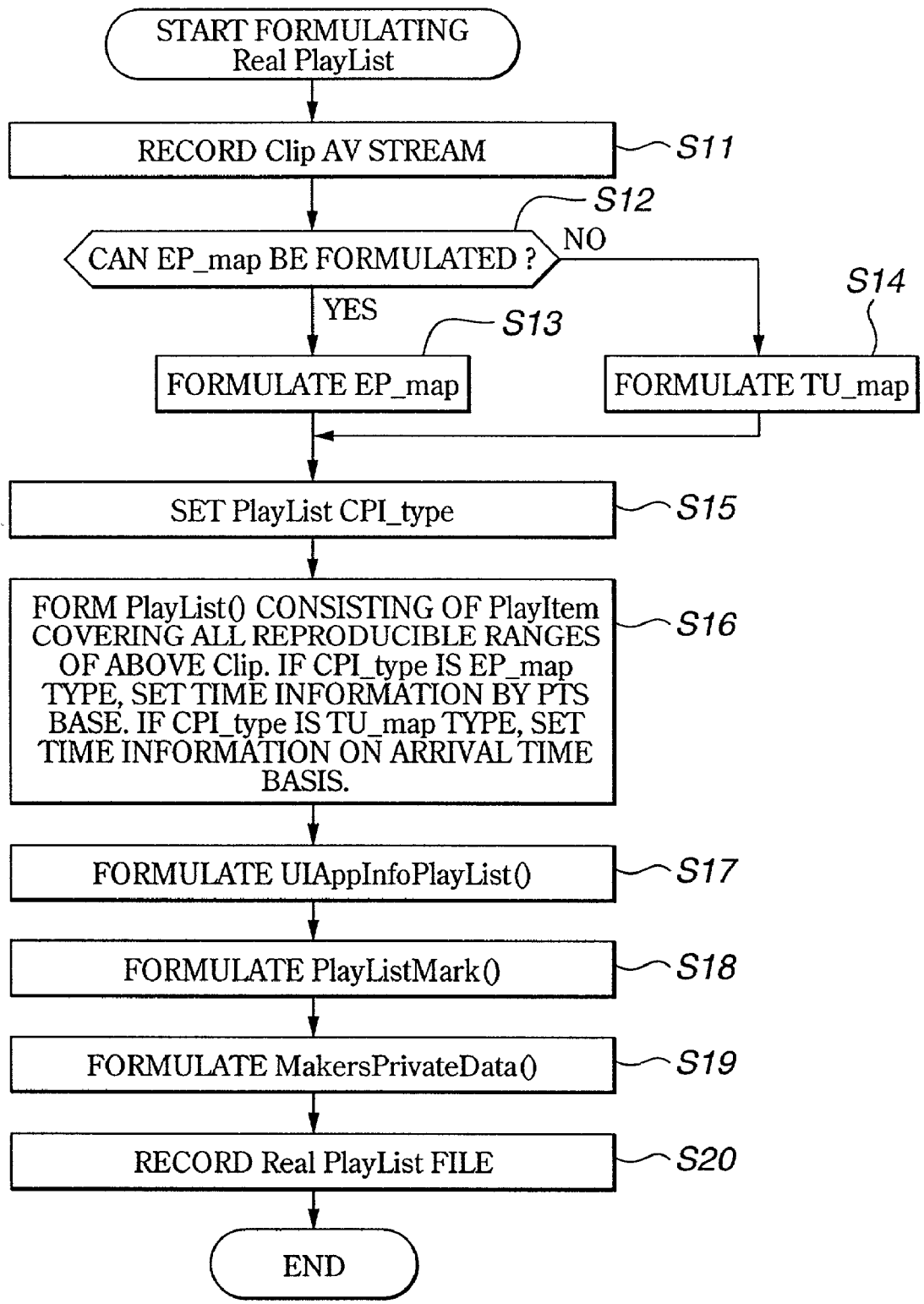
FIG. 102 is a flowchart for illustrating the method for forming RealPlayList.

FIG. 102 shows the flowchart for illustrating the method for forming Real PlayList. Reference is had to the block diagram of the recording and/or reproducing apparatus shown in FIG. 1.

At step S11, the controller 43 records a Clip AV stream.

At step S12, the controller 23 checks whether or not EP_map of the AV stream can be prepared. If the result of check at step S12 is YES, the controller 23 proceeds to step S13. If otherwise, the controller 23 proceeds to step S14 to form TU_map.

At step S15, the controller 23 then sets the CLI_type of PlayList.

At step S16, the controller 23 forms the PlayList( ) comprised of PlayItem covering the possible reproduction range of the Clip in its entirety. If CPI_type is EP_map type, the time information is set on the PTS basis. If there is STC discontinuous point in the Clip, and the PlayList( ) is made up of two or more PlayItems, the connection_condition between PlayItems is also determined. If CPI_type is TU_map type, the time information is set on the arrival time basis.

At step S17, the controller 23 forms UIAppInfoPlayList( ).

At step S18, the controller 23 forms PlayListMark.

At step S19, the controller 23 forms MakerPrivateData.

At step S20, the controller 23 forms RealPlayList file.

So, one Real PlayList file is formed whenever a Clip AV stream is newly recorded.

Figure 103:
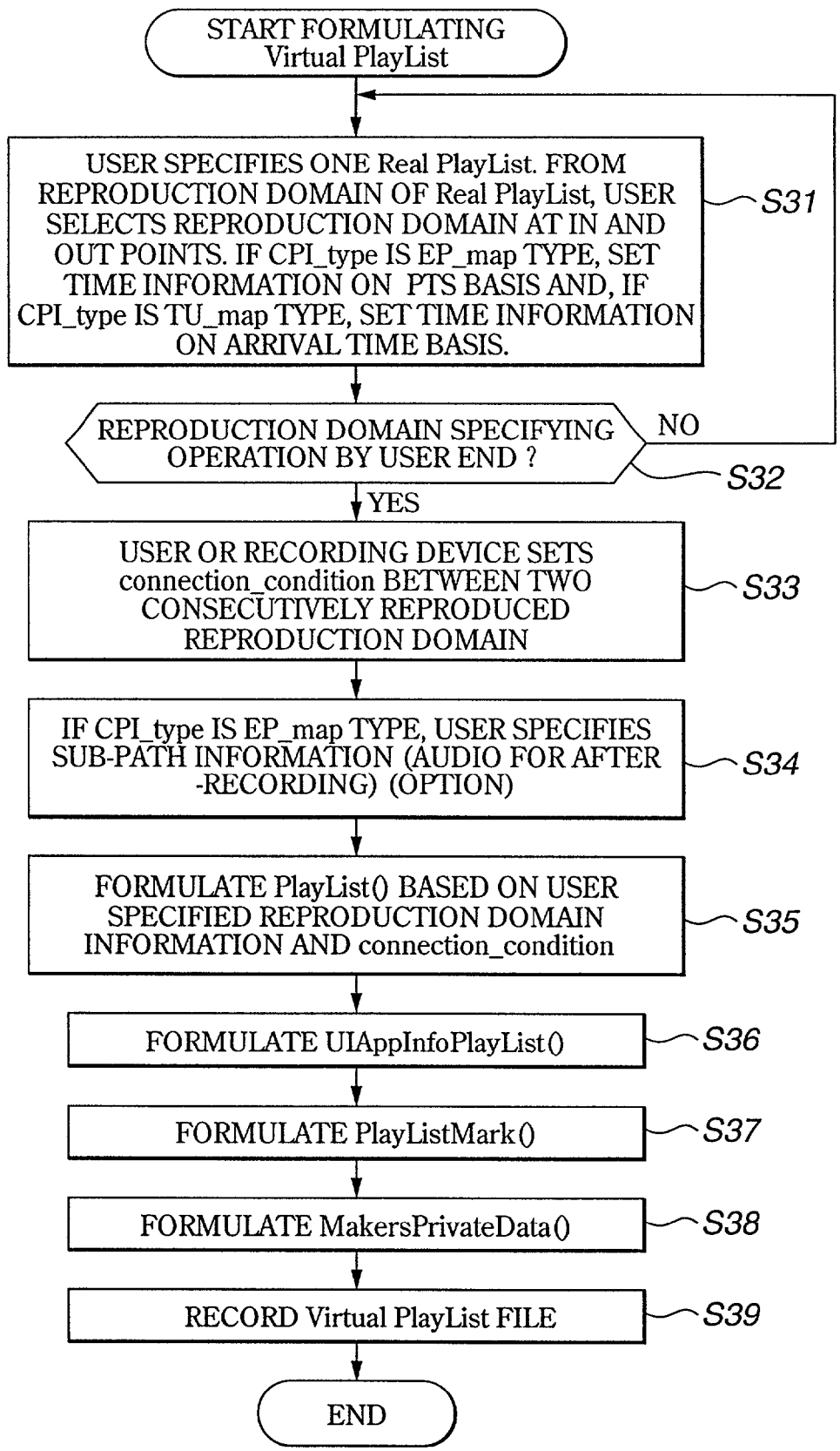
FIG. 103 is a flowchart for illustrating the method for forming VirtualPlayList.

FIG. 103 is a flowchart for illustrating the method for forming Virtual PlayList.

At step S31, one real PlayList, recorded on the disc, is specified through user interface. From the reproduction range of the Real PlayList, the reproduction range specified by IN and OUT points is specified through the user interface. If CPI_type is EP_map type, the reproduction domain is set on the PTS basis. If CPI_type is TU_type, the reproduction domain is set on the arrival time basis.

At step S32, the controller 23 checks whether or not the entire operation of specifying the reproduction range by the user has been finished. If the user selects the domain to be reproduced next to the specified reproduction domain, the controller 23 reverts to step S31. If the entire operation of specifying the reproduction range by the user has come to a close, the controller 23 proceeds to step S33.

At step S33, the connection condition (Connection_condition between two consecutively reproduced reproduction domains is determined by the user through interface or by the controller 23.

If, at step S34, CPI_type is EP_map type, the user specifies the sub-path information (post-recording audio information). This step is omitted if the sub-path is not formed by the user.

At step S35, the controller 23 forms PlayList( ) based on the reproduction range information specified by the user and on the connection_condition.

At step S36, the controller 23 forms UIAppInfoPlayList( ).
At step S37, the controller 23 forms PlayListMark.
At step S38, the controller 23 forms MakerPrivateData.
At step S39, the controller 23 forms VirtualPlayList file.

In this manner, one virtual PlayList file is formed for each group of the reproduction domains which are selected from the reproduction range of the Real PlayList recorded on the disc and which the user is desirous to view.

Figure 104:
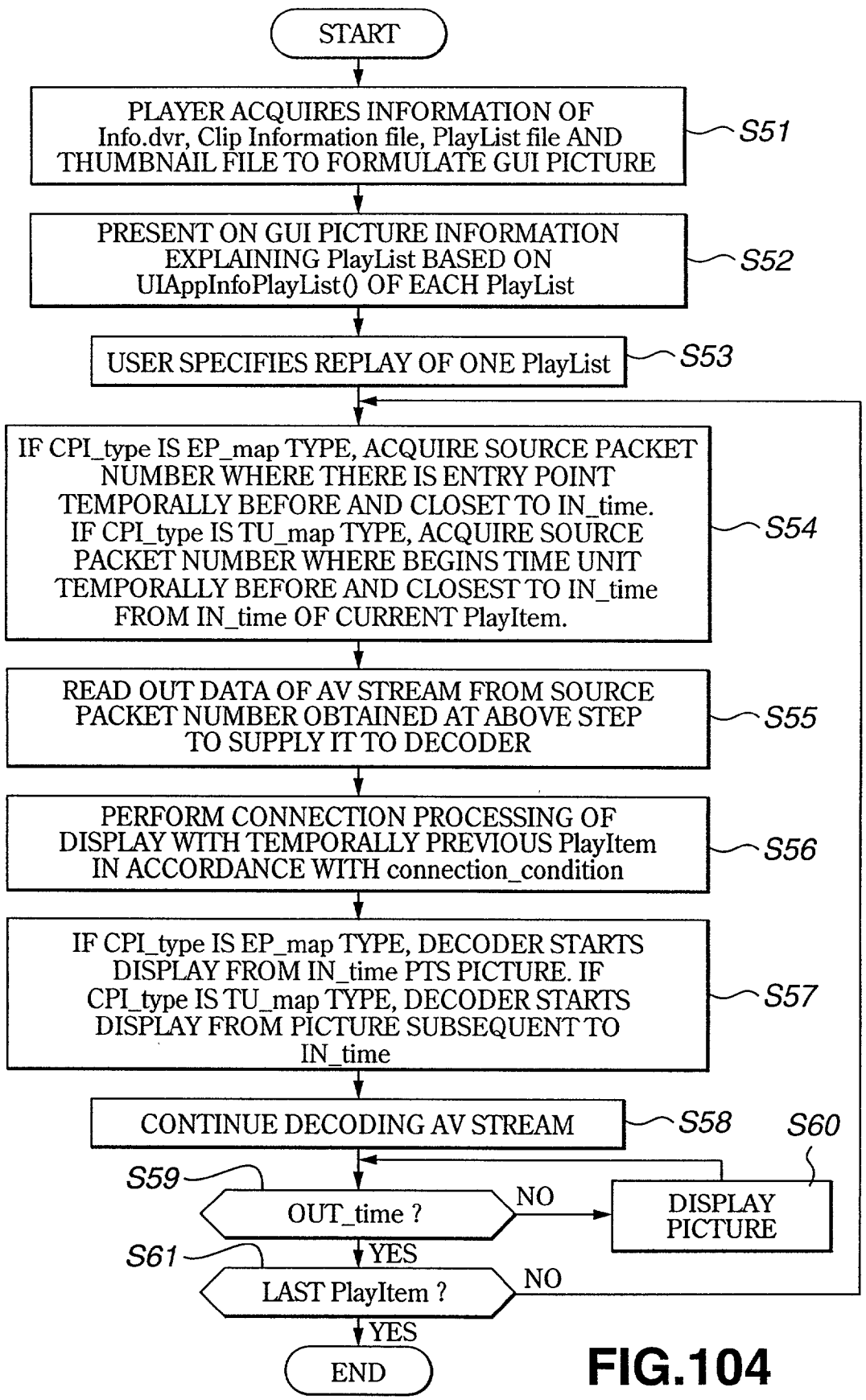
FIG. 104 is a flowchart for illustrating the method for reproducing the PlayList.

FIG. 104 is a flowchart for explaining the reproducing method of the PlayList.

At step S51, the controller 23 acquires the information on the Info.dvr, Clip Information file, PlayList file and thumbnail file and forms a GUI picture demonstrating a list of PlayLists recorded on the disc to display the GUI picture so formed on the GUI through user interface.

At step S52, the controller 23 presents the information explaining the PlayList on the GUI picture based on the UIAppInfoPlayList in the respective PlayLists.

At step S53, the user commands reproduction of one PlayList from the GUI picture through user interface.

If the CPI_type is EP_map type, the controller 23 at step S54 acquires, from the STC_sequence_id and IN_time PTS, the number of the source packet having an entry point temporally previous and closest to IN_time. If the CPI_type is TU_map type, the controller 23 acquires, from the IN_time of the current PlayItem, the number of the source packet where begins the time unit temporally previous and closest to IN_time.

At step S55, the controller 23 reads out data of the AV stream from the source packet number acquired at the above step to route the data so read out to the AV decoder 27.

If, at step S56, there is the PlayItem temporally previous to the current PlayItem, the controller 23 performs the connection processing of display between the previous PlayItem and the current PlayItem in accordance with the connection_condition.

If. At step S57, the CPI_type is EP_map type, the AV decoder 27 commands display to be started as from the picture of the IN_time PTS. If the CPI_type is TU_map type, the AV decoder 27 commands display to be started as from the picture of the stream subsequent to IN_time.

At step S58, the controller 23 commands the AV decoder 27 to continue decoding the AV stream.

If CPI_type is EP_map type, the controller 23 at step S59 checks whether or not the picture currently displayed is the picture of the OUT_time PTS. Also, if the CPI_type is TU_map type, the controller 23 checks whether or not the stream currently decoded is past the OUT_time.

If the result of check at step S59 is NO, the controller 23 proceeds to step S60. At step S60, the controller 23 displays the current picture to then revert to step S58. If the result of check at step S59 is YES, the controller 23 proceeds to step S61.

At step S61, the controller 23 checks whether or not the current PlayItem is the last PlayItem in the PlayList. If the result of check is NO, the controller 23 reverts to step S54 and, if otherwise, the PlayList reproduction is finished.

Figure 105:
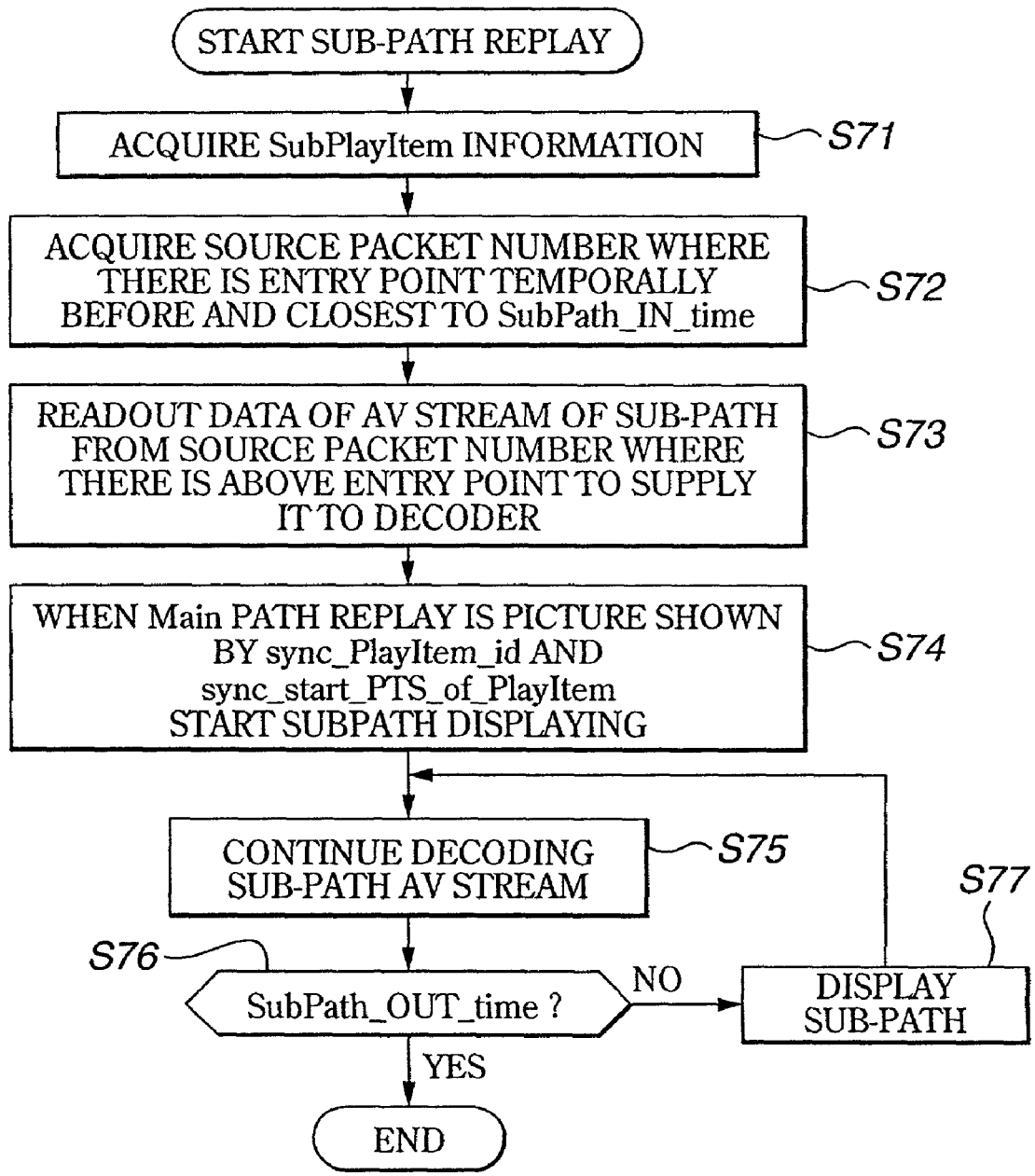
FIG. 105 is a flowchart for illustrating the method for reproducing a sub-path of PlayList.

FIG. 105 is a flowchart for illustrating the reproducing method of the SubPath of the PlayList. The subpath reproducing method of FIG. 105 is used only if CPI_type of PlayList is EP_map. The processing of the flowchart is performed simultaneously with the processing subsequent to step S54 in the reproduction of the PlayList of FIG. 104. Meanwhile, it is presupposed that the AV decoder 27 is able to decode two audio streams simultaneously.

At step S71, the controller 23 acquires the information of SubPlayItem.

At step S72, the controller 23 acquires the source packet number having an entry point temporally previous and closest to SubPath_IN_time.

At step S73, the controller 23 reads out data of the AV stream of the subpath from the source packet number having the above entry point to route the data so read out to the AV decoder 27.

At step S74, the controller 23 commands the AV decoder 27 to start displaying the subpath audio when the reproduction of the main path reaches the picture specified by the sync_PlayItem_id and sync_start_PTS_of_PlayItem.

At step S75, the AV decoder 27 continues decoding the AV stream of the subpath.

At step S76, the controller 23 checks whether or not the PTS of the subpath currently displayed is the SubPath_OUT_time. If the result of check is NO, the controller 23 proceeds to step S77, where the controller 23 continues displaying the subpath. The controller 23 then reverts to step S75.

If, at step S76, the PTS of the subpath currently displayed is SubPath_OUT_time, the display of the subpath is finished.

The main path and the subpath of one PlayList file, commanded to be reproduced by the user, are reproduced, as shown in FIGS. 104 and 105.

Figure 106:
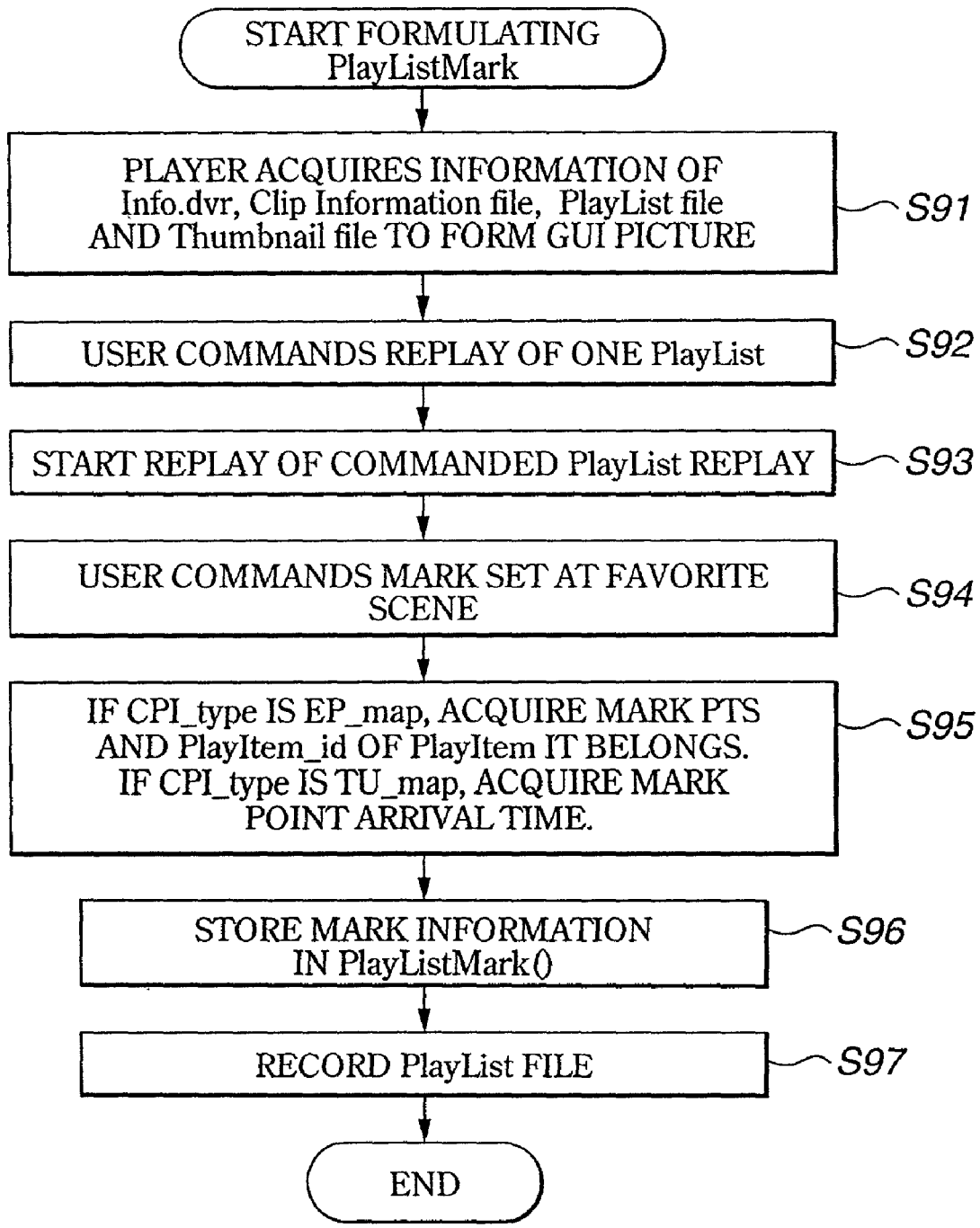
FIG. 106 is a flowchart for illustrating the method for forming PlayListMark.

FIG. 106 shows a flowchart for illustrating the method for forming the PlayListMark. Reference is made to the block diagram of the recording and/or reproducing apparatus of FIG. 1.

At step S91, the controller 23 acquires the information on the Info.dvr, Clip Information file, PlayList file and thumbnail file and forms a GUI picture demonstrating a list of PlayLists recorded on the disc to display the GUI picture so formed on the GUI through user interface.

At step S92, the user commands the controller 23 to reproduce one PlayList through user interface.

At step S93, the controller 23 causes reproduction of the specified PlayList as commanded to be started (see FIG. 104).

At step S94, the user commands the controller 23 to set a mark at a favorite scene through user interface.

If, at step S95, the CPI_type is EP_map, the controller 23 acquires the mark PTS and the PlayItem_id of the PlayItem to which it belongs. Also, the controller 23 acquires the arrival time of the mark point, if the CPI_type is TU_map.

At step S95, the controller 23 stores the mark information in the PlayListMark( ).

At step S97, the controller 23 records the PlayList file on the recording medium 100.

Figure 107:
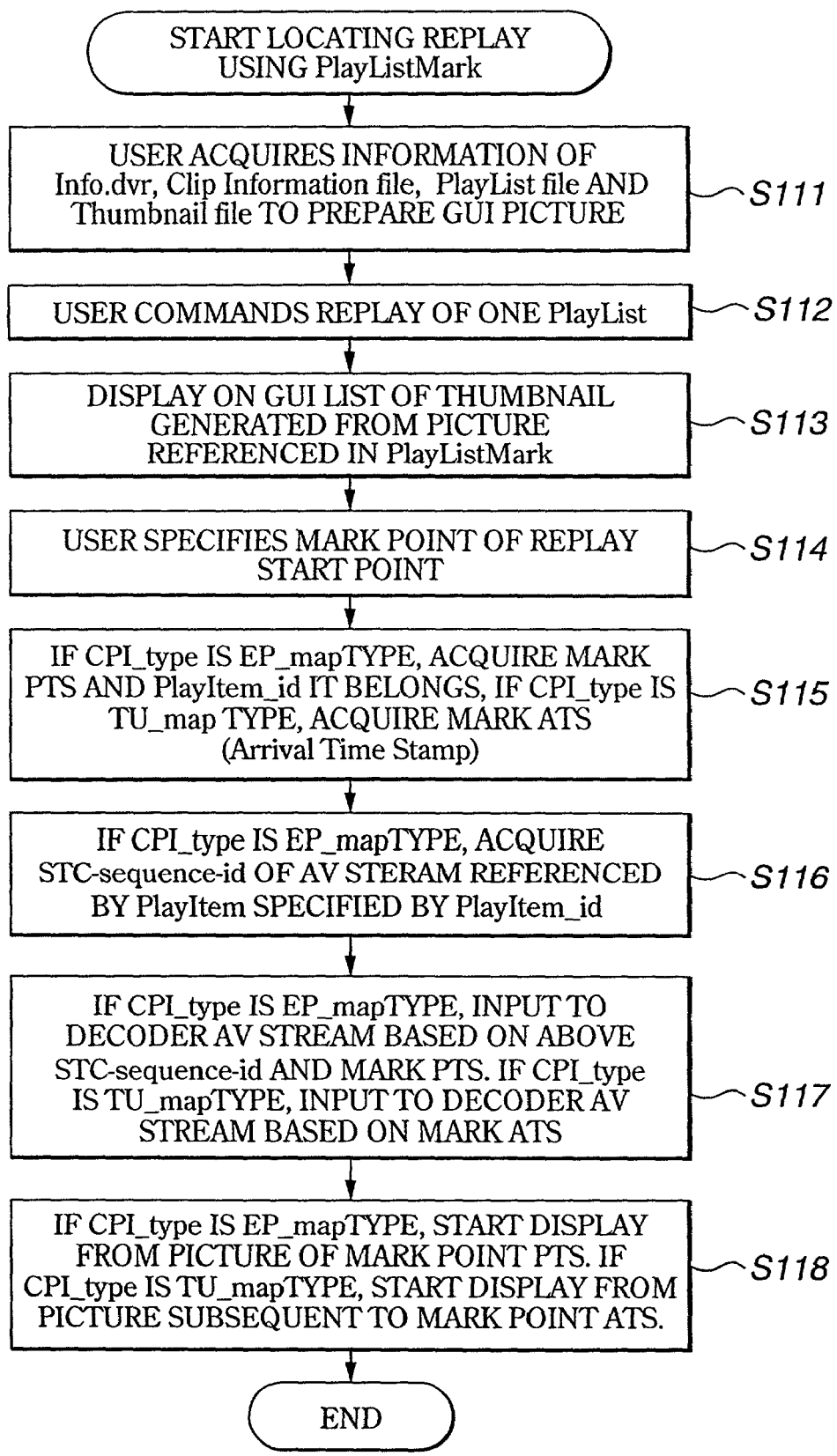
FIG. 107 is a flowchart for illustrating the locating reproducing method employing PlayListMark.

FIG. 107 is a flowchart for illustrating the locating reproducing method employing the PlayListMark. Reference is made to the block diagram of the recording and/or reproducing apparatus 1 of FIG. 1.

At step S111, the controller 23 acquires the information on the Info.dvr, Clip Information file, PlayList file and thumbnail file and forms a GUI picture demonstrating a list of PlayLists recorded on the disc (recording medium 100) to display the GUI picture so formed on the GUI through user interface.

At step S112, the user commands the controller 23 to reproduce one PlayList through user interface.

At step S113, the controller 23 causes the list of thumbnails, generated from the picture referenced by PlayListMark, to be displayed on the GUI through user interface.

At step s114, the user specifies the mark point of the reproduction start point through the user interface.

If the CPI_type is EP_map type, the controller 23 acquires the mark PTS and the PlayItem_id to which it belongs. If the CPI_type is TU_map type, the controller 23 acquires the ATS (Arrival Time Stamp) of the mark.

If the CPI_type is the EP_map type, the controller 23 at step S116 acquires the STC-sequence_id of the AV stream referenced by PlayItem specified by the PlayItem_id.

At step S117, if the CPI_type is EP_map type, the controller 23 causes the AV stream to be input to the decoder based on the PTS of the mark and on the STC-sequence_id. Specifically, the controller 23 performs the processing similar to that at step S55, using the PTS of the mark and on the STC-sequence_id. If CPI_type is TU_type, the controller 23 causes the AV stream to be input to the decoder, based on the ATS of the mark. Specifically, the controller performs the processing similar to that at step S54 and step S55 of FIG. 104, using the ATS.

If, at step S118, the CPI_type is the EP_map type, the controller 23 causes display to be started as from the picture of the PTS of the mark point. If the CPI_type is the TU_map type, the controller 23 causes display to be started as from a picture at back of the ATS of the mark point.

In this manner, the user selects e.g., a start point of a favorite scene from the PlayList. The start point so selected is supervised by the recorder (controller 23 of the recording and/or reproducing apparatus 1) in the PlayListMark. Moreover, the user selects the reproduction start point from the list of the mark points stored in the playListMark so that the player begins reproduction at the start point, as shown in FIG. 107.

If the above syntax, data structure and the rules are used as basis, the contents of data recorded on the recording medium or the reproduction information can be managed properly to enable the user to confirm the contents of data recorded on the recording medium at the time of reproduction or to reproduce desired data extremely readily.

If the position of an I-picture can be analyzed, the AV stream of different formats can be recorded, reproduced and managed using a common application program (software), subject to employing TU_map.

If the AV stream is recorded on the recording medium as its contents (I-picture position) are analyzed (cognizant recording), the EP_map is used, whereas, if the AV stream is directly recorded on the recording medium without analyzing its contents (I-picture position) (non-cognizant recording), the TU_map is used. So, the AV data can be recorded, reproduced and managed using a common application program.

Thus, if the scrambled AV data is descrambled with analysis to record it on the recording medium, the EP_map is used, whereas, if the scrambled AV data is directly recorded on the recording medium without descrambling (without analysis), the TU_map is used. By so doing, the AV data may be recorded, reproduced and managed using the common application program.

Moreover, the EP_map type and the TU_map type can be described in the PlayList( ) as CPI_type, TU_map may be used if the I-picture position can be analyzed, whereas, if the I-picture position cannot be analyzed, the TU_map may be used. By so doing, the AV stream data recorded with analysis of the I-picture position and the AV stream data recorded without analysis of the I-picture position can be managed in a unified fashion by a common program simply on setting a corresponding flag.

Moreover, the PlayList file and the Clip Information file are recorded separately, so that, if the contents of a given PlayList or Clip are changed by e.g., editing, it is unnecessary to change a file irrelevant to the changed file. The result is that the file contents can be changed readily to reduce the time needed in such change or recording.

In addition, if only the Info.dvr is read out first to present the disc recording contents to the user interface to read out from the disc only the PlayList file commanded to be reproduced by the user and the relevant Clip Information file, the user queuing time may be reduced.

If the totality of PlayList files or Clip Information files are collected in one file for recording, the file size becomes bulky. So, the time involved in changing the file contents for recording is appreciably longer than that in case the respective files are recorded separately. The present invention is aimed to overcome this deficiency.

The above-described sequence of operations may be executed not only by hardware but also by software. If the sequence of operations is to be executed by software, it is installed from a recording medium to a computer in the dedicated hardware of which the program forming the software or a general-purpose personal computer of FIG. 38 capable of executing various functions based on a variety of programs installed therein.

Figure 108:
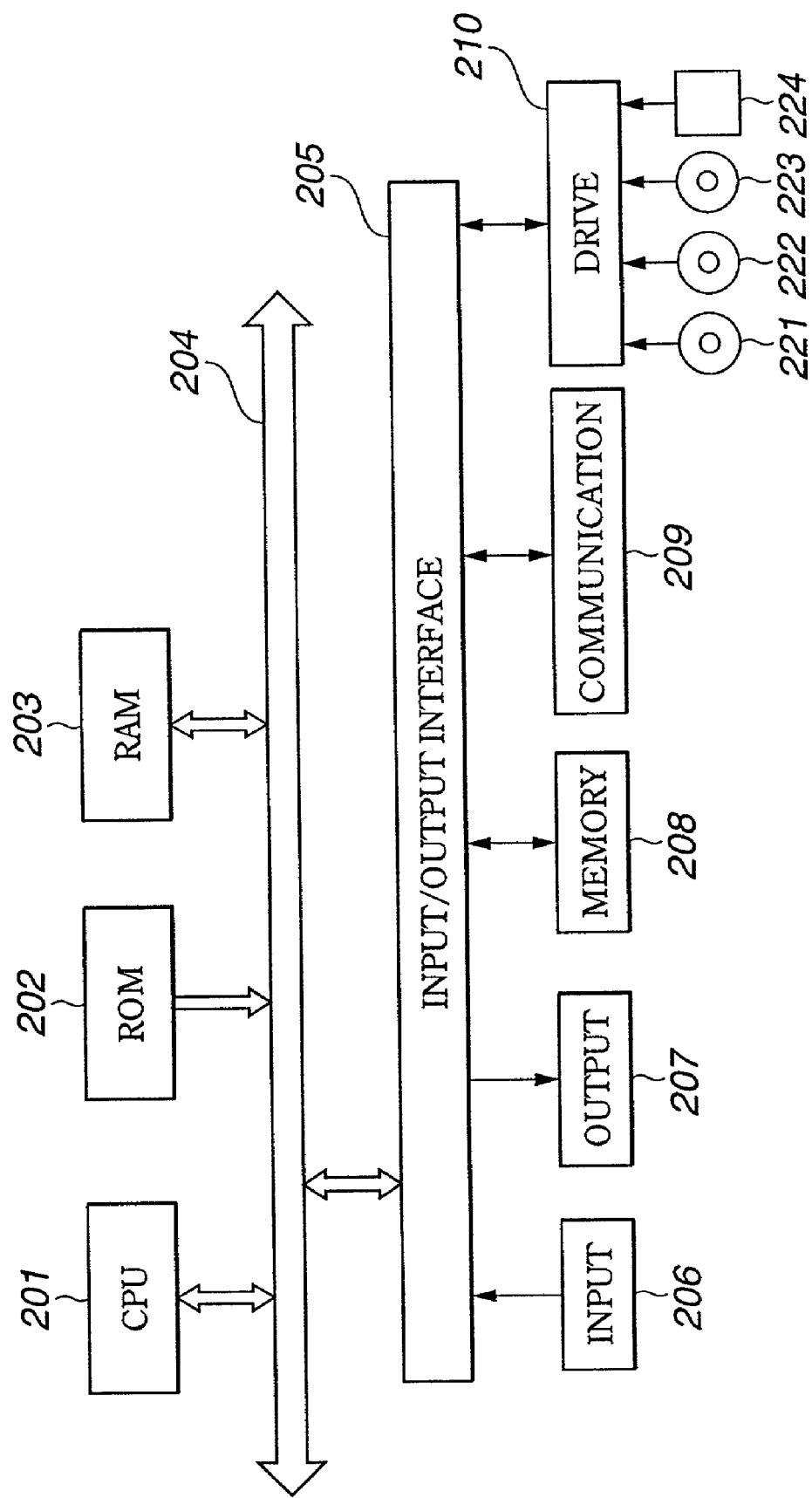
FIG. 108 illustrates a medium.

The recording medium is constituted not only by a package medium distributed for furnishing the program to the user, in addition to a computer, such as a magnetic disc 221 carrying the program thereon, inclusive of a floppy disc, an optical disc 222, inclusive of a CD-ROM (Compact Disc-Read-Only memory) or a DVD (Digital Versatile Disc), a magneto-optical disc 223, inclusive of a Mini-Disc, or a semiconductor memory 224, but also by a hard disc, inclusive of a ROM 202 carrying a program and a memory 208, furnished to the user as it is built-in in a computer, as shown in FIG. 108.

In the present specification, the steps of the program furnished by the medium include not only the chronological processing in accordance with the sequence indicated, but also the processing performed not chronologically but in parallel or separately.

Additionally, in the specification, the system means an entire apparatus comprised of plural component devices.

Industrial Applicability

In the information processing method and apparatus according to the present invention, program for a recording medium, program and the recording medium, according to the present invention, one of a first table stating the relation of correspondence between the presentation time stamp and the address in the AV stream data in the corresponding access unit and a second table stating the relation of correspondence between the arrival time stamp derived from the arrival time point of the transport packet and the address in the AV stream data in the corresponding transport packet is recorded depending on the recording method.

In the information processing method and apparatus, program for a recording medium, and the program, according to the present invention, one of a first table stating the relation of correspondence between the presentation time stamp and the address in the AV stream data in the corresponding access unit and a second table stating the relation of correspondence between the arrival time stamp derived from the arrival time point of the transport packet and the address in the AV stream data in the corresponding transport packet, as recorded on a recording medium depending on the recording method, is reproduced from the recording medium to control the output.

In the information processing method and apparatus, program for a recording medium, program, and the second recording medium, according to the present invention, the reproduction specifying information comprised of the first information specifying the main reproducing path and the second information specifying the subsidiary reproducing path reproduced in synchronism with the main reproducing path is recorded.

In the information processing method and apparatus, program for a recording medium, and the program, according to the present invention, the reproduction specifying information comprised of the first information specifying the main reproducing path and the second information specifying the subsidiary reproducing path is reproduced from the recording medium to control the output accordingly.

So, in any instance, the AV stream capable of high speed reproduction and the AV stream incapable of high speed reproduction can be managed in common, whilst post-recording also becomes possible.

The invention claimed is:

1. A non-transitory computer readable medium adapted to store a computer program for an information processing apparatus recording AV stream data on a recording medium the computer program comprising:
    a first determining step of determining whether a first table is recorded on the recording medium, the first table recorded as a function of a first recording method;
    a second determining step of determining whether a second table is recorded on the recording medium, the second table recorded as a function of a second recording method;
    a reproducing step of reproducing only one of either the first table or the second table;
    wherein the first table describes a relation of correspondence between a presentation time stamp and an address in said AV stream data of a corresponding access unit, and
    wherein the second table describes a relation of correspondence between an arrival time stamp derived from an arrival time point of a transport packet and an address in said AV stream data of a corresponding transport packet, from said recording medium based on the first determining step or the second determining step,
    wherein the first table is distinct from the second table; and
    a controlling step of controlling output of said AV stream data based on the reproduced table.

2. An information processing apparatus for recording AV stream data on a recording medium, comprising:
    a controller for generating only one table, the one table being either a first table or a second table;
    wherein the first table describes a relation of correspondence between a presentation time stamp and an address in said AV stream data of a corresponding access unit,
    wherein the second table describes a relation of correspondence between an arrival time stamp derived from an arrival time point of a transport packet and an address in said AV stream data of a corresponding transport packet,
    wherein the first table is distinct from the second table; and
    a recorder for recording one of the generated first table or the generated second table, on said recording medium with said AV stream data, based on the controller.

3. The information processing apparatus according to claim 2
    wherein said first table is EP_map; and
    wherein said second table is $TU_{13}$ map.

4. The information processing apparatus according to claim 2 wherein
    said controller selects said second table in case of non-cognizant recording.

5. The information processing apparatus according to claim 2 wherein
    said controller selects said first table in case of self encoding recording.

6. The information processing apparatus according to claim 2 wherein
    said controller selects said first table in case of cognizant recording.

7. The information processing apparatus according to claim 2 wherein said controller generates the identification information indicating which of said first and second tables have been recorded; and
    said recorder memorizing said identification information.

8. The information processing apparatus according to claim 7 wherein said controller manages control so that,
    if said first table is recorded along with said AV stream data,
        said reproduction specifying information expresses the time information of the reproduction domain of said AV stream data on the presentation time basis, and so that,
    if said second table is recorded along with said AV stream data,
        said reproduction specifying information expresses the time information of the reproduction domain of said AV stream data on the arrival time basis.

9. A non-transitory computer readable medium adapted to store a computer program for an information processing apparatus recording AV stream data on a recording medium the program, comprising:
    a step of generating only one table, either a first table or a second table;
    wherein the first table describes a relation of correspondence between a presentation time stamp and an address in said AV stream data of a corresponding access unit;
    wherein the second table describes a relation of correspondence between an arrival time stamp derived from an arrival time point of a transport packet and an address in said AV stream data of a corresponding transport packet,
    wherein the first table is distinct from the second table; and
    a recording step of recording one of a generated first table or a generated second table, on said recording medium with said AV stream data, based on the generating step.

10. A non-transitory computer readable medium adapted to store a computer program for controlling an information processing apparatus recording AV stream data on a recording medium the program, comprising:
    a step of generating only one table, either a first table or a second table;

wherein the first table describes a relation of correspondence between a presentation time stamp and an address in said AV stream data of a corresponding access unit, wherein the second table describes a relation of correspondence between an arrival time stamp derived from an arrival time point of a transport packet and an address in said AV stream data of a corresponding transport packet, wherein the first table is distinct from the second table; and a recording step of recording the generated first table or the generated second table, on said recording medium with said AV stream data, wherein the generated first table or the generated second table is a function of a recording method.

11. An information processing apparatus for reproducing AV stream data from a recording medium, comprising:

a determining unit configured to determine whether a first table is recorded on the recording medium, the first table recorded as a function of a first recording method, or whether a second table is recorded on the recording medium, the second table recorded as a function of a second recording method;

a reproducing unit for reproducing only one table, either a first table or a second table;

wherein the first table describes a relation of correspondence between a presentation time stamp and an address in said AV stream data of a corresponding access unit, wherein the second table describes a relation of correspondence between an arrival time stamp derived from an arrival time point of a transport packet and an address in said AV stream data of a corresponding transport packet, from said recording medium, wherein the first table is distinct from the second table; and a control unit for controlling output of said AV stream data based on the reproduced table.

12. An information processing apparatus for processing audio and/or picture information, comprising:

an input unit operable to input audio and/or picture information;

a controller operable for generating characteristic point information comprising:
  (i) an entry point map describing a relationship between a presentation time stamp of an entry point and an address of a respective entry point, or
  (ii) a time unit map describing a relationship between an arrival time stamp of a time unit and an address of a respective time unit, wherein the characteristic point information comprising only one map, one of either the entry point map or the time unit map is generated as a function of a type of said input audio and/or picture information,
  wherein the entry point map is distinct from the time unit map; and an output unit operable to output the generated characteristic point information.

13. The apparatus of claim 12, further including a recorder operable to record said audio and/or picture information and the characteristic point information on a recording medium.

14. The apparatus of claim 13 wherein said controller generates the entry point map when the input audio and/or picture information is converted to self-encode stream format.

15. An information processing apparatus for processing audio and/or picture information, comprising:

an input unit operable to input audio and/or picture information;

a controller adapted to generate only one map,
wherein the only one generated map is either
  (i) an entry point map describing a relationship between a presentation time stamp of an entry point and an address of a respective entry point, or
  (ii) a time unit map describing a relationship between an arrival time stamp of a time unit and an address of a respective time unit, wherein the controller is adapted to generate only one map, one of either the entry point map or the time unit map as a function of a recording method,
  wherein the entry point map is distinct from the time unit map; and a recorder operable to record the audio and/or picture information and the generated map on a recording medium.

16. The apparatus of claim 15, wherein said controller generates the time unit map when the entry point map cannot be prepared.

17. An information processing apparatus for recording input audio and/or picture information, comprising:

a controller operable to generate playlist information and map information corresponding to clip information, wherein said clip information includes said audio and/or picture information, wherein said playlist information includes at least one play item designated by an in-point and an out-point of the clip information, wherein said map information including only one map; one of either:
  (i) an entry point map describing a relationship between a presentation time stamp of an entry point and an address of a respective entry point, or
  (ii) a time unit map describing a relationship between an arrival time stamp of a time unit and an address of a respective time unit, wherein generation of only one map; one of either the entry point map or the time unit map is a function of a recording method,
  wherein the entry point map is distinct from the time unit map; and a recorder operable to store the playlist information, the map information and the clip information on a recording medium.

18. The apparatus of claim 17, wherein said controller generates the map information for each point of the clip information.

19. The apparatus of claim 18, wherein said controller generates the map information of the same type for all clip information associated with one playlist.

20. An apparatus for reproducing audio and/or picture information comprising:

a reproducing device for reproducing from a storage medium audio and/or picture information and only one map; one of either:
  (i) an entry point map describing a relationship between a presentation time stamp of an entry point of said information and an address of a respective entry point, or
  (ii) a time unit map describing a relationship between an arrival time stamp of a time unit of said information and an address of a respective time unit, wherein the only one map; one of either the entry point map or the time unit map is reproduced as a function of a type of said input audio and/or picture information, wherein the entry point map is distinct from the time unit map;

a map recovery unit for recovering the entry point map or the time unit map from said storage medium; and an audio and/or picture information reproducing unit for reproducing the audio and/or picture information associated with the recovered map.

21. The apparatus of claim 20, wherein the entry point map is stored on said storage medium when the audio and/or picture information is in a self-encode stream format.

22. An apparatus for reproducing audio and/or picture information, comprising:
- a determining unit configured to determine map information recorded on a recording medium, the map information recorded as a function of a corresponding recording method;
- a reproducing device for reproducing from a storage medium that stores playlist information and map information corresponding to a stream file,
- said stream file including said audio and/or picture information,
- wherein said playlist information including at least one PlayItem having IN time to indicate a presentation start time of PlayItem and OUT time to indicate a presentation end time of PlayItem,
- wherein said map information includes only one map; one of either:
  - (i) an entry point map describing a relationship between a presentation time stamp of an entry point of the stream file and an address of a respective entry point, or
  - (ii) a time unit map describing a relationship between an arrival time stamp of a time unit of the stream file and an address of a respective time unit,
    - wherein the entry point map is distinct from the time unit map;
- a playlist recovery unit for recovering the playlist information;
- a map recovery unit for recovering the map information; and
- a reproducing unit for reproducing the stream file associated with the recovered map information.

23. The apparatus of claim 22 wherein respective map information is stored for each stream file.

24. The apparatus of claim 23 wherein map information of the same type is stored for each stream file associated with one playlist.

25. A non-transitory data providing medium encoded with data readable by a digital processor for controlling reproduction of said data, including:
- a flag type; and
- an entry point map describing a relationship between a presentation time stamp of an entry point of audio and/or picture information recorded thereon and an address of a respective entry point, or a time unit map describing a relationship between an arrival time stamp of a time unit of said information and an address of a respective time unit in accordance with a type of said input audio and/or picture information,
- wherein the entry point map is distinct from the time unit map,
- wherein the flag type indicates a type of recording process used to record only one map; one of either the entry point map or the time unit map.

26. A non-transitory data providing medium encoded with data readable by a digital processor for controlling reproduction of said data, including:
- playlist information and map information corresponding to a stream file, said stream file including audio and/or picture information, said playlist information including at least one PlayItem having IN time to indicate a presentation start time of PlayItem and OUT time to indicate a presentation end time of PlayItem, and
- said map information being only one map; one of either:
  - (i) an entry point map describing a relationship between a presentation time stamp of an entry point and an address of a respective entry point, or
  - (ii) a time unit map describing a relationship between an arrival time stamp of a time unit of the stream file and an address of a respective time unit,
- wherein inclusion of only one map; one of either the entry point map or the time unit map is a function of a recording method,
- wherein the entry point map is distinct from the time unit map.

27. The apparatus for reproducing according to claim 22, comprising:
- a reproducing device for reproducing the map file from the stream file.

28. The data providing medium encoded with data readable by a digital processor for controlling reproduction of said data according to claim 26, comprising:
reproducing the map file from the stream file.

* * * * *